INVENTOR.
JAMES A. WEIDENHAMMER
BY [signature]
ATTORNEY

INVENTOR.
JAMES A. WEIDENHAMMER
BY [signature]
ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 3

INVENTOR.
JAMES A. WEIDENHAMMER
BY
ATTORNEY

INVENTOR.
JAMES A. WEIDENHAMMER
BY [signature]
ATTORNEY

INVENTOR.
JAMES A. WEIDENHAMMER
BY [signature]
ATTORNEY

Sept. 17, 1957 J. A. WEIDENHAMMER 2,807,005
DEVICE FOR CONVERTING AND REINSCRIBING
MAGNETICALLY RECORDED DATA
Filed Dec. 31, 1953 32 Sheets-Sheet 6

INVENTOR.
JAMES A. WEIDENHAMMER
BY [signature]
ATTORNEY

INVENTOR.
JAMES A. WEIDENHAMMER
BY [signature]
ATTORNEY

INVENTOR.
JAMES A. WEIDENHAMMER
BY
ATTORNEY

Sept. 17, 1957 J. A. WEIDENHAMMER 2,807,005
DEVICE FOR CONVERTING AND REINSCRIBING
MAGNETICALLY RECORDED DATA
Filed Dec. 31, 1953 32 Sheets-Sheet 9

INVENTOR.
JAMES A. WEIDENHAMMER
BY P. E. Henninger
ATTORNEY

INVENTOR.
JAMES A. WEIDENHAMMER
BY P. E. Henninger
ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 11

INVENTOR.
JAMES A. WEIDENHAMMER
BY [signature]
ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 12

INVENTOR.
JAMES A. WEIDENHAMMER

BY [signature]

ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 13

INVENTOR.
JAMES A. WEIDENHAMMER

BY [signature]

ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 14

INVENTOR.
JAMES A. WEIDENHAMMER
BY
ATTORNEY

INVENTOR.
JAMES A. WEIDENHAMMER
BY [signature]
ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 16

INVENTOR.
JAMES A. WEIDENHAMMER
BY [signature]
ATTORNEY

INVENTOR.
JAMES A. WEIDENHAMMER
BY [signature]
ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 18

INVENTOR.
JAMES A. WEIDENHAMMER
BY [signature]
ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 19

INVENTOR.
JAMES A. WEIDENHAMMER
BY
ATTORNEY.

INVENTOR.
JAMES A. WEIDENHAMMER
BY
ATTORNEY

INVENTOR
JAMES A. WEIDENHAMMER
BY [signature]
ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 22

INVENTOR.

JAMES A. WEIDENHAMMER

BY [signature]

ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 23

INVENTOR.
JAMES A. WEIDENHAMMER
BY [signature]
ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 24

INVENTOR.
JAMES A. WEIDENHAMMER
BY
[signature]
ATTORNEY

INVENTOR.
JAMES A. WEIDENHAMMER
BY [signature]
ATTORNEY

FIG. 48.

| EXCESS 3 | HOLLERITH | | | |
|---|---|---|---|---|
| Zone Numeric 8 4 2 1 | Zone (12) 11 | Zone (11) 10 | Zone (0) 01 | Numeric 00 |
| X X 0 0 0 0 | | ‡ Record Mark | ++ Tape Mark | Blank |
| X X 0 0 0 1 | | | | |
| X X 0 0 1 0 | Hyphen (11) | | | |
| X X 0 0 1 1 | & (12) | - Field Mark | Field Mark | 0 |
| X X 0 1 0 0 | A | J | | 1 |
| X X 0 1 0 1 | B | K | S | 2 |
| X X 0 1 1 0 | C | L | T | 3 |
| X X 0 1 1 1 | D | M | U | 4 |
| X X 1 0 0 0 | E | N | V | 5 |
| X X 1 0 0 1 | F | O | W | 6 |
| X X 1 0 1 0 | G | P | X | 7 |
| X X 1 0 1 1 | H | Q | Y | 8 |
| X X 1 1 0 0 | I | R | Z | 9 |
| X X 1 1 0 1 | (12-8-3) | $ (11-8-3) | , (0-8-3) | # (8-3) |
| X X 1 1 1 0 | ¤ (12-8-4) | * (11-8-4) | % (0-8-4) | @ (8-4) |
| X X 1 1 1 1 | Forbidden | | | ∞ (Inv. Blank.) |

INVENTOR.
JAMES A. WEIDENHAMMER
BY [signature]
ATTORNEY

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 27

INVENTOR.
JAMES A. WEIDENHAMMER
BY [signature]
ATTORNEY

INVENTOR.
JAMES A. WEIDENHAMMER
BY
ATTORNEY

INVENTOR.
JAMES A. WEIDENHAMMER
BY [signature]
ATTORNEY

INVENTOR.
JAMES A. WEIDENHAMMER
BY
[signature]
ATTORNEY.

INVENTOR.
JAMES A. WEIDENHAMMER
BY
ATTORNEY.

Sept. 17, 1957 J. A. WEIDENHAMMER 2,807,005

DEVICE FOR CONVERTING AND REINSCRIBING MAGNETICALLY RECORDED DATA

Filed Dec. 31, 1953 32 Sheets-Sheet 32

INVENTOR.
JAMES A. WEIDENHAMMER
BY [signature]
ATTORNEY

United States Patent Office
2,807,005
Patented Sept. 17, 1957

2,807,005

DEVICE FOR CONVERTING AND REINSCRIBING MAGNETICALLY RECORDED DATA

James A. Weidenhammer, Poughkeepsie, N. Y., assignor to International Business Machines Corporation, New York, N. Y., a corporation of New York Application December 31, 1953, Serial No. 401,622
22 Claims. (Cl. 340—174)

This invention relates to a record conversion system. More particularly, it relates to an electronic system for reading and interpreting magnetically recorded records and reinscribing such records in punching or printing devices.

In its most specific aspect the invention contemplates an electronic record conversion system adapted to read magnetic tape records inscribed in a given code such as a modified binary code, for example, and translate such records and reinscribe the same in different form and in a different code such as the Hollerith punch card code, for example.

It is an object of this invention to provide a system of the class described in which data may be read from a magnetic record, interpreted, stored in electrostatic storage and regenerated in storage, and in which the regeneration and read-out of storage is under control of a reproducing device such as a record card punch.

It is a further object of the invention to provide means for controlling the electron beam of an electrostatic storage system for both horizontal and vertical scanning movement of such beam, comprising separate pulsing devices for deflecting the beam in a horizontal direction and in a vertical direction, means for selecting one of said pulsing devices for reading a record into storage and means under control of the reproducer for selecting the other pulsing device for reading a record out of storage.

It is a further object of the invention to provide means, in a record converting system utilizing regenerated electrostatic record storage for initiating the feed of a magnetic tape through a tape reading station in conjunction with means responsive to the tape feed initiating means for suspending regeneration of a record in electrostatic storage.

It is a further object of the invention to provide a system for converting records, each word of which is composed of a plurality of bits, which comprises means for sensing the bits comprising a word, and a single register for receiving and momentarily retaining the sensed bits, together with means for simultaneously processing the bits and transmitting to storage the word represented thereby.

It is a further object of the invention to provide a system for converting records inscribed in a given multibit code, and comprising means for receiving in somewhat serial order and momentarily retaining a plurality of code bits, means for simultaneously transmitting such bits from the retaining means to a translating network in which the bits are translated into a code differing from that in which the data was inscribed, and electrostatic means for storing the data in its translated form.

It is a still further object of the invention to provide an electronic data processing system having therein electrostatic data storage means, and wherein data is entered into electrotatic storage in column by column order but read out of such storage in row by row order.

It is a still further object of the invention to provide, in a system of the class described, a code conversion matrix adapted to receive simultaneously the components of a multi-bit record, translate such record into a different code, and emit the translated data as a series of time space pulses.

It is a still further object of the invention to provide a data processing system adapted to operate on a unit record consisting of a plurality of words and which has means for ascertaining that a predetermined number of words have been entered for processing.

It is yet another object of the invention to provide an electronic data processing system adapted to present processed data to a reproducing device, and in which the reproducing device is adapted to control the flow of processed data from the processing system to the repoducing device.

It is a still further object of the invention to provide a data processing system characterized by electrostatic data storage means in which stored data is repeatedly regenerated and in which data is presented to a data reproducer, in combination with means in the reproducer for controlling regeneration of the stored data.

Other important objects and advantages of the invention will appear from a reading of the description thereof in conjunction with the drawings forming a part of this application in which:

Fig. 21 illustrates both the block symbol and the detailed wiring diagram of a key trigger which is adapted to be impulsed from mechanical circuit breakers and the like;

Figure 49:
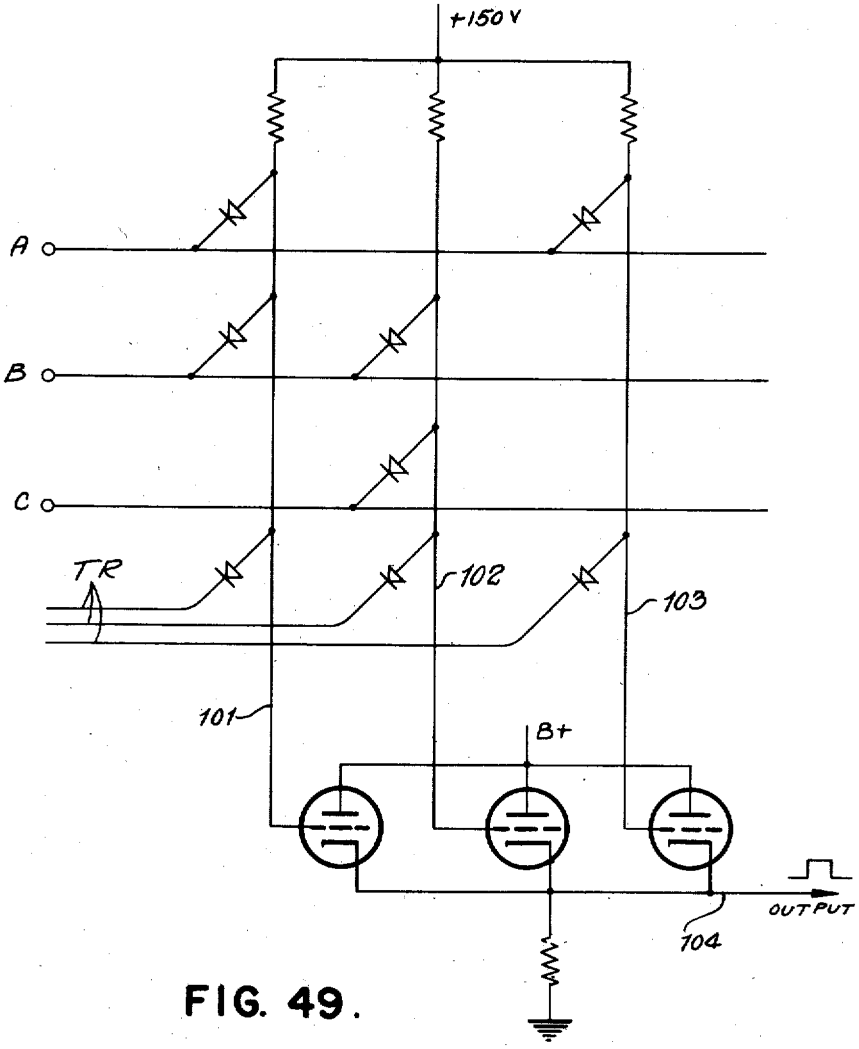
Figure 50:
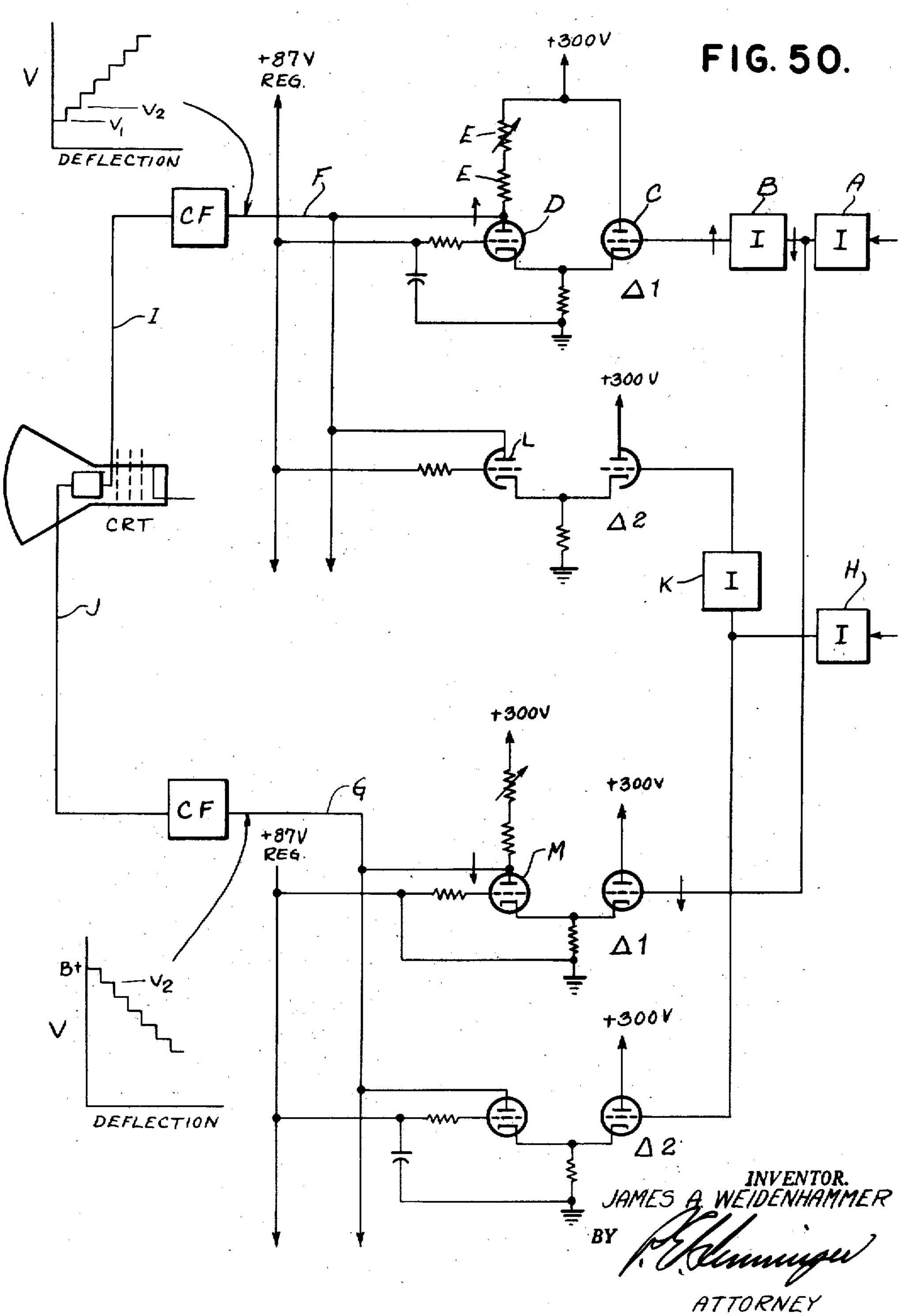
Figure 51:
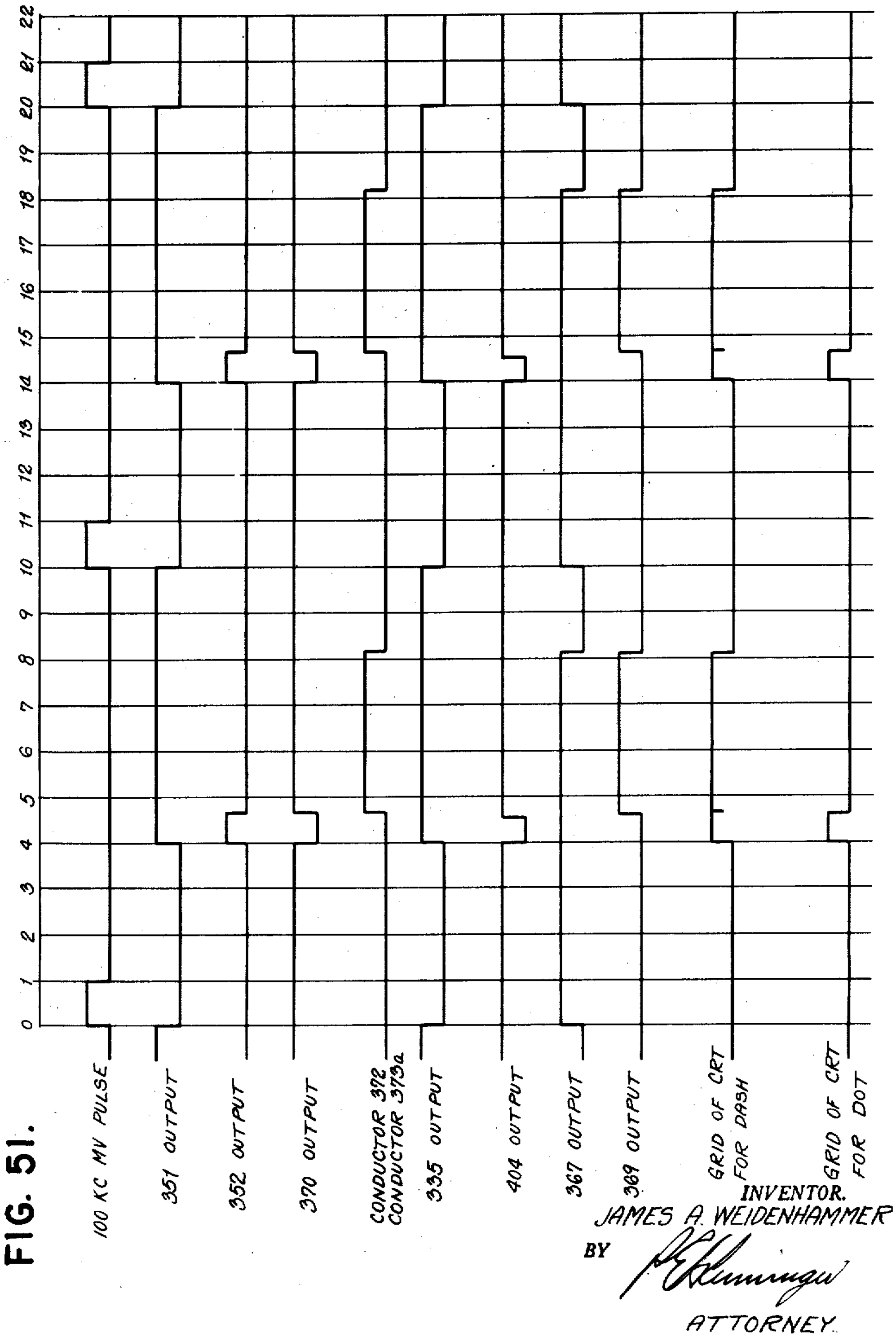

Figs. 33 through 47, and 52 through 55 taken together comprise the overall circuit of the converse system principally in block form;

Fig. 48 is a table of the Excess Three Code in which tape recorded data is inscribed and the corresponding Hollerith Code equivalents thereof;

Fig. 49 is an explanatory diagram illustrating the operation of a diode decoding matrix;

Fig. 50 is a diagram of and in explanation of the cathode ray beam deflection circuits; and, Fig. 51 is a timing chart of the Dot-Dash Control Circuits.

*General description*

This invention, as noted in the statement of objects, relates to an electronic device for converting magnetically recorded tape information to punched cards or printed records. The machine provides means for translating records stored on a magnetic tape in the Excess Three Code and for punching such records into cards in the Hollerith Code, for example.

The converting system herein consists of three individual units, a tape drive such as shown in the application of James A. Weidenhammer et al., Serial Number 290,396, filed on May 28, 1952, an electronic conversion and storage unit, and a reproducer such as a printer or a card punch. The invention will be described in connection with the punching of cards in an International Business Machines Corporation Type 523 Gang Summary Punch which is constructed generally according to the teaching in C. D. Lake Reissue Patent 21,133.

The electronic conversion and storage unit contains an initial storage register for momentarily storing each character received from the tape, a diode decoding matrix, an electro-static cathode ray tube storage system, and associated controls such as the necessary deflection circuits and circuits for regenerating the stored data, a group of thyratrons for operating the punch magnets, and the normal control circuits necessary to integrate the constituent units.

A pair of cathode ray tubes are used in order to provide sufficient capacity for storing a one hundred character unit record from the tape. This provides sufficient capacity to punch an 80 column card with an allowance for non-punching or over-punching characters such as field marks. The Summary Punch of the aforesaid C. D. Lake patent has been modified slightly in order to work in combination with the system as a whole.

The Gang Summary Punch is adapted for continuous operation at its rated speed of 100 cards per minute. During the time interval between the punching of the 9 row of holes in one card and the 12 row of holes in the following card (i. e. the time between successive cards) the tape unit is started, a single unit record is sensed and stored, and the tape unit is stopped. Beginning with the 12 row of holes the record is read out and punched into the card. Thus the tape unit operates in an intermittent fashion and is feeding tape only during the short interval of time between actual punching of the cards.

Figure 1:
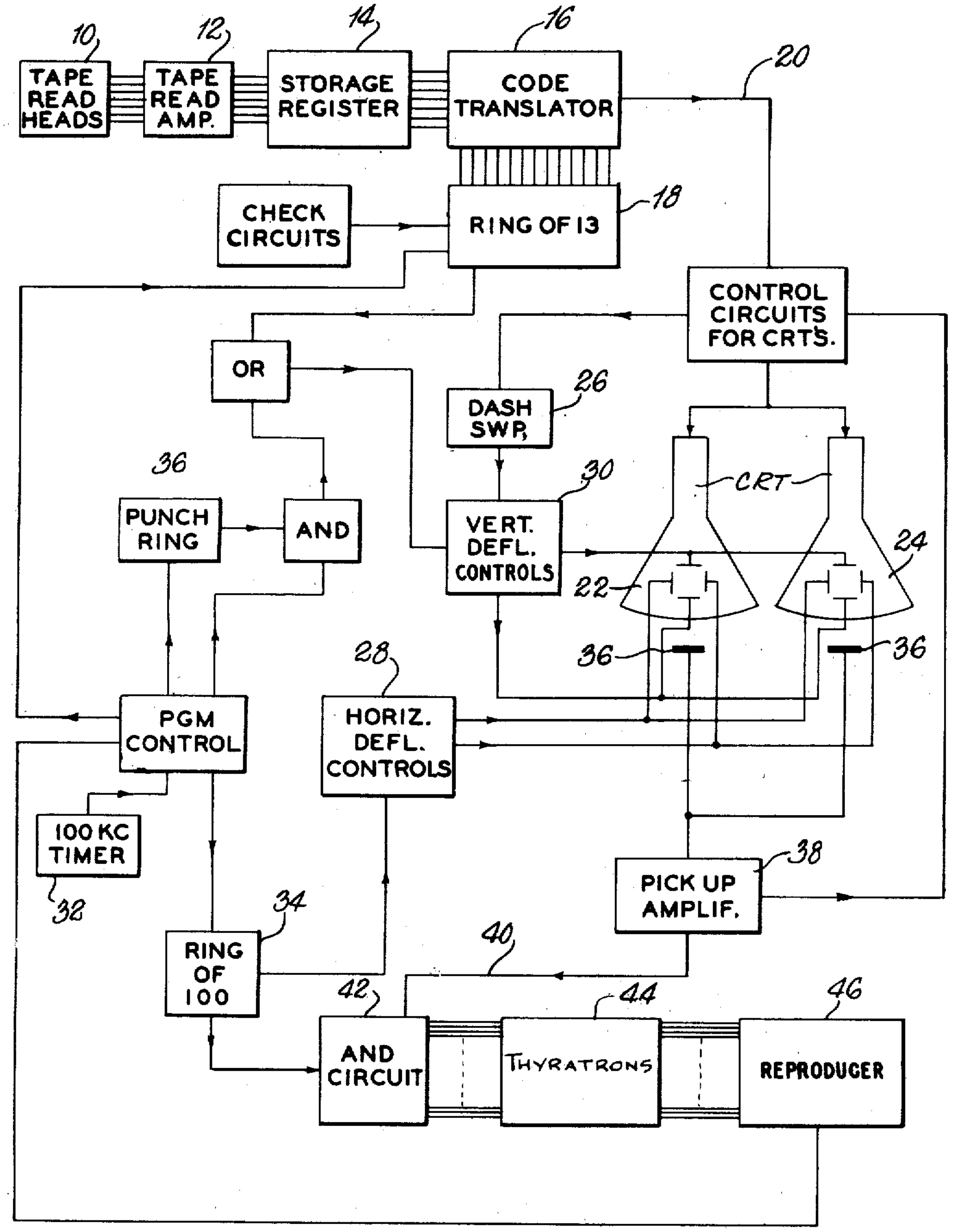
Fig. 1 is a generally formal diagram in block form showing the entire conversion system comprising the invention.

The overall system is shown as Figure 1 of the drawing to which reference may be made for a general understanding of the nature and operation of the converter. Immediately after the 9 row of holes in a given card is punched, a signal from the punch sets the tape drive unit into motion so as to feed a tape recorded unit record containing information for the next card. Information is stored on the tape in seven tracks so that each character is represented by a substantially simultaneous output from one or more of the seven reading coils in the tape reading head assembly 10. A character is represented by a group of magnetic spots in a transverse line across the tape. The Excess Three Code is used for purpose of recording and the bits in the seventh track of the tape provide a bit check on the well-known redundancy bit check principle. About 10 milliseconds after the tape unit is started, the first character of the unit record should reach the reading heads 10, and appear in the inputs to the tape read amplifiers 12.

The outputs from one or more of the seven tracks for the first character are stored for a few microseconds in an electronic trigger storage register 14 which retains the data read from tape so that late signals due to electrical or mechanical skew wil not be lost. This is necessary for the reason that the code translator 16 must receive the tape generated impulses simultaneously. After the few millisecond lapses during which the tape information is held in the storage register 14, the complete character contained in the register 14 is entered through a seven channel input to the code translating matrix 16. This matrix is interrogated by a timing ring 18 which may be referred to as the Ring of Thirteen. The timing ring operates at 100 kc. and controls the vertical position of the beams of the cathode ray tube. The output of the code translating matrix 16 will be pulsed in a timed cycle representation of the character in the Hollerith Code and as such will appear on the output line 20.

Since the conversion or translation matrix 16 is interrogated by the timing ring 18 which also controls the vertical position of the beams of the cathode ray tubes, the timed representation of a column of the Hollerith Code appearing on the output line 20 will be in the proper form for storage on a cathode ray tube. The representation of information on the cathode ray tubes will be in columns and rows similar to the columns and rows of a punched record card.

After information appears on the output line 20, representing a 4 for example, a pulse will appear on the output line at the time the beams of the cathode ray tubes are in the 4th row of a given column and this pulse will be stored on the face of the cathode ray tube.

Figure 2:
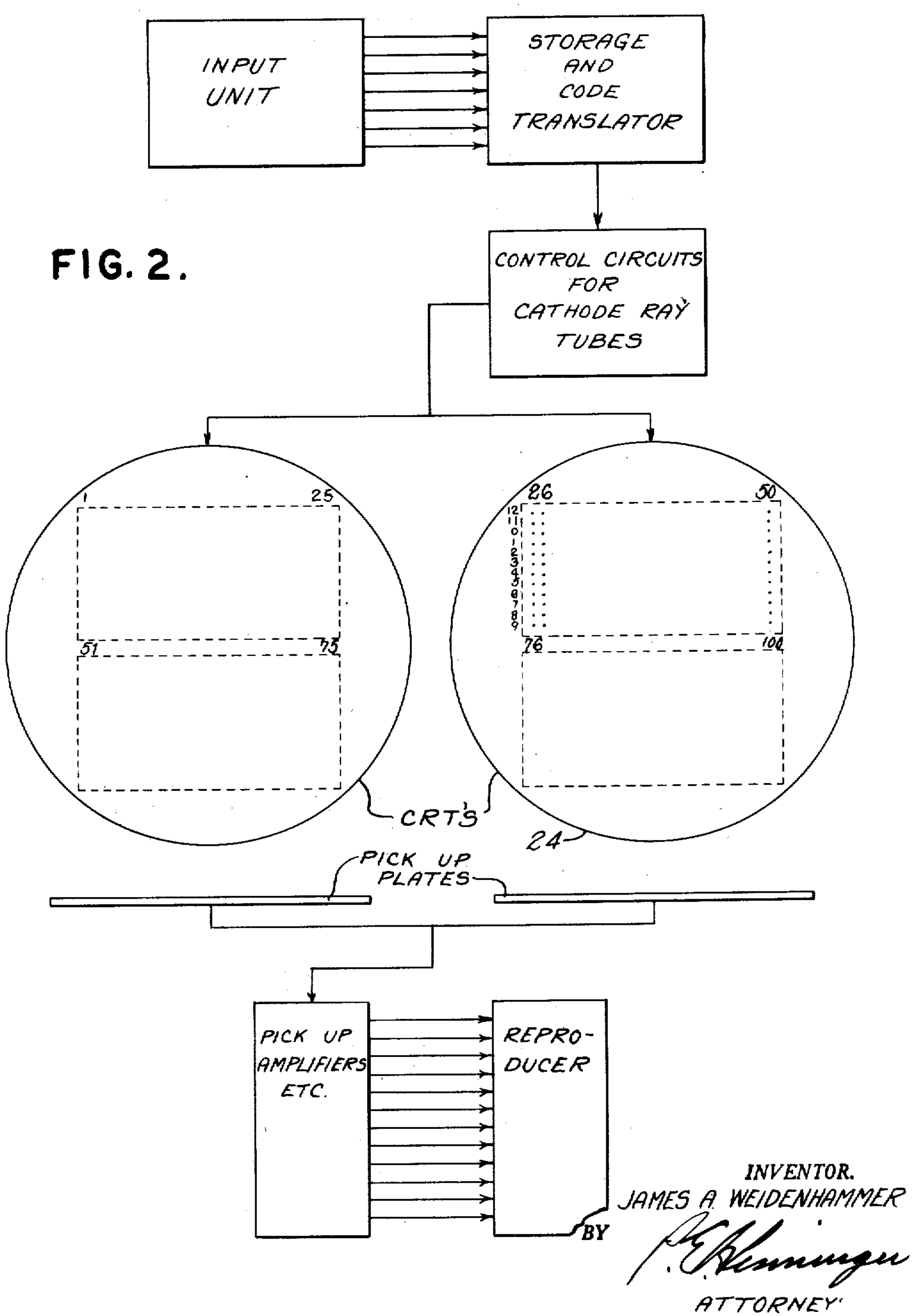
Fig. 2 is a diagrammatic illustration of the system herein showing the electrostatic storage tubes in exaggerated scale to illustrate the data storage patterns on the rasters thereof.

By reference to Figure 2 it can be seen that the information from the tape is stored on the faces of two cathode ray tubes in a pattern consisting of four rasters. Each raster consists of twelve rows of spots arranged in twenty-five columns. Each raster can therefore, be used to represent the hole pattern in twenty-five columns of a punched record card. The columns are numbered from 1 to 100 providing for the storage of one hundred characters from tape.

The beams of the two cathode ray tubes travel in synchronism and thus scan similar positions on their respective tubes. If the left hand tube 22 (Fig. 2) is scanning column 1, the right hand tube 24 will be scanning column 26, since the same vertical and horizontal deflection circuits are used for both tubes. If information is to be stored in column 1 of the left hand tube, the left hand tube will be unblanked while the right hand tube remains blanked.

When a digit is to be stored on a cathode ray tube, and eventually be punched as a hole in a column of a card corresponding to a particular column on the cathode ray tube, the dot in the corresponding digit position of the tube is elongated into a vertical dash. The stored pattern on the face of the cathode ray tubes may be considered as an image of a punched card divided into four parts, the holes represented by vertical dashes and the unpunched index point positions being represented by small dots.

It is now evident why a representation of the Hollerith Code timed in step with the vertical sweep of the cathode ray tubes is necessary on the code translating matrix output 20. The beams sweep a vertical column in which information may be stored in spot by spot progression. The horizontal deflection circuits 28, then move the beams to the next column in order to store the next character read from the tape. As information is being stored on one cathode ray tube, the beam of the other tube is cut off. During the storing operation, the vertical deflection circuits 30 are controlled by the timing ring 18, which is driven by the 100 kc. pulse generator 32. At this time the horizontal deflection circuit 28 is controlled by a 100 step timing ring 34, referred to herein as the Ring of One Hundred, which in turn is advanced one position at the completion of each column scan.

In a similar manner, one hundred characters from the tape may be stored after which the tape is stopped automatically by the sensing of a Record Mark at the end of the record. During this period the punch continues to operate so that in due time the 12 position of the next following card reaches the punch stage. During such time automatic regeneration of the pattern stored on the face of the cathode ray tubes takes place, thus preserving the pattern against decay.

At 12 punching time (start of a new card to be punched), the punch emits an impulse to the conversion and storage unit which stops the regeneration process and initiates a different mode of tube scanning for the read-out of the stored pattern.

*Read-out to the punch.*—Every punch magnet in the Type 523 Punch is wired through control panel plug wiring to a thyratron in the electronic conversion and storage unit. One hundred thyratrons are provided, one for each character stored on the cathode ray tubes. Provision is made for over-punch, algebraic signs, etc., by wiring through the standard column splits in the punch. The control grid of each thyratron is connected to a two input AND circuit, whereby both inputs of the AND circuit must be simultaneously pulsed in order to cause the thyratron to conduct.

Information is read out of the cathode ray tubes in a serial fashion, that is to say the read-out operation proceeds in row by row order rather than in column by column order which was the order in which the information was stored on the face of the tubes. At 12 punching time, the 12 row of all one hundred columns in storage are checked and the thyratrons corresponding to the columns in which a dash is found are fired. At this time the horizontal deflection circuit 28, being driven by the timing Ring of One Hundred 34 which is now being controlled by the 100 kc. generator 32, cause the cathode ray beams to be moved from spot to spot from column 1 through column 100 in serial order, with the vertical deflection circuits 30 controlled by a punching ring 36 to locate the beams in the 12th row of the stored patterns.

Whenever a dash is encountered during this rapid scanning operation, a signal is picked up by the appropriate pickup plate 36, amplified by a video amplifier 38 and delivered by way of a conductor 40 to one input of all of the AND circuits 42 which are connected to the control grids of the 100 thyratrons in the thyratron network, 44.

During the read-out scanning, the horizontal sweep timing Ring of One Hundred 34 feets the other input of the AND circuits 42, one at a time corresponding to the position of the spot being scanned on the face of the tube. If there is a coincidence of pulses on the sampling line 40 and the timing pulse from the Ring of One Hundred, the particular thyratron fed by the AND circuit 42 on which this coincidence is impressed will be caused to fire. Thus, if a dash is encountered in column 3 of the storage tube, for example, as the 12th row of stored data in that tube is being scanned for read-out, the third thyratron in the 12th row will be fired. In this manner a thyratron is firing for each dash sensed on the face of either of the tubes corresponding to the columnar position of such dashes. When a thyratron is fired, it energizes a punch magnet in the reproducer 46, thus causing a hole to be punched into a record card.

Since the row scanning is a serial operation taking place at the rate of 100 kc. the maximum difference between the first dash being sensed and the last being sensed is only 1 millisecond. There is now a time lapse before the record card reaches the 11 punching position so that regeneration of the data stored on the face of the tubes 22 and 24 must again take place.

When 11 punching time is reached, a punch operating impulse causes the punching operation described above to be repeated except that this time the beams of the cathode ray tubes will be vertically deflected and will be maintained in the 11 row of spots. The remainder of the card is punched row by row in a corresponding fashion. After the last row of holes is punched in the card, the tape unit is again started, a new unit record is read and stored on the cathode ray tubes, the tape unit is stopped, and the information read-out from the cathode ray tubes, and is punched into a card. This procedure will continue until the tape drive unit runs out of tape or the punch has exhausted its supply of cards.

*Component circuits*

Before proceeding with a more detailed description of the storage and conversion unit, it may be appropriate at this time to consider the nature and function of the electronic components used throughout the system. By reference to the overall circuit diagram, it will be seen that many components are repeated throughout the circuit. The description would be unduly labored if each of these components were to be described individually. Therefore, we shall, at this point describe one of each class of components in sufficient detail to render intelligent its function in the system. Thereafter, during the more detailed description of the overall system, no reference will be made to the specific nature of the component, it being then presumed that the nature and operation of the component is sufficiently understood.

Figure 3:
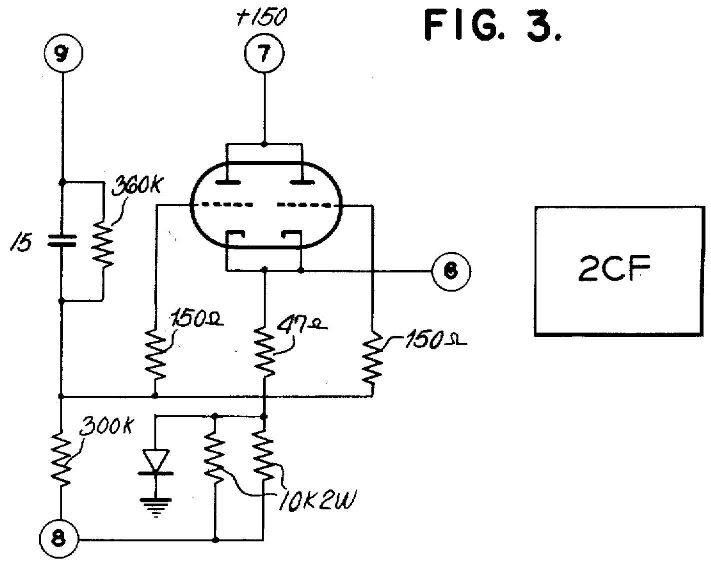
Fig. 3 illustrates both the block symbol and the detailed wiring diagram of a cathode follower adapted to accept a high impedance level signal and provide outputs of similar voltage at lower impedances.

*2CF.*—Figure 3 is a conventional cathode follower circuit which accepts as an input the high impedance level signal received from the logical AND and OR circuits and provides an output of a similar voltage but at a much lower impedance level to provide sufficient power to transmit signals through circuits having considerable losses. The input to the cathode follower is provided with a divider which adapts it to receive the high level signals from triggers, single shot multi-vibrators, or the like which normally provide signals between levels of +140 and +50 volts in this system. The divider, which has its lower end connected to −100 volts reduces the high level signals to the +10 volts and −30 volt levels required for diode switching. The cathode follower may be a type 12AV7 tube of which both halves are frequently employed. In the latter case, the symbol identifying the cathode follower when represented in block form is 2CF. For some applications, only one half of the type 12AV7 tube is employed. In this event the component will be identified merely by the letters CF. The number preceding the symbol CF indicates the number of half tubes employed in the circuit.

Figure 4:
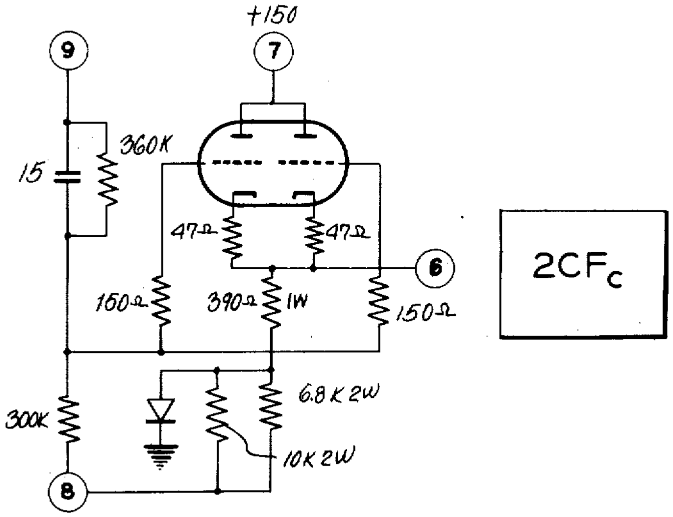
Fig. 4 illustrates both the block symbol and the detailed wiring diagram of a cathode follower similar to that shown in Figure 3 but having a lower cathode resistance.

*Cathode follower* ($2CF_c$)—Figure 4 is a cathode follower similar to the 2CF unit of Figure 3, differing only in the resistance of the cathode circuit which is somewhat lower. This makes it suitable for circuits requiring more power. It is however, only where a higher rating is needed for practical reasons because this circuit is less conservative in its use of the type 2AV7 tube.

Figure 5:
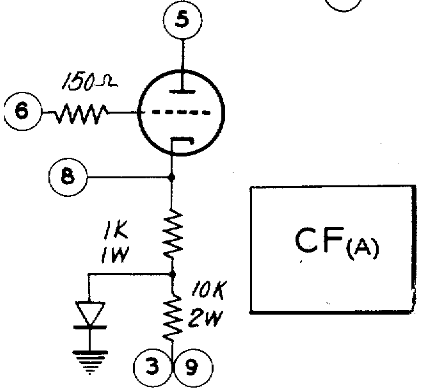
Fig. 5 illustrates both the block symbol and the detailed wiring diagram generally similar to that shown in Figure 3 but without an input divider.

*Special cathode follower* ($CF_a$).—This cathode follower circuit differs from the 2CF component circuit in that no input divider is provided. It is therefore adapted to receive the signal outputs of diode switching circuits and it acts as an impedance matching device to permit driving heavily loaded circuits without loading the diode switching circuits themselves. A $CF_a$ circuit such as this is illustrated in Figure 5.

Figure 6:
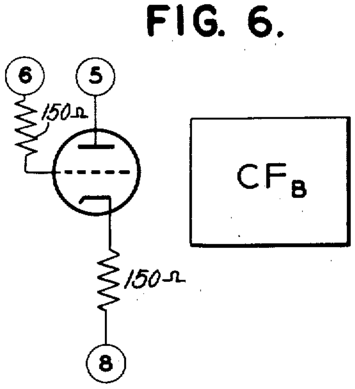
Fig. 6 illustrates both the block symbol and the detailed wiring diagram of a cathode follower which is designed for use with its output in parallel with the output of other cathode followers.
Figure 8:
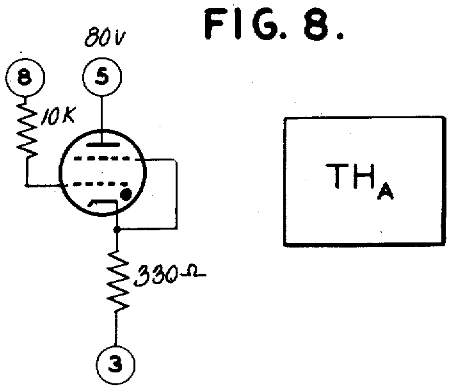
Fig. 8 illustrates both the block symbol and the detailed wiring diagram of a thyratron circuit normally used for energizing interlocking relays in the punch control circuits.

*Special cathode follower* ($CF_b$).—The cathode follower circuit of Figure 6 is a special circuit which is used only with its output in parallel with the output of another cathode follower or cathode followers. The $CF_b$ component differs from the standard cathode follower in that it does not have a cathode resistor connected to any power supply or to ground. It can, therefore, be paralleled with another cathode follower having a cathode resistor to form a cathode follower OR circuit without resulting in an unduly low value of common cathode resistor that might overload any individual cathode follower.

Figure 7:
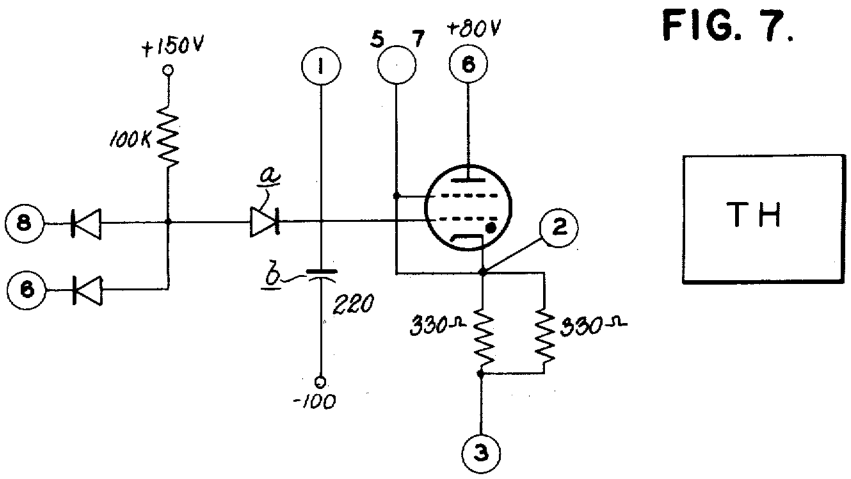
Fig. 7 illustrates both the block symbol and the detailed wiring diagram of a thyratron circuit utilized in the system for energizing punch magnets.

*Standard thyratron* (*TH*).—The thyratron circuits in this system which are utilized to energize the punch magnets, are as shown in Figure 7 and wherever they appear throughout the block diagram, the symbol TH will be used to identify them. This circuit includes a directly connected two input AND circuit plus a pulse stretching network to insure firing of the thyratron with the short pulses that are received at the input terminals of the diode AND circuit. In order to fire the thyratron and operate a punch magnet, it is necessary that simultaneous positive going pulses reach the input terminals 6 and 8. The resulting output pulse from the AND circuit proceeds through a diode to charge a capacitor connected to the number one grid of the tube. The tube may be a 2D21. Approximately 3 microseconds after the beginning of the signal, its level will return from +10 volts to −30 volts. The capacitor *b* and the number 1 grid will however, remain at +10 volts following the end of the input signal whose slow discharging rate is determined by the back resistance of the charging diode *a*. This maintains a positive voltage on the number 1 grid of the thyratron for a sufficient period of time to insure reliable firing.

*Special thyratron* ($TH_a$).—This special thyratron may also be a type 2D21 tube and the circuit is normally used for energizing interlock relays in the punching device from the normal electronic control signal levels. The electronic control signal at a normal high impedance level is applied to pin 8 of the circuit which is connected to the control grid of the thyratron. Normally this point is maintained at −30 volts, which does not permit the thyratron to conduct. A positive signal of +10 volts will fire the thyratron, causing the 80 volts supply connected to the plate through pin 5 to appear at pin 3 to pick up a relay connected thereto.

*Deflection output* (*DO*).—This circuit is a variation of a standard cathode follower circuit and is used between the deflection increment circuits and the cathode ray tube deflection plates. It is used as in impedance matching device to provide the necessary power for driving the long cathode ray tube deflection lines without loading the sensitive deflection circuits. It differs from other cathode followers used in the machine in that its cathode resistor is returned to ground rather than −100 volts because it always operates at a large positive voltage.

*Deflection increment circuits* (*BSΔ1, Δ2, Δ5, Δ8, Δ10,* $\Delta 10_2$*, and Δ15*).—The deflection increment circuits together with the block diagram identifying symbol in respect to each of them are illustrated in Figures 10 through 18. These circuits are similar to each other except in the value of the increment resistor which determines the current drawn by each unit. The increment unit is essentially a constant current switching device which is designed to draw a constant predetermined value of current when it is turned on. The complete deflection system includes a plurality of these increment switches connected in parallel so that they may be operated singly or in combination to draw predetermined amount of current through a common resistor. The resulting voltage drop in the resistor is then applied to the cathode ray tubes to finish the necessary beam deflection required to position the beams at the desired discrete locations on the face of each tube. In the respective figures illustrating these deflection increment circuits, the right half tube (which in each case may be a tube 12AV7) acts as a cathode follower where the grid is maintained at a constant potential of +87 volts. With the grid maintained at such constant potential, the current passing through the tube and through the cathode resistor will be primarily determined by the cathode resistor rather than by the tube characteristics. Thus the potential at pin 8, which is connected in parallel with other units to the common dropping resistor which is also the cathode ray tube deflecting voltage, may vary over a considerable range without appreciably affecting the current passing through the tube. In order to turn the switches off and therefore draw no current through the common dropping resistor, it is only necessary to raise pin 5 to a voltage greater than 87 volts. The left half of the tube then conducts, and acting as a common cathode follower, tends to raise the common cathode resistor to a voltage higher than 87 volts, which obviously cuts off the right half of the tube.

Figures 18, 19, 20:
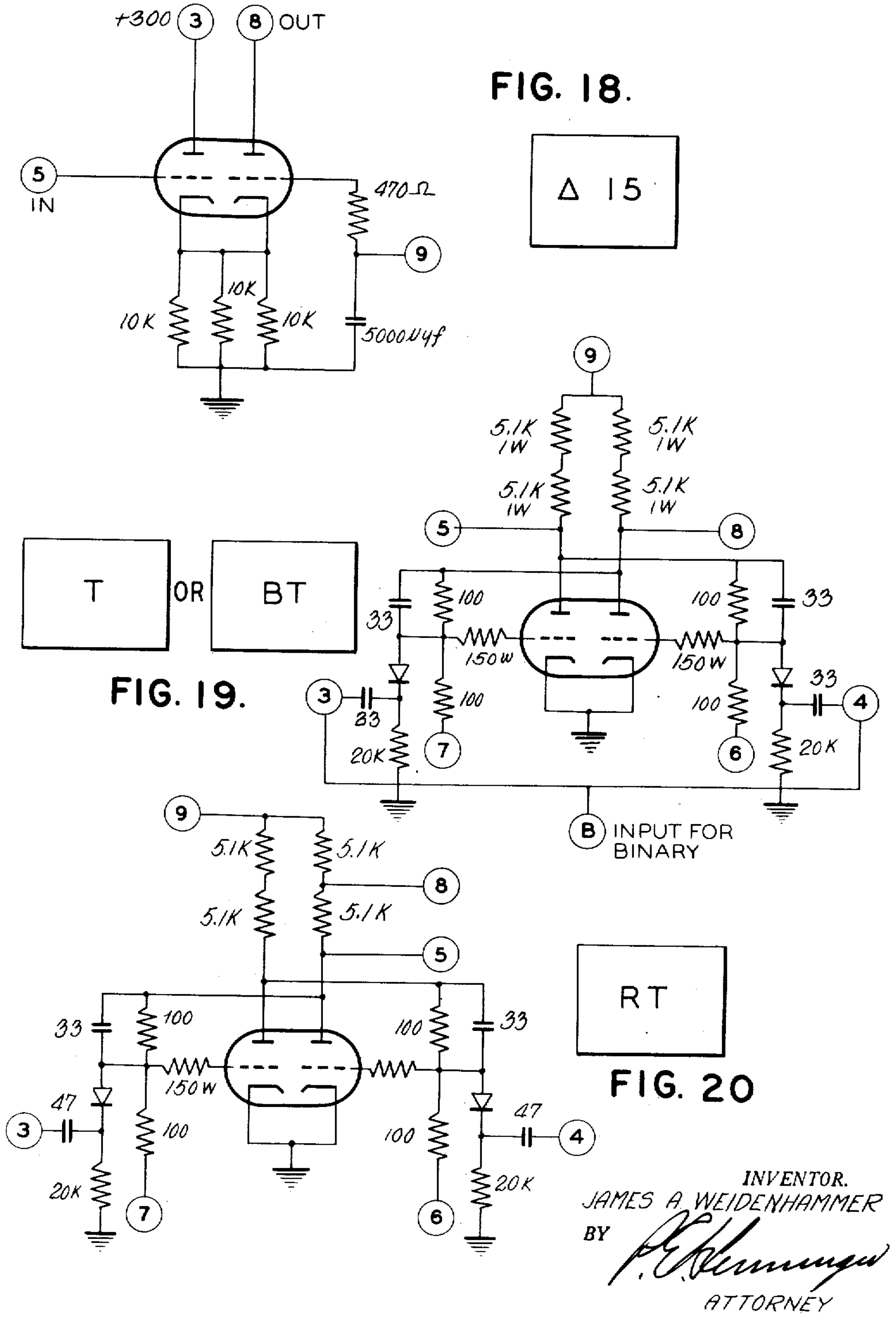
Fig. 19 illustrates both the block symbol and the detailed wiring diagram of an electronic trigger and suggests the modified input necessary to produce a binary trigger.
Fig. 20 illustrates both the block symbol and the detailed wiring diagram of a ring trigger which differs from the trigger of Fig. 19 in the output connections provided.

*Standard electronic triggers* (*T*) *or* (*BT*).—Figure 19 illustrates the standard electronic trigger used throughout the circuits. Wherever throughout the block diagram the symbol T is used within a block, it represents the circuit of Figure 19 with the exception to be noted herein below wherein the trigger is provided with a binary input in which event the symbol BT is employed. The trigger of Figure 19 is a bi-stable multi-vibrator; that is, it remains in either one of two stable states until it is forced by an external signal to assume the other state. This forcing action is called triggering or flipping. These triggers are sometimes referred to as "flip-flop" circuits. The bi-stable property of a trigger makes it useful as a storage device, registers, and counters. No dynamic pulses are needed to enable a trigger circuit to continuously store a bit.

Basically, a trigger circuit resembles two inverter circuits, each of whose plate outputs is coupled to the grid of the other circuit. In one stable state the left tube in Figure 19 is in full conduction while the right tube is cut off. In the other state the right tube is in full conduction while the left tube is cut off. To switch from one state to another an external signal must be applied to a sensitive point in the circuit. For example, it will be assumed that the right tube is conducting, the right plate is down; that is, its voltage is considerably less and +150 volts, while the left plate is up (near +150 volts). One method of flipping this circuit is to apply a negative pulse to the left plate. This negative pulse is coupled through the voltage divider to the right grid. Since the right tube is conducting its grid voltage is at zero; therefore, the negative pulse from the left plate causes the right grid voltage to go negative. This voltage shift causes the right tube to cut off, and consequently, the right plate voltage to rise. This rise is then coupled through another plate to grid voltage divider to the the left grid, pulling this grid voltage up toward ground. The left tube then begins to conduct, pulling its plate voltage down. This shift at the plate of the left tube is in the same direction as the shift applied from an external source; therefore, the initial action is reinforced, and regeneration continues the voltage trends just initiated. When the left grid voltage reaches ground, it will rise no further and the left plate voltage will fall no further. Also the right grid will be pulled far enough negative by the fall of the left plate voltage that the right tube will be cut off, and its plate voltage will be near +150 volts. The resultant condition is then the second stable state into which the trigger may be flipped. The input pulse can now be removed without re-flipping the trigger because the conduction of the left tube holds the left plate voltage down.

The trigger can also be flipped by applying a positive pulse to the down grid (the one corresponding to the cut off tube) or by applying a negative pulse to an up grid (the one corresponding to the conducting tube). In any case, an input pulse must initiate a regenerative action to cut off the conducting tube and bring the non-conducting tube into full conduction.

In the standard trigger the input pulses are applied to the pins 3 or 4 so that a pulse applied to a particular one of these pins is required to change the status of the trigger. Some triggers, as is the case in the present system, are fed by a binary input whereby each pulse fed into the trigger results in a change of status. Thus in Figure 19 the dotted line interconnecting pins 3 and 4 represents a binary input to the trigger circuit. Throughout the system diagrams wherever the symbol BT appears in connection with a block representation of a trigger, such circuit constitutes a standard trigger with a binary input. In a binary trigger any pulse applied to the input B will be impressed on both the input pins 3 and 4 so that no matter in which state the trigger is disposed, the state thereof will be reversed.

*Ring trigger (RT)*.—Figure 20 illustrates the detailed circuit and the block symbol for a ring trigger which differs from the standard trigger only in the output connections provided. Owing to limitations of all available pins in the pluggable units into which these triggers are embodied, it is not possible to provide one universal trigger which will supply all of the output signals required. Therefore the ring trigger of Figure 20 differs in that a tapped output is provided which is more suitable for driving other triggers in a ring than the four outputs normally supplied from the standard trigger.

Figure 21:
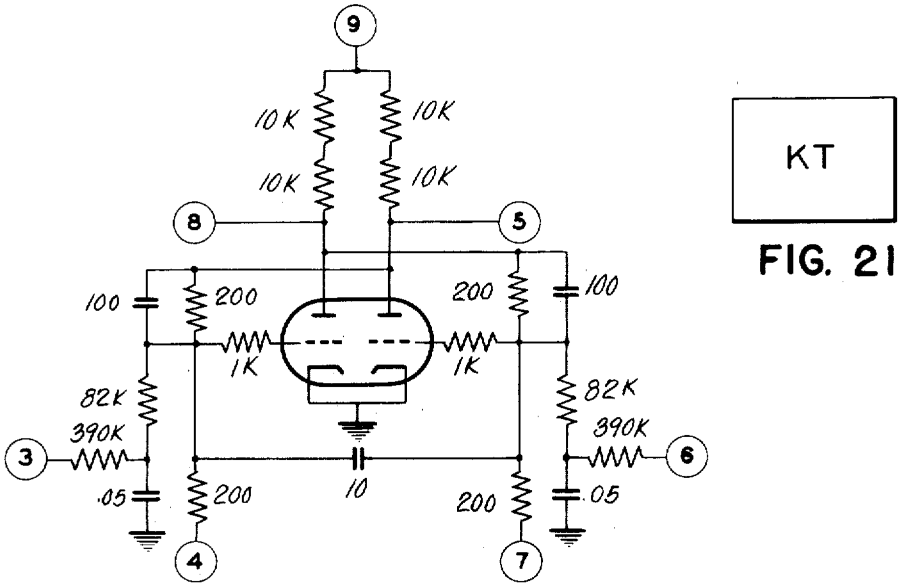

*Key trigger (KT)*.—Figure 21 shows the detailed circuit and the block symbol for a key trigger. Key triggers are used primarily for producing pulses with smooth wave fronts from input pulses which are very likely to contain ragged wave fronts. The operation of circuit breakers tend to produce transients because of imperfect contact or switch bounce. Key triggers are usually employed where it is necessary to accept input pulses through such devices. The key trigger is operated by feeding a driving voltage through a series resistor to one or the other of the grid inputs. The input to the key trigger is an integrating circuit composed of two series of resistors and two shunt capacitors. Integrating action helps to produce a smooth pulse which promotes positive triggering action if the input pulse remains long enough; therefore, the integrators help prevent transients from affecting the key trigger. Capacitor coupling between grids also desensitizes the key trigger to transients. The plate voltage swing is from about +135 to +30 volts and the grid voltage swing is from ground to about −30 volts. The integration time of the key trigger is about nine microseconds, and the rise time is about 0.2 microseconds.

Figure 22:
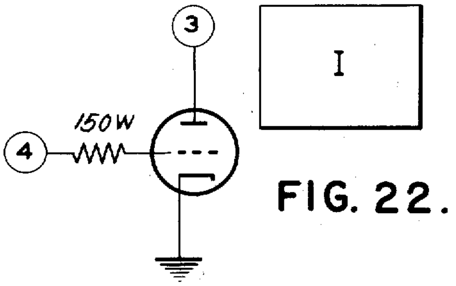
Fig. 22 illustrates both the block symbol and the detailed wiring diagram of an inverter which accepts low level switching signals and is without a plate resistor.

*Standard inverter (I)*.—The inverter shown in Figure 22 together with its identifying block may be one half of a type 12AV7 tube. The inverter is a circuit that produces a negative shift at its plate when a positive shift is applied to its grid and a positive shift at the plate when a negative shift is applied to the grid. This property makes it useful in inverting logical conditions. The inverter is also a convenient component in that it amplifies the signals and thus it is useful in setting signal levels. The inverter is designed to produce pulses having short rise and fall times. Although the plate load resistor is large enough to give a large voltage, it is not large enough to appreciably slow down the signal transitions. The inverter may have one of three standard inputs. The inverter accepts the low level diode switching signals as an input, but has no plate resistor. It is therefore adapted primarily for use as a trigger pull at over device, its plate being connected directly to a desired trigger plate.

Figure 23:
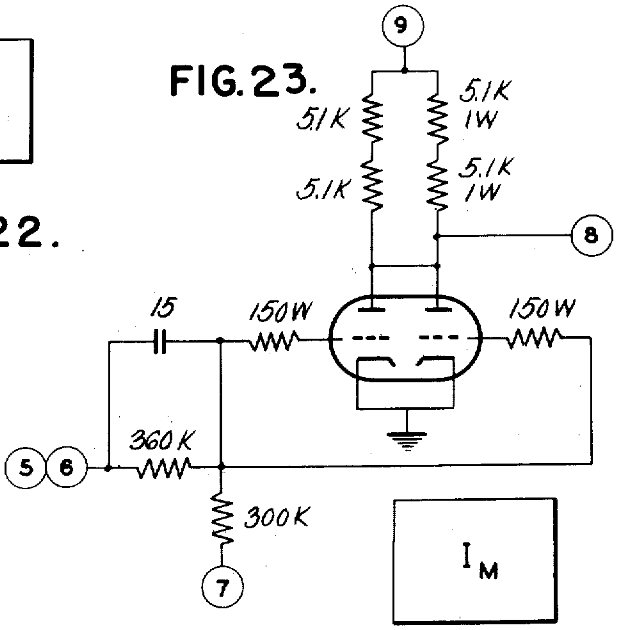
Fig. 23 illustrates both the block symbol and the detailed wiring diagram of a special inverter adapted for use with multivibrator outputs.

*Special inverter ($I_m$)*.—The inverter illustrated in detail in Figure 23 together with its block diagram signal is especially adapted to be used with the multi-vibrator output in the timing circuit herein. Several of these inverters are used to provide more rapid rise times than are available directly from the multi-vibrator itself. This inverter is provided with an input divider which accepts the high level signals normally provided by the multivibrator and reduces them to the +10 volt and −30 volt limits desirable in connection with the grounded cathode.

Figure 24:
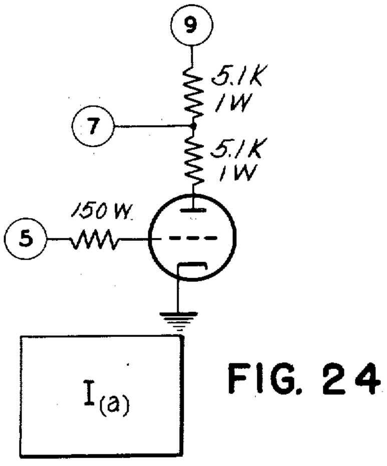
Fig. 24 illustrates both the block symbol and the detailed wiring diagram of a special inverter adapted to impulse triggers from low level input signals.

*Special inverter ($I_a$)*.—Figure 24 is the detailed circuit and the block symbol for a special inverter used in the circuits when it is desired to transfer a trigger with a signal from a diode switching circuit. This inverter has no input divider and therefore accepts the low level diode signals directly. Its output is a tapped output which is particularly suitable for switching triggers. A full output, which would provide a 90 volt swing, has a tendency to overdrive a trigger and cause delayed triggering.

Figure 25:
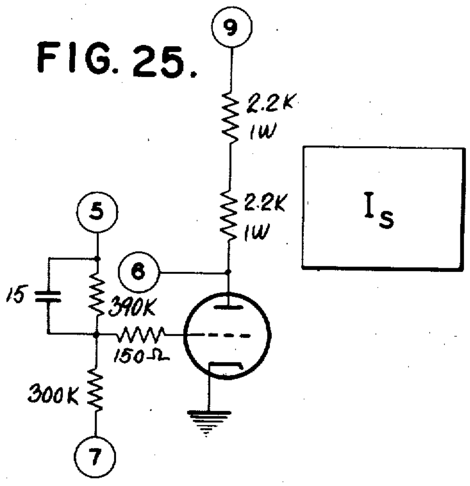
Fig. 25 illustrates both the block symbol and the detailed wiring diagram of a special inverter having a divider input for use with high level signals.

*Special inverter ($I_s$)*.—Figure 25 is the detailed circuit and the block symbol of a special inverter identified in the circuit diagram by the character $I_s$. This inverter has a divider input for use with diode switching signals and is particularly intended for applications requiring very fast rise and fall times. It therefore uses a type 5687 tube and a low value plate resistor as well as capacitor compensation in the input divider.

Figure 26:
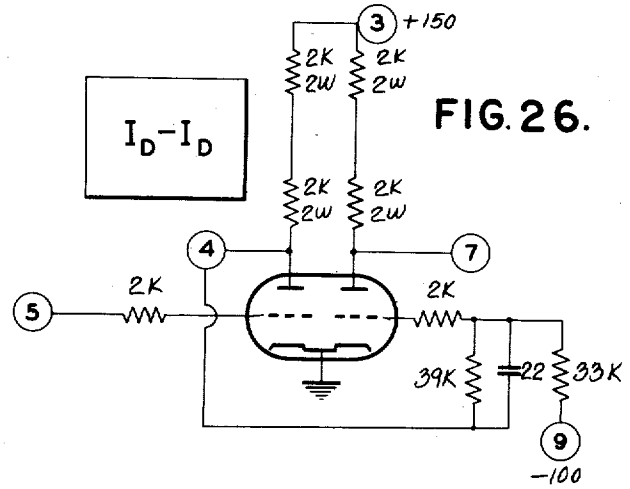
Fig. 26 illustrates both the block signal and the detailed wiring diagram of a special inverter having a pair of inverse outputs.

*Special inverter ($I_D$—$I_D$)*.—Figure 26 is the detailed circuit and the block diagram identifying symbol for a special inverter used herein which accepts diode switching signals and has two outputs, one of which is always the inversion of the other. These inversion outputs are of suitable value and impedance level to be applied directly to the input of the deflection increment units. The inverse outputs are used to provide the desired push-pull action at the cathode ray tube deflection plates.

*Diode coincidence or AND (AND) and OR (OR) circuits*.—Diode AND and OR circuits find very extensive use throughout the control circuits hereof. AND circuits and OR circuits are crystal diode switching circuits used in the system for gating and isolation purposes. They may have two or more inputs each, but only 1 output.

Figure 28:
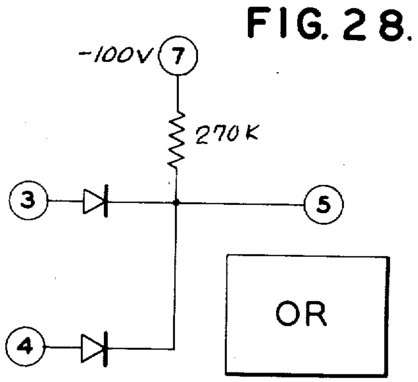
Fig. 28 illustrates both the block symbol and the detailed wiring diagram of an OR circuit having a pair of inputs.
Figure 27:
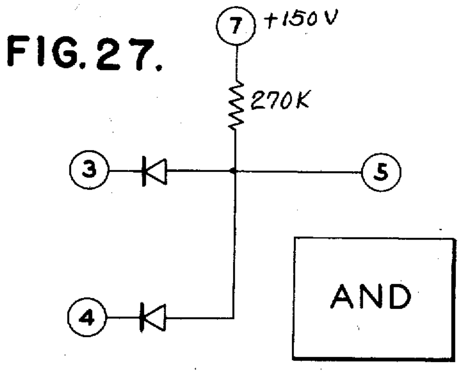
Fig. 27 illustrates both the block symbol and the detailed wiring diagram of a diode coincidence AND circuit.

The AND circuit of Figure 27 and the OR circuit of Figure 28 are plus AND and plus OR circuits respectively. These circuits are characterized by the fact that the inputs are effective through diodes which may comprise germanium diodes of standard make such as Sylvania D436A or D437A, to produce a +10 voltage output. The plus AND circuit has the logical property that all the input lines must be positive to produce a positive output. That is, the first input and the second input and all other inputs must be positive for a positive output. A plus OR circuit has the logical property that if one or another or any number of input lines is positive, the output line will be positive. These circuits are called plus AND or plus OR circuits because they pass positive signals when acting as switches.

Figure 29:
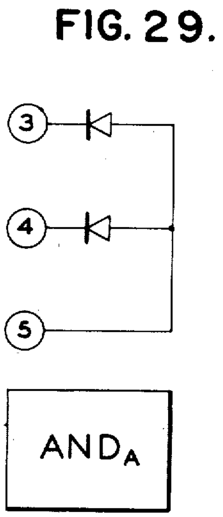
Fig. 29 illustrates both the block symbol and the detailed wiring diagram of a two way AND circuit without load resistor.
Figure 30:
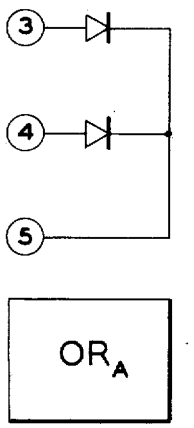
Fig. 30 illustrates both the block symbol and the detailed wiring diagram of an OR circuit which is in essence the same as the AND circuit of Fig. 29.

*Special AND circuit ($AND_a$) and special OR circuit ($OR_a$).*—Figures 29 and 30 illustrate respectively a special AND circuit and a special OR circuit together with their identifying block diagram signals. These circuits are the same as the circuits in Figures 27 and 28 respectively with the exception that they are without a load resistor. The circuits are therefore adapted to be used in parallel with other AND circuits or other OR circuits, respectively, which include a load resistor.

Figure 31:
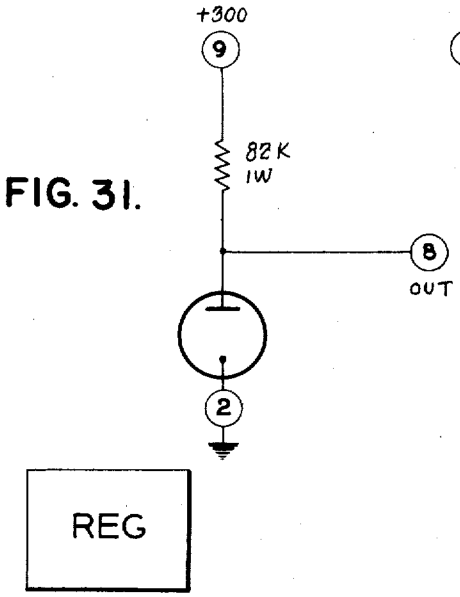
Fig. 31 illustrates both the block symbol and the detailed wiring diagram of a voltage regulator.

*Voltage regulator (REG).*—Figure 31 is the detailed circuit and the block symbol identifying character for a voltage reference circuit using a dropping resistor in conjunction with a type 5651 tube to provide a constant 87 volt level for use in the increment switches of the deflection circuits.

Figure 32:
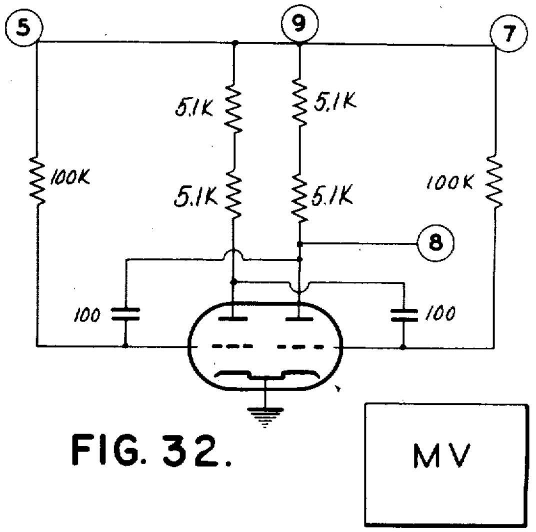
Fig. 32 illustrates both the block symbol and the detailed wiring diagram of a multi-vibrator.

*Multi-vibrator (MV).*—Figure 32 shows the detailed circuit and the block symbol diagram symbol of a multivibrator used in the system as a time for producing 100 kc. timing pulses. The tube employed may be a type 6J6. This circuit resembles a standard trigger circuit, except that there is no resistance coupling from one plate to the opposite grid. When the circuit is first turned on, unbalance in the components will cause one tube to conduct more than the other. The fall of its plate will cause the opposite grid to fall and start to cut off the other tube. The plate of the other tube, in rising, will cause the first tube to draw more current. This triggering action continues until the first tube is conducting heavily, and the other is fully cut off. Since there is no resistance coupling to the down-grid from the up-plate, but since there is resistance coupling to the input voltage supply through the timing resistance, the down-grid will rise exponentially as the coupling-capacitor is discharged through the timing resistor and the conducting tube. When this grid reaches such a value that the off-tube begins to conduct, the circuit will flip to the opposite conditions because of the regenerative action mentioned above. Since the circuit is symmetrical, this action repeats continually at a rate determined by the magnitude of the negative shift on the grids and the value of timing resistance and capacitance.

Figure 32A:
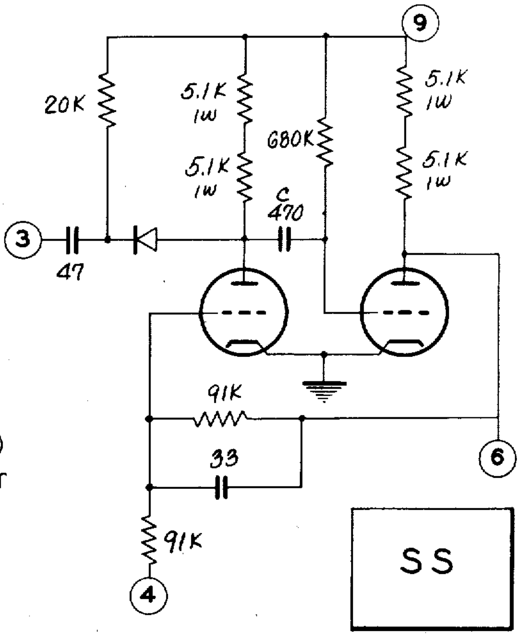
Fig. 32A illustrates both the block symbol and the detailed wiring diagram of a single shot multi-vibrator.

*Single shot multi-vibrator (SS).*—Figure 32*a* is the detailed circuit and also the block diagram symbol for the single shot multi-vibrator used throughout the system. This circuit is used to generate gates or pulses of specified duration and to provide delays. A single shot multivibrator resembles a trigger circuit in that it may be flipped into a certain state, but it then returns to its previous state in a predetermined time without being pulsed from an external source. Its normal state may be referred to as its stable state and its abnormal state may be referred to as its quasi-stable state, for it remains stable in this latter state until its predetermined time period has elapsed. In the stable state the left tube is cut "off" and the right tube is conducting heavily.

The most common method for firing a single shot multi-vibrator is by plate pull-over. When using plate pull-over the left plate of the single shot is connected to the plate of a pull-over inverter, the load resistor for the left plate also acting as the load resistor for the pull-over inverter. The duration of the single shot output pulse is largely dependent upon the discharging time of the capacitor connected between the left plate and the right grid. The resistance and capacitor may be varied to determine the duration of the pulse and therefore they are called the timing resistor and the timing capacitor. The larger the resistor and the capacitor the more time is required for the right grid voltage to rise. The single shot multi-vibrator may embody a 12AV7 type tube.

*Detailed circuit description*

The foregoing description of the essential characteristics of the components used in the circuit are believed sufficient to permit an understanding of the function of these components in the circuit so that in the following description it should be unnecessary to refer to the component operation in any particular detail. With this preliminary it is therefore possible to go ahead with a more particular description of the overall circuit as depicted principally in block form in Figures 33 through 47.

*Input from tape reading unit.*—It was previously mentioned that the information stored on the magnetic tape is disposed on the tape in seven tracks in the form of magnetic spots. A particular character will be present in a substantially straight line across the tape tracks, perpendicular to the direction of the length of the tape. The magnetic reading unit consists of seven reading heads aligned in a straight line so that the seven tracks are read simultaneously. The impulses from the reading heads are suitably amplified by the amplifiers in the tape drive unit and are delivered to the electronic conversion unit as positive 40 volt pulses. The specific construction of the tape reading heads and of the system for amplifying the pulses picked up by the heads does not form a part of this invention and will not be described in particular herein.

Figure 35:
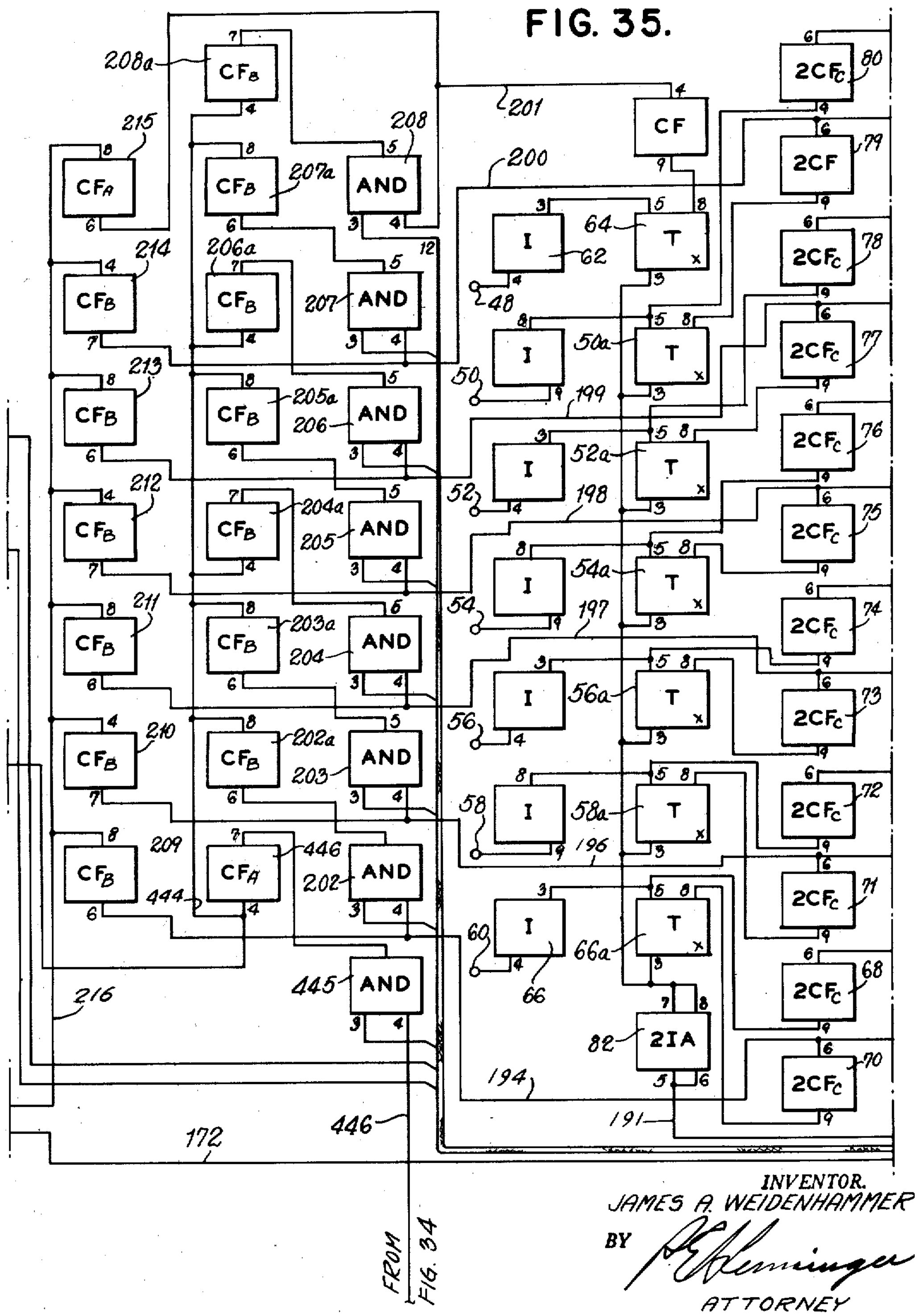

The impulses from the tape pulse amplifying system are fed to the electronic conversion system inputs 48, 50, 52, 54, 56, 58 and 60 (Fig. 35). If no signal is received from the tape in a particular track that input terminal will be at −30 volts. The terminals accepting input from tape tracks in which a signal is present will, however, be at +10 volts.

The information on the tape is written in the Excess Three Code. Accordingly, four of the tracks on the tape contain the numeric information of the binary 1-2-4-8 code. Two of the tracks carry the zonal information necessary for alphabetic characters. These latter are designated the 0-1 and the 1-0 tracks. The remaining track is utilized to carry a redundancy check bit used for checking the total number of bits appearing across the type at any given point in accordance with the well-known redundancy check principle. The Excess Three Code will be explained hereinafter when the subject matter of the decoding matrix is disclosed.

*Trigger storage register.*—The pulses representing bits arriving on the input channels 48 through 60 pass through inverters 62, etc., the output of each one effectively fires an associated trigger 64, one such trigger being provided for each input line and together constituting a storage register. The storage register comprising the triggers 64 etc., is provided for the purpose of temporarily storing the bits of information from one or more of the seven tracks on tape for a short period of time so that signals arriving late due to electrical or magnetic skew will not be lost. The trigger register is adapted to simultaneously transfer bits registered therein to the decoding matrix as required by these matrixes.

Skew is the result of either mechanical or electrical maladjustment of tape-to-reading-head and it results from somewhat serially reading the several spots in any of the seven tape tracks as the tape passes under the reading heads, whereas in the ideal situation all spots in any of the seven tracks are read simultaneously.

In Figure 35 the input channel 48 receives the redundancy bit, the channel 50 receives the zonal information 1-0, used when the 12 or the 11 hole is to be punched into a record card.

The input channel 52 is the 0-1 zone channel, used when the 12 or the 0 hole is to be punched into a record card, the input channel 54 is the "1" channel, used to indicate "1" in the 1-2-4-8 code, channel 56 is the "2" channel, used to indicated a "2" in the 1-2-4-8 code, channel 58 is the "4" channel, used to indicate the "4" in the 1-2-4-8 code, and the channel 60 is the "8" channel, used to indicate the "8" in the 1-2-4-8 code.

If a bit of information is stored on the magnetic tape in any of the channels, the signal originated from the tape reading head is presented to the proper input channel 48 through 60 as a positive pulse. If an "8," for example, is stored on the tape, a positive pulse will arrive at the input channel 60 and this will drive the associated inverter 66 into conduction. Each inverter uses the plate load resistor of the left half of the trigger part of the triggers 64 etc. to which it is connected. The triggers constituting the register are reset so that the side indicated by the *x* in the block representation thereof in Figure 35 is conducting. Thus, the fact that inverter 66 was rendered fully conducting will cause the plate voltage of the non-conducting side of the trigger 66 to be decreased to a point where conduction in the trigger pair is transferred to the left side.

A pair of cathode followers 68 and 70 are connected to the plates of the trigger 66*a* so that the diode matrix does not load the trigger pair. As a result of the storage of the "8," the D. C. potential of the output of the cathode follower 68 will be −30 volts and that of the cathode follower 70 will be +10 volts. The information originally read from the tape is stored in the trigger pairs 64, 50*a*, 52*a*, 54*a*, 56*a*, 58*a*, and 66*a*. The D. C. potentials of the outputs of the cathode followers 68, 70, 71, 72, 73, 74, 75, 76, 77, 78, 79, and 80 are connected to the diode conversion matrix and reflect the status of the storage triggers just discussed. The conversion matrixes are shown in Figures 36 and 37 of the drawing.

All of the storage triggers (Fig. 35) in the register are reset before each character is received. This resetting is achieved through a pulse supplied through an inverter 82. The inverter 82 is operated by a pulse from a timing ring at the time that the ring starts its cycle. Thus, the triggers are reset 100 times during the receipt and storage on the cathode ray tubes of a unit record.

Figure 36:
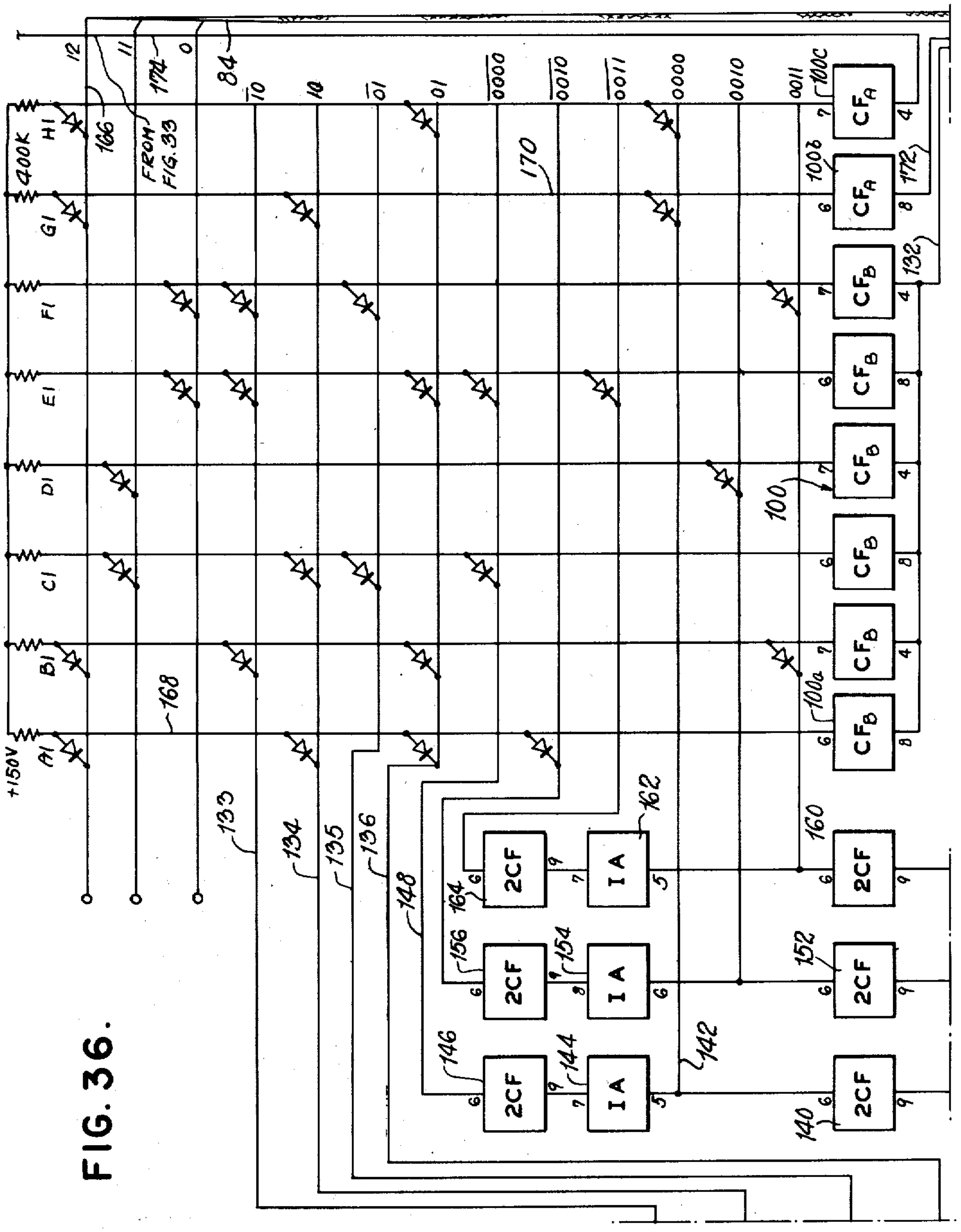
Figure 37:
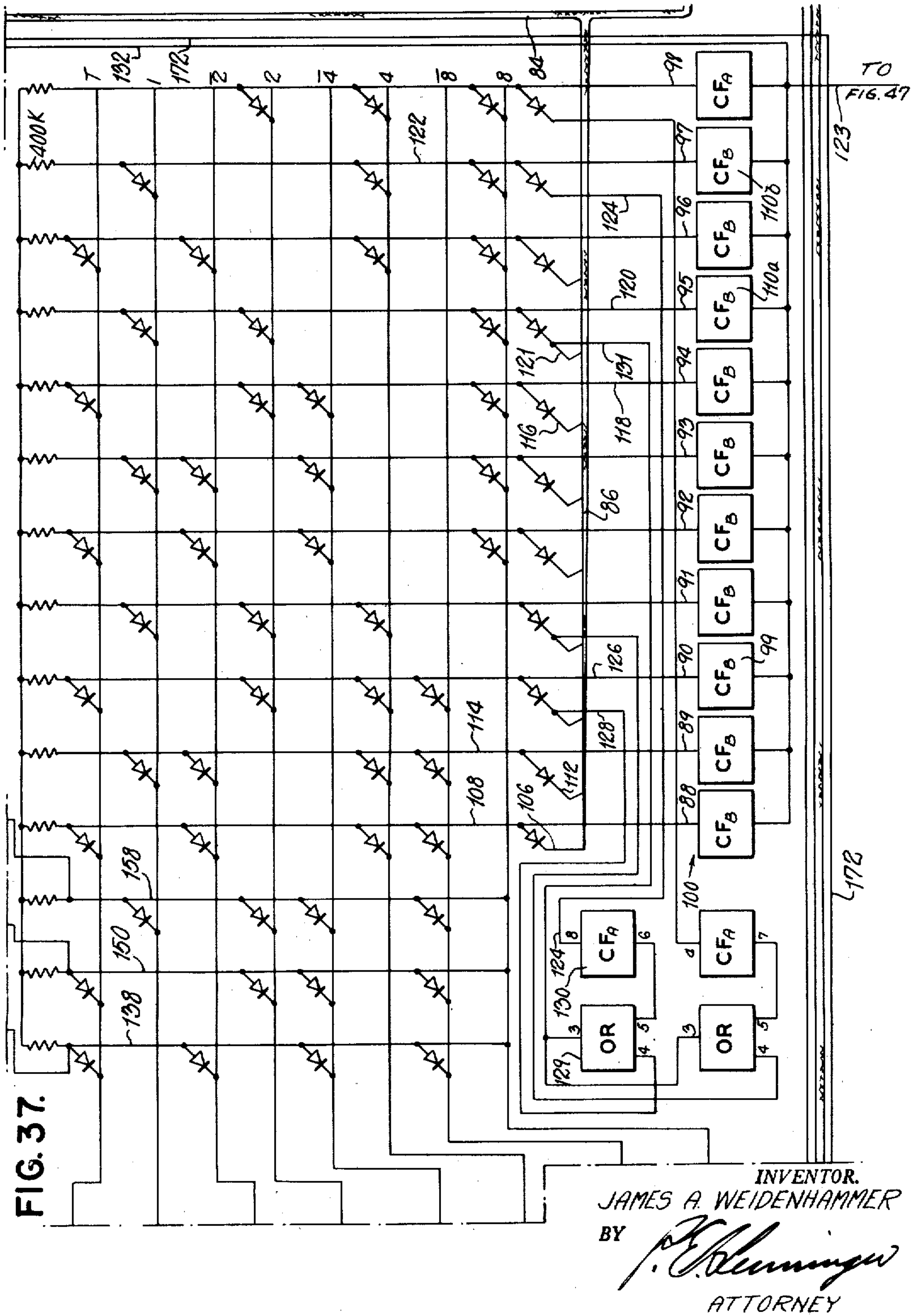

*Decoding matrix.*—The decoding matrix of Figures 36 and 37 is provided to convert the information originally received from the 7 tracks of the tape, now stored in the trigger register (Fig. 35), to a series of timed pulses representing the conventional Hollerith Code used for the punching of record cards. The matrix output is used to store the information on the face of the cathode ray tubes. As noted before, the Hollerith Coding may contain numerical or alphabetical information as well as any of the special characters.

The cathode followers 68 through 80 simultaneously present the stored information to the diode matrix by way of the magnitude of their particular cathode voltages. The matrix converts the simultaneously applied Excess Three Code outputs to a set of twelve simultaneously appearing outputs representing the Hollerith Code. Because of the fact that the Hollerith Code must be read into the cathode ray storage tubes in serial form, the serial outputs of the matrix must be converted to a timed serial representation. This is accomplished by sequentially interrogating each output to determine whether or not a signal is present thereon. An AND circuit is used at each output such that an output signal will be given upon coincidence of an input from the matrix and a pulse from the timing ring. The timing ring is the Ring of Thirteen shown in Figure 38 and this ring is also used to control the vertical deflection of the cathode ray beams so that the serial representation will correspond to the various positions of the beams in a given column on the cathode ray tubes.

*Excess Three Code to Hollerith Code.*—Figure 48 is a table showing the correlation between the Hollerith Code and the Excess Three Code. The Excess Three Code comprises six binary digits of information whereby combinations of these digits may be used to represent characters. The first two digits, as noted above, are used for zone representation in the coding of alphabetical characters, and the last four digits are used to represent numerical characters, all as noted above. The conversion from the two zones of the Excess Three Codes to the three zones of the Hollerith Code can be seen from Figure 48 to be as follows, where a 1 indicates the presence of a signal and a 0 indicates the absence of a signal:

Excess three binary zones:

| | Hollerith Zones |
|---|---|
| 1–1 | 12 hole. |
| 1–0 | 11 hole. |
| 0–1 | 0 hole. |
| 0–0 | Numeric. |

The last four digits of the binary code represent the figures 8-4-2-1 such that the numeric 11, for example, is made up of the combination 8-2-1. A numeral in the Hollerith Code is represented in the Excess Three Code by adding "3" to the Hollerith representation. For example, an "8" in the Hollerith Code is represented in the Excess Three Code as "11." In like manner where the letter B is represented as a 12 zone hole and a 2 hole in the Hollerith Code, it is indicated by a 1-1 zone and 4-1 (or 5) in the Excess Three Code.

Thus it can be stated that two operations are necessary when converting the Excess Three Code to the Hollerith Code. First: the zonal information must be converted from one zone to the other. Second: the numeric information must be converted from the 8-4-2-1 representation to a single digit with a value of 3 less than that given by the 8-4-2-1 representation of the Excess Three Code.

*Diode conversion matrix*—The conversion matrix is in effect a pair of matrixes, one of which is illustrated in Figure 36 and the other of which is illustrated in Figure 37. The matrix of Figure 36 effects the conversion of zonal information from the Excess Three Code to the Hollerith Code, while the matrix of Figure 37 effects conversion of the numeric data presented in the Excess Three Code.

Each of the matrixes is composed of diode AND circuits so connected that a particular combination of inputs will give a particular output. The input to the matrix must indicate the absence of a digit as well as its presence. A cathode follower is connected to each plate of the storage triggers (Fig. 35), as stated, so that an output of +10 volts from such cathode follower, cathode follower 68 for example, will indicate the absence of a character, while an output of +10 volts from the cathode follower 70 will indicate the presence of a character in that channel.

The cathode followers which are fed by the register triggers are connected to the zonal matrix so that their outputs are fed into the horizontal elements of the matrix network. The other major input to the matrixes is the output of the vertical deflection ring timer i. e. the Ring of Thirteen (the unit 18 in Figure 1 and more particularly shown in Figure 38). This timing ring has twelve outputs corresponding to the twelve index point positions of a record card column. The outputs are conditioned one at a time in the order in which a card is ordinarily read, i. e., the 12 index point position first. The 12, 11 and 0 outputs of the Ring of Thirteen enter the zonal matrix through a cable 84. The 1 through 9 outputs from the Ring of Thirteen enter the numerical matrix through a cable 86. The AND circuits of the matrices are so arranged that a pulse from the timing ring is a necessary part of the coincidence that produces an output from the conversion matrix. The Hollerith Code output 1, 2, 3, 4, 5, 6, 7, 8, 9, 8/3, 8/4, are connected to terminals 88, 89, 90, 91, 92, 93, 94, 95, 96, 97, and 98 respectively. These output terminals each (Fig. 37) feeds into a cathode follower of a group of cathode followers 99.

The outputs of the zonal matrix (Fig. 36) connect to the grids of a similar set of cathode followers 100. The operation of the AND circuits used in the two conversion matrices of Figures 36 and 37 can best be explained by reference to Figure 49. Considering any one of the conductors, 101, 102, and 103, a coincidence of all of the inputs connected to that conductor through diodes must occur before the grid of the cathode follower also connected to that particular column will be raised sufficiently to cause an output of +10 volts to appear on the output line 104. The inputs A, B and C and the timing ring inputs TR will be either −30 volts or +10 volts. If the inputs A and B are at +10 volts and the input C is at −30 volts, an output pulse of +10 volts will appear on the output conductor 104 when a timing pulse is applied to the conductor 101. The application of a timing pulse to conductors 102 and 103 in succession, after its application to the conductor 101, will not produce output pulses since the input C is maintaining both conductors at −30 volts.

*Conversion in the matrix.*—In describing the operation of the matrices of Figures 36 and 37, reference will be made to the numerals appearing in a column at the right of the matrices. These numbers indicate the cathode followers to which the horizontal conductors of the matrix are connected. Thus, the number "8" represents the horizontal conductor of the matrix which will be at a D. C. voltage of +10 volts when an "8" is present on the tape. The number "8" at the second position from below represents the fact that no "8" is present in the tape word being read.

Suppose that the six digit binary word 0-0-1-0-1-1 were read from the tape, and considering only the numeric portion of the word, i. e. the last four digits, the numerical matrix (Fig. 37) would receive the following inputs which would be at +10 volts.

8=an 8 present
$\overline{4}$=no 4 present
2=a 2 present
1=a 1 present

The remaining inputs under these conditions will be at −30 volts. The timing ring pulses are now applied through the cable 86 at a rate of 100 kc. A timing pulse is first applied through a conductor 106. A conductor 108 which terminates in the output terminal 88 is connected to the horizontal conductors $\overline{8}$, 4, $\overline{2}$ and $\overline{1}$ through diodes. Since all these conductors are at −30 volts, the D. C. level of the grid of a cathode follower 110 into which the line 108 feeds cannot be raised to cause conduction.

A timing pulse is next applied through a conductor 112. Since one or more of the horizontal lines of the matrix, connected through diodes to the conductor 114, is at −30 volts, an output will not occur. This process continues until each vertical conductor of the matrix has been interrogated.

At the time a timing pulse is applied through a conductor 116, it will be seen that all of the horizontal conductors connected to the conductor 118 through diodes are at +10 volts except the $\overline{1}$ conductor which is at −30 volts. Thus, an output will not occur.

However, all of the horizontal conductors connected through diodes to a vertical conductor 120 are at a potential of +10 volts. Thus the application of a +10 volt timing pulse through the conductor 121 will cause the conductor 120 to be raised to +10 volts. Since the output terminal 95 of the conductor 120 is now at +10 volts, its connected cathode follower **110*a* will emit an output pulse of +10 volts which is impressed on a conductor 123. By checking the remainder of the numerical matrices in the manner described, it will be seen that no other output pulses will occur. All the output pulses from the cathode followers of the group 110 will be applied to the conductor 123** in a timed sequence and there distributed throughout the system from this conductor.

In order to consider all of the operating components of the numerical diode conversion matrix of Figure 37, an example will be cited whereby the output on the conductor 123 will correspond to the 8 and 3 holes in a record card (the 8 and 3 holes represent the "#" in the Hollerith Code).

The representation of the 8 and 3 hole of the Hollerith Code in the Excess Three Code is the binary number 0-0-1-1-0-1. The inputs to the numerical matrix for this number must be at +10 volts are the following:

8=an 8 present
4=a 4 present
$\overline{2}$=no 2 present
1=a one present

The remaining inputs will be at −30 volts.

By considering the various possibilities, it can be seen that the only vertical conductor that can be raised to +10 volts is the conductor 122. The conductor 122 can be raised only if the conductor 124 is at +10 volts. At 3 time a timing pulse of +10 volts is applied from the Ring of Thirteen (Fig. 38) by way of the cable 86 to the matrix through a conductor 126. This pulse is applied by way of a conductor 128 to an OR circuit 129. The OR circuit 129 drives a cathode follower 130 into conduction so that +10 volts are applied to the conductor 124. The fact that the 8, 4, and 1 horizontal conductors are at +10 volts coupled with the fact that the conductor 124 is also now at +10 volts causes the conductor 122 to be raised to +10 volts. Consequently +10 volts will be applied to the cathode follower **110*b* causing conduction to occur so that an output pulse will appear on the conductor 123. Thus, a pulse corresponding to the 3 hole in the card has appeared on the conductor 123**.

At 8 time in the cycle a timing pulse of +10 volts is applied to the matrix through the conductor 121. This pulse is applied to the OR circuit 129 by way of a conductor 131. The OR circuit 129 will transmit the pulse to drive the cathode follower 130 into conduction, thereby raising the conductor 124 to +10 volts. This in turn raises the conductor 122 to +10 volts once again. Thus the cathode follower **110*b* conducts and produces an output pulse on the conductor 123 at 8 time. The overall result has been a "3" pulse and an "8" pulse in a timed sequence on the conductor 123**, corresponding to the 8 and 3 index point in a record card.

An example of the operation of the zonal matrix of Figure 36 will render the function thereof clear. As stated before, the zonal matrix (Fig. 36) is composed of various multiinput AND circuits feeding a series of cathode followers 100. All of the cathodes of the cathode followers 100 are tied together and are connected to the output conductor 123 by way of a line 132. An introduction to this circuit has been rendered in the description of Figure 49. The two zonal channels 50 and 52 from the tape heads enter the zone matrix at terminals 133, 134, 135 and 136. At the right of the matrix these horizontal conductors are identified by whether or not information is present on any of the lines involved. Thus, the $\overline{1\text{-}0}$ indicates that no information is present in the input channel 50, 1-0 indicates that a signal is present in the input channel $\overline{\mathbf{50}}$, $\overline{0\text{-}1}$ indicates that no information is in the input channel 52, and 0-1 indicates the presence of a signal in the input channel 52.

Before proceeding with this third example it appears necessary to consider the six horizontal matrix channels labeled $\overline{0000}$, $\overline{0010}$, $\overline{0011}$, 0000, 0010, and 0011, which are fed through cathode followers by the numeric matrix of Figure 37.

There are several binary words in the Excess Three Code which have no meaning in the conventional Hollerith Code, namely: 0-0-0-0 is equal to 0 in the Excess Three Code, 0-0-0-1 is equal to 1 in the Excess Three Code and 0-0-1-0 is equal to 2 in the Excess Three Code. Advantage is taken of this fact, and these numbers are combined with the various zones to indicate such devices as field marks, record marks, and tape marks. The indications just mentioned are used to control some operations of the system such as starting and stopping the tape drive unit, for example, as to be explained more particularly hereinafter.

If the binary number 0-0-0-0 were presented to the numerical matrix (Figure 37) the inputs $\overline{1}$, $\overline{2}$, $\overline{4}$, and $\overline{8}$ would be at +10 volts. Therefore the vertical conductor 138 (Fig. 37) would be raised to +10 volts. This would serve to drive a cathode follower 140 into conduction so that the output on line 142 would be raised to +10 volts, thus raising of the horizontal matrix conductor 0-0-0-0 (Fig. 36) to +10 volts. At the same time the cathode follower 140, by virtue of its high output voltage drives an inverter 144 into conduction. The decrease in plate voltage of the inverter 144 deprives a cathode follower 146 of any drive so that its output conductor 148 will be at −30 volts. A potential of −30 volts on the horizontal conductor $\overline{\text{0-0-0-0}}$ which is connected to the conductor 148 will indicate that the input $\overline{\text{0-0-0-0}}$ is not present, or that the input 0-0-0-0 is present in the numerical matrix.

In a like manner if the input 0-0-1-0 were presented to the numerical matrix, the vertical conductor 150 would be at +10 volts causing a cathode follower 152 to conduct. The +10 volt output from the cathode follower 152 would cause the horizontal conductor 0-0-1-0 of the zonal matrix to be at +10 volts. The output from the cathode follower 152 will cause an inverter 154 to conduct, causing the cathode follower 156 to be non-conductive. Consequently the horizontal conductor $\overline{\text{0010}}$ of the zonal matrix will be at −30 volts.

In a manner similar to that encountered in the previous paragraphs, the application of the input 0-0-1-1 to the numerical matrix will cause the vertical matrix conductor 158 to be raised to +10 volts which will cause its connected cathode follower 160 to conduct and by reason of the inverter 162, the cathode follower 164 to be non-conducting. The result is that the horizontal conductor 0-0-1-1 of the zonal matrix will be at +10 volts and the horizontal conductor $\overline{\text{0-0-1-1}}$ will be at −30 volts.

To proceed now with the third example involving the zonal matrix, let it be assumed that the binary word 1-1-1-0-1-1 has been read from the tape and applied to the matrices. From the code table (Figure 48) it can be seen that this input represents the letter H in the Hollerith Code which is indicated in a record card by holes at the 12 and 8 index point positions. The application of the binary word to the matrices will provide a potential of +10 volts on the horizontal conductors of the zonal matrix 1-0, 0-1, $\overline{\text{0-0-0-0}}$, $\overline{\text{0-0-0-0}}$, and $\overline{\text{0-0-1-1}}$. The remaining horizontal conductors of the zonal matrix (Fig. 36) will be at −30 volts. Thus, when a +10 volt timing pulse is applied through a conductor 166 at 12 time, the conductor 168 will be raised to +10 volts. This allows a cathode follower 100 to conduct and thereby emit an output pulse representing the 12 hole on the conductor 132 which is connected to the output conductor 123 (Fig. 37). It has been previously described how a pulse representing the 8 hole will appear on the conductor 123 at 8 time. The net result has been a 12 pulse and an 8 pulse appearing on the conductor 123 in timed sequence so as to represent a 12 hole and an 8 hole in a punched record card.

Further study of the zonal matrix (Fig. 36) will reveal that the binary word 1-0-0-0-0-0 (indicative of a record mark) will cause the horizontal conductor 1-0, and 0-0-0-0 to raise to +10 volts. Upon the application of a +10 volt timing pulse at 12 time by way of the conductor 166, the vertical conductor 170 will be at +10 volts so that the cathode follower 100 will conduct, causing an output pulse to appear on a conductor at 172. This pulse is delivered to other parts of the system in order to indicate the end of a record. The function of the record mark pulse will be described in greater particularity at a later point herein.

In a similar manner the binary word 0-1-0-0-0-0 (indicative of a tape mark) will cause an output pulse to appear upon an output line 174 by way of the cathode follower 100. This pulse is used by other parts of the control system to signify the end of a reel of tape in the tape drive mechanism. The manner in which the tape mark pulse is utilized will be described in greater detail at a point hereinafter.

The output of the entire conversion matrix (Figs. 36 and 37), constituting the timed representation of the Hollerith Code, appears on the conductor 123 (Fig. 37) and is passed through several control circuits and finally appears on the grid of the cathode ray storage tubes causing information to be stored thereon.

Figure 34:
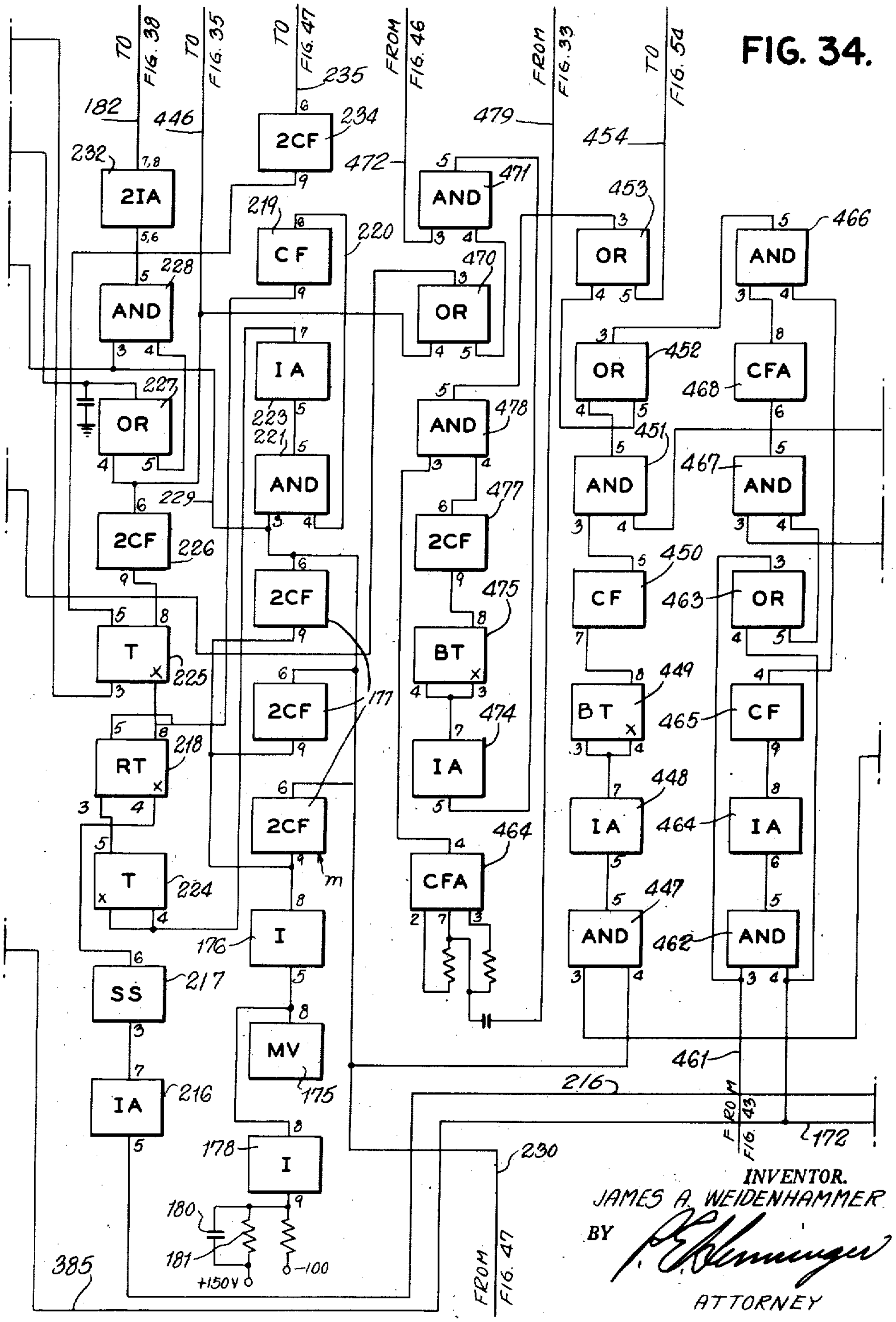

*The 100 kilocycle clock.*—There has been provided herein and as particularly shown in Figure 34, a basic pulse generator, or clock, for electrically timing the electronic conversion system. The basis of the clock network is a multi-vibrator 175 (Fig. 34) and is like the multi-vibrator shown in Figure 32. The components of the multi-vibrator have been designed for operation at 100 kc. per second. The output of the multi-vibrator 175 is fed through an inverter 176 which shapes the pulses into a fairly rectangular form. The inverter pulses drive a cathode follower network 177 which is used to isolate the clock from the rest of the circuits and to provide the current required by the circuits receiving the clock pulses. The clock pulses vary between the extremes of +10 volts and −30 volts, and each pulse is 5 microseconds wide.

From the output of the cathode followers 177 the clock pulses are delivered to the other circuits of the conversion system wherever required. The 100 kc. clock pulses are used during the read-in operation to advance the Ring of Thirteen (Fig. 38) the Ring of Thirteen in turn interrogates the diode matrix as previously described, and controls the vertical position of the cathode ray tube beams. During the read-out operation, the 100 kc. clock pulses advance the Ring of One Hundred shown in Figure 43. The Ring of One Hundred controls the horizontal position of the beams of the cathode ray tubes. During the periods when the patterns on the cathode ray tubes are being regenerated, the 100 kc. clock pulses are fed into the Ring of Thirteen.

Inverter 178 (Fig. 34) is used to suppress the operation of the multi-vibrator 175 for a short period of time following the resetting of all of the rings and triggers throughout the machine. By depressing a reset switch the −100 volts applied through a resistor to pin 9 of the inverter 178 is removed. Consequently, the grid of the inverter 178 is raised to +10 volts so that the inverter is fully conducting. Due to the fact that the plate of the inverter 178 is connected to one plate of the multi-vibrator 175 the multi-vibrator cannot operate as long as the potential of the plate of the inverter 178 is low. Since the grid of the inverter 178 is raised to +10 volts the capacitor 180 will charge up to a point near +150 volts. Consequently, the time constant of the capacitor 180 and its shunt resistor 181 will cause a delay in the return of the grid of the inverter 178 to −30 volts. This delay causes the multi-vibrator 175 to remain inoperative for a few milliseconds. It is desirable to suppress the operation of the multi-vibrator 175 for a short period of time to insure that all of the triggers etc., will have time to be reset before the clock pulses appear.

Figure 38:
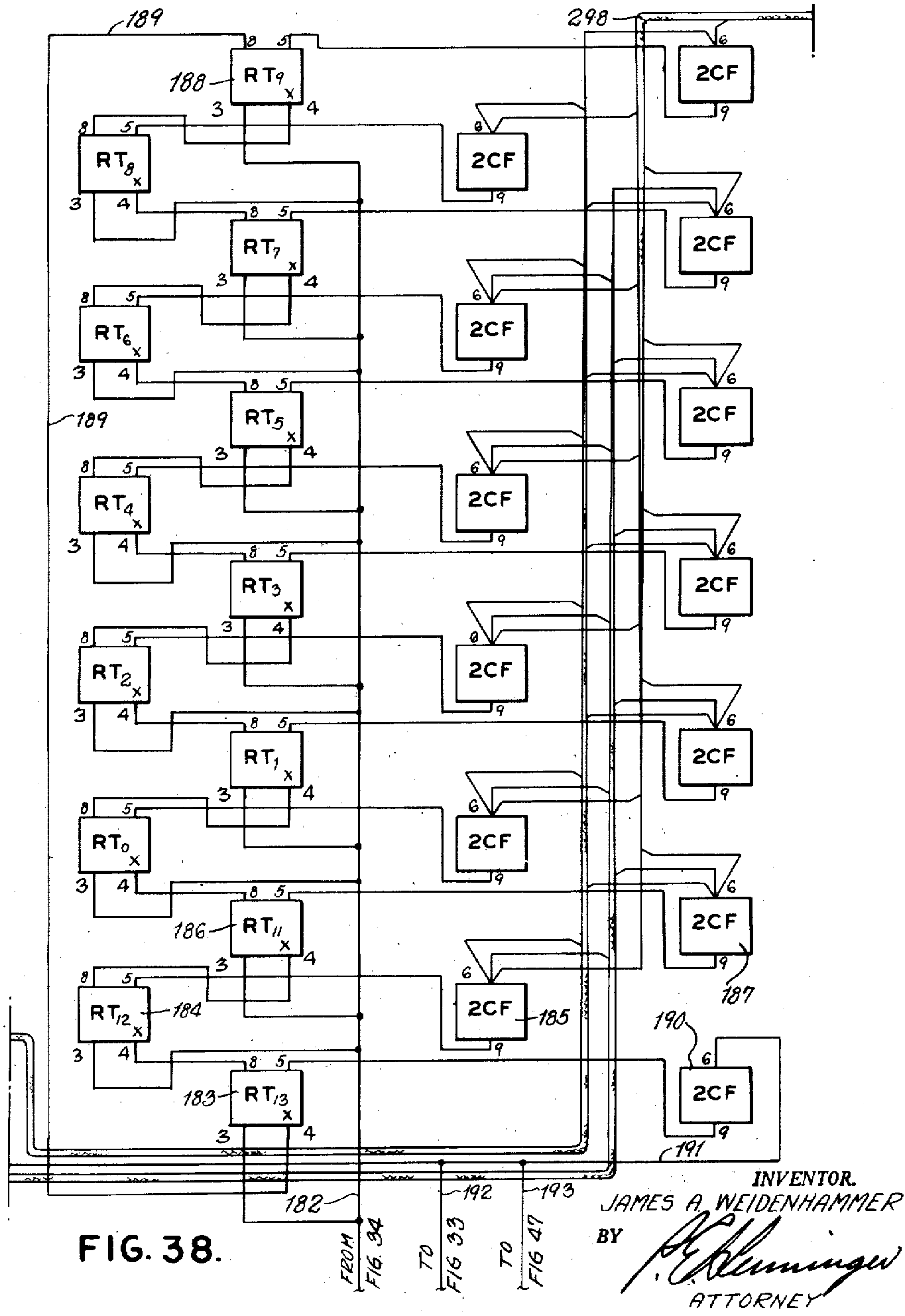

*The Ring of Thirteen.*—Figure 38 of the drawing illustrates the Ring of Thirteen which provides the time pulses used to control the vertical deflection of the beams of the cathode ray tubes, the scanning of the diode conversion matrix, the control of the redundancy check circuits, and the character gating circuits. It should be noted that the Ring of Thirteen emits timing pulses in a sequence corresponding to the index points of a column of a record card.

The Ring of Thirteen is driven by the multi-vibrator 175 which, as stated before, operates at 100 kc. per second. Information is stored, as described above, in columns on the face of the cathode ray tubes in a pattern similar to the index point pattern of a record card. Each column of information is stored by positioning the beams of the cathode ray tubes, step by step, i. e. index point by index point, down the column. It is the Ring of Thirteen which controls the vertical deflection circuits thereby positioning the cathode ray beams. The manner in which the timing pulses from the timing ring interrogate the conversion matrices (Figs. 36 and 37) has already been noted. The timing pulses from the Ring of Thirteen are also used to control the redundancy check circuits and the character gate, both of which functions will be discussed in detail at a later point herein.

The Ring of Thirteen consists of thirteen trigger pairs, each of which is as shown in Figure 20 of the drawings. These pairs are connected as a closed ring to constitute an Overbeck ring in the manner described in United States Patent No. 2,404,918.

The Ring of Thirteen, as shown in Figure 38, has all of its triggers reset to that side identified by a small *x* in the block symbol of the trigger, the *x* indicating the side on which the trigger is conducting. The 100 kc., 40 volt negative driving pulses are applied to the ring by way of the input conductor 182. Connected to the plate of the right hand tube of each trigger pair is a cathode follower. The cathode followers are used to prevent loading of the trigger pairs. By transferring conduction from the right to the left tube, a trigger pair emits a positive direction signal that is passed to its associated cathode follower. The cathode follower feeds the circuits connected to the timing ring.

More particularly, in Figure 38 the triggers identified by the identifying character RT are further identified by a subscript number which serves to identify the trigger stage. The positive output pin 5 of each trigger is connected to its associated cathode follower at pin 9 thereof.

Considering the ring to be reset as shown in Figure 38, the first negative pulse applied to the input line 182 causes the trigger 183 to transfer, thereby emitting a negative pulse to pin 4 of the next lower stage (trigger 184). The negative pulse applied to trigger 184 causes it to transfer conduction to its left side. The fact that the trigger 184 transferred causes a positive potential to be applied to pin 9 of a cathode follower 185 connected to the trigger 184 thereby rendering the cathode follower 185 fully conducting. The output potential of the cathode follower 185 will be +10 volts. This output pulse represents the 12 hole in the Hollerith Code.

The next timing pulse which arrives on the input line 182 will cause the trigger 184 to transfer back to the right hand side. The transfer of the trigger 184 causes the positive input to be removed from the cathode follower 185 whereupon the output of this tube will drop to −30 volts. The transfer of conduction in the trigger 184 also causes a negative pulse to be emitted to pin 4 of the next trigger stage 186, thus causing the trigger 186 to transfer conduction to its left side. This action will cause its associated cathode follower 187 to render an output of +10 volts corresponding to the 11 hole in the Hollerith Code.

The triggering process just described will continue as the position of the Ring of Thirteen is advanced at the rate of 100 kc. until its final trigger 188 is in a condition where the left side thereof is conducting (this trigger representing the 9 index point in the Hollerith Code). The application of the next following 100 kc. timing pulse to the input conductor 182 causes the trigger 188 to reverse its conducting state and again emit a negative direction signal by way of a conductor 189 which is connected from the left output of trigger 188 to the left side of the input trigger 183.

The negative pulse impressed on the conductor 189 will cause the trigger 183 to transfer so that the signal delivered to pin 9 of a cathode follower 190 to which the trigger 183 is connected causes the D. C. potential of the cathode follower output line 191 to be raised to +10 volts. The positive pulse on the line 191 is the Thirteen Carry Signal, and this is impressed on the inverter 82 (Figure 35) and through said inverter to the left side of each of the triggers 64, 50*a*, 52*a*, 54*a*, 56*a*, 58*a*, and 66*a* of the input storage register (Fig. 35), causing these triggers to be reset with the right side thereof conducting. After the triggers of the input storage register have been reset the circuits are ready to receive another word from tape.

Figure 33:
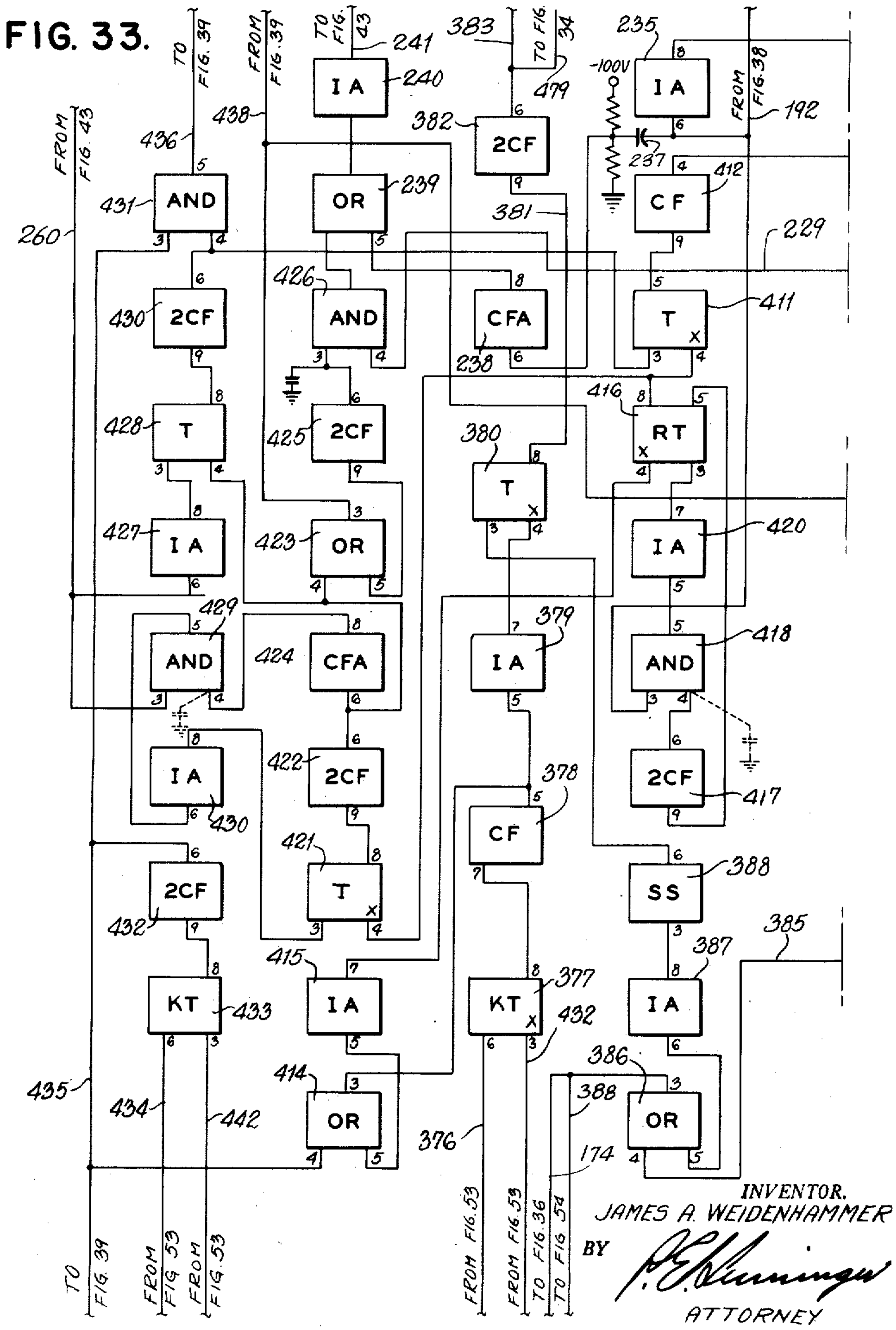

The Thirteen Carry Signal is also applied by way of a conductor 192 to the control circuits of Figure 33 causing the clock pulses to be disconnected from the input conductor 182 (Fig. 38) at the completion of one revolution of the Ring of Thirteen. The start of the next word will operate the control circuits of Figure 33 to reestablish the connection between the 100 kc. clock and the Ring of Thirteen input, conductor 182. This latter function will be described in detail at the point hereinafter when the character gate is discussed.

Figure 47:
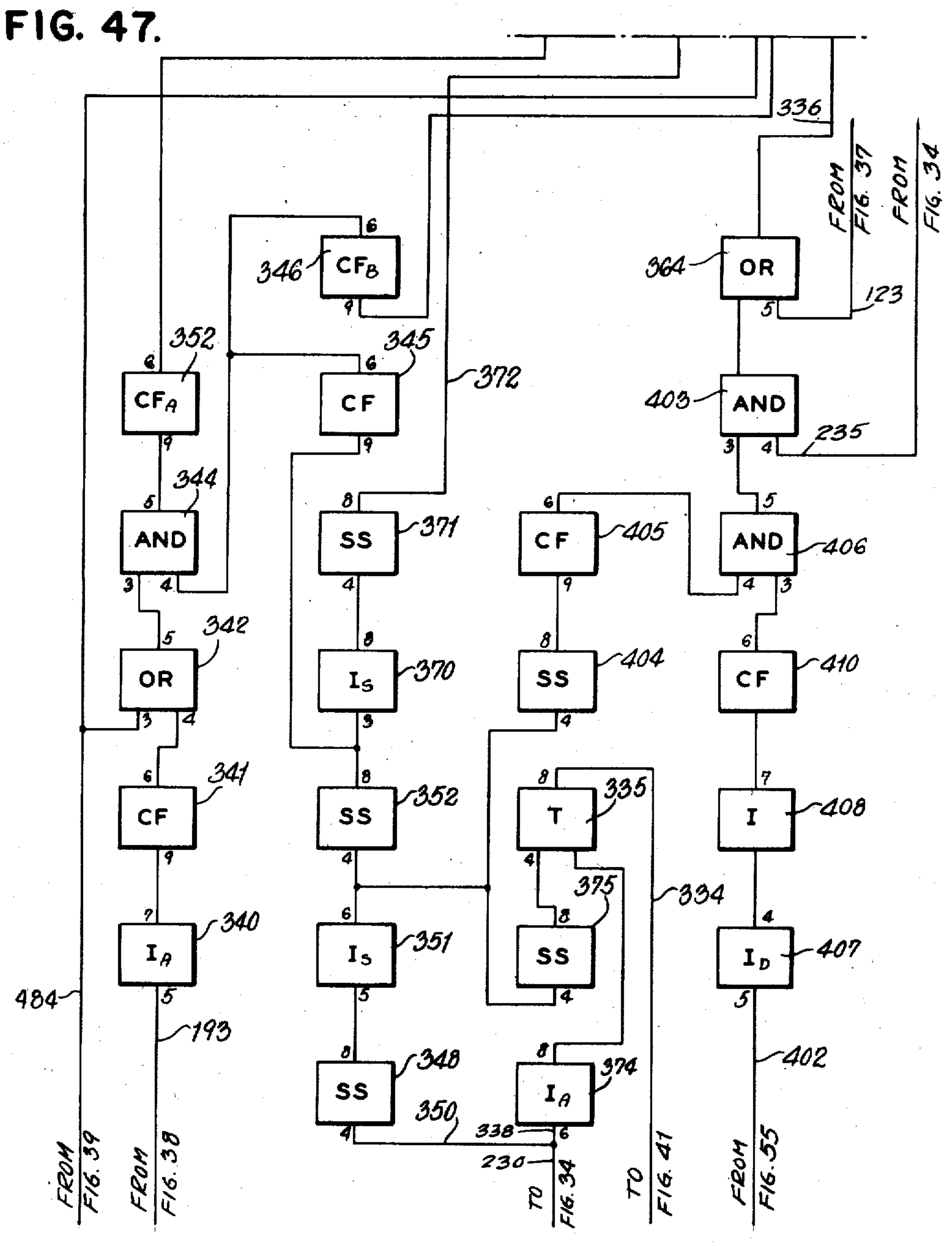

The Thirteen Carry Signal of the Ring of Thirteen is also applied to the Dot-Dash Control Circuits of Figure 47 by way of a connection 193 to cause the Dot-Dash Circuits to operate during read-in and regeneration of the cathode ray tube pattern.

*Character gate control circuits.*—The character gate control circuits have been designed to synchronize the entry of a character from the tape with the cycling of the Ring of Thirteen. In brief, the bits of information representing a word arrive on the six input channels from the tape (Fig. 35). After the first bit arrives, the Ring of Thirteen does not begin interrogating the conversion matrix (Figs. 36 and 37) until all of the bits representing that word have arrived. The character gate control circuits provide a 50–60 microsecond delay after the arrival of the first bit before the Ring of Thirteen begins a cycle. During this 50–60 microsecond delay, all of the bits will be presumed to have arrived and will be presumed to be stored in the input register triggers (Fig. 35). At the end of this delay period, the Ring of Thirteen will be allowed to make one cycle while interrogating the conversion matrix before the cycle is interrupted. The arrival of the first bit of the next word will cause the operation just described to be repeated.

In Figure 35 the individual bits of information which have been read from tape and which represent a single word arriving on the input lines 60 for example, enter an input inverter (66 for example) and cause an associated trigger (66*a* for example) of the input register to transfer its conducting state. If a trigger is operated, the appropriate cathode follower (70 for example) will be driven into conduction and conductors (194 for example) attached to the cathode follower output will be raised to a potential of +10 volts. The conductors 194, 196, 197, 198, 199, 200 and 201 are connected to the outputs of the "yes" cathode followers, i. e. to cathode followers in Figure 35 which have a positive output upon the arrival of a bit of information. The lines 194 through 201 (Fig. 35) are connected to a group of AND circuits and an associated group of cathode followers in Figure 35. The lead 194 is one input to an AND circuit 202 (Fig. 35). The lead 195 feeds an AND circuit 203, the lead 197 feeds an AND circuit 204, the lead 199 feeds and AND circuit 206, the lead 200 feeds an AND circuit 207, and the lead 201 feeds an AND circuit 208. It will also be noted that these inputs to the AND circuits are also connected respectively to associated cathode followers 209, 210, 211, 212, 213, 214, and 215, all in Figure 35. Since only the cathode follower 215 has a cathode resistor, the cathodes of all the other cathode followers are connected to the cathode of the cathode follower 215, this group of components in effect constituting a seven way OR circuit. Thus the arrival of the first bit of information from the tape will cause one of the cathode followers to be driven into conduction so that the output lead 216 will be at +10 volts.

The +10 volts on the lead 216 will drive an inverter 216 (Fig. 34) into conduction with the result that an attached single shot multi-vibrator 217 is operated and caused to emit a positive pulse 50–60 microseconds in length at its pin 6. The trailing, negative direction edge of the single shot output pulse causes a trigger 218 to transfer conduction to its left side. The transfer of conduction of the trigger 218 causes its pin 5 to rise to a high positive potential so that a connected cathode follower 219 is driven into conduction, raising the potential of its output lead 220 to +10 volts. This conditions one input of an AND circuit 221. The other input of the AND circuit 221 is the clock pulse on conductor 222, whereby the receipt of a clock pulse is adapted to raise the second input (pin 3) of the AND circuit 221 to plus 10 volts. Thus the output of the AND circuit 221 will be a positive pulse of +10 volts which will drive a connected inverter 223 to conduct.

The negative direction signal from the inverter 223 is delivered to the binary connected input of a trigger 224, causing this trigger to transfer conduction to its right side. The next clock pulse on the input conductor 222 will again cause the output of the AND circuit 221 to drive the inverter 223 into full conduction. The negative direction output signal from the inverter 223 is fed to both grids of the binary input trigger 224, causing this trigger to transfer conduction back to the left side thereof. The fact that the trigger 224 transferred conduction to its left side will cause a signal in the negative direction to be delivered to the trigger 218 whereupon this trigger will transfer and conduct on its right side.

The trigger 218 is in a network consisting of the cathode follower 219, the AND circuit 221, the inverter 223 and the trigger 224 to make certain that the pulse which trips the Read-In Trigger 225 occurs in coincidence with one of the clock pulses. This condition is necessary since the exact time at which a character pulse will arrive cannot be ascertained with certainty.

When the trigger 218 transfers from the left to the right side, the output pin 8 thereof emits a negative pulse thereby causing the Read-In Trigger 225 to transfer and conduct on its left side. As a result, the output pin 8 of the trigger 218 becomes negative, thereby causing the Read-In Trigger 225 to transfer and conduct on its left side. As a result the output pin of the Read-In Trigger 225 is raised to a high positive voltage which drives a connected cathode follower 226 into conduction. The output of the cathode follower 226, now being at +10 volts will transmit its pulse through an OR circuit 227 to apply a positive voltage or +10 volts to one input of an AND circuit 228. The other input to the AND circuit 226 is connected by way of a conductor 229 and to the source of the 100 kc. clock pulses. Thus, as long as the input at pin 4 of the AND circuit 228 remains at +10 volts, an inverter 232 will be operated by the clock pulses, thereby delivering the 10 kc. clock pulses by way of a conductor 182 to the Ring of Thirteen in Figure 38.

With reference to the Read-In Trigger 225 (Fig. 34) it is evident that pin 5 of this trigger will be at a low voltage during the time that the read-in operation is in progress. Thus during read-in a negative input is applied to the pin 9 of a cathode follower 234 (Fig. 34) so that potential of an output conductor 235 will be at −30 volts. The reason for the negative voltage on read-in is to prevent any signals from the video amplifier reaching the read-in control circuits of the cathode ray tubes.

The Ring of Thirteen will now advance on the next thirteen pulses, interrogating the conversion matrices and advancing the beams of the cathode ray tubes down the first column. The thirteenth pulse will return the trigger 188 (Figure 38) to its original state thereby causing a negative pulse to appear on the output conductor 189, which returns the trigger 183 to the left side conducting. The resulting positive voltage at output pin 5 of the trigger 183 drives its associated cathode follower 190 into conduction so that the output conductor 191 attached thereto is raised to +10 volts. This Thirteen Carry Signal (indicating that the Ring of Thirteen has completed one cycle) just received on the conductor 192 drives an inverter 235 (Fig. 33) to conduct and this causes the Read-In Trigger 225 (Fig. 34) to transfer and conduct on its right side. This action removes the drive signal from the cathode follower 226 so that the resulting action is a removal of the positive input from the AND circuit 228. Consequently, the clock pulses on the conductor 229 are no longer delivered to the output conductor 182 of the inverter 232, and the advance of Ring of Thirteen is stopped.

Figure 43:
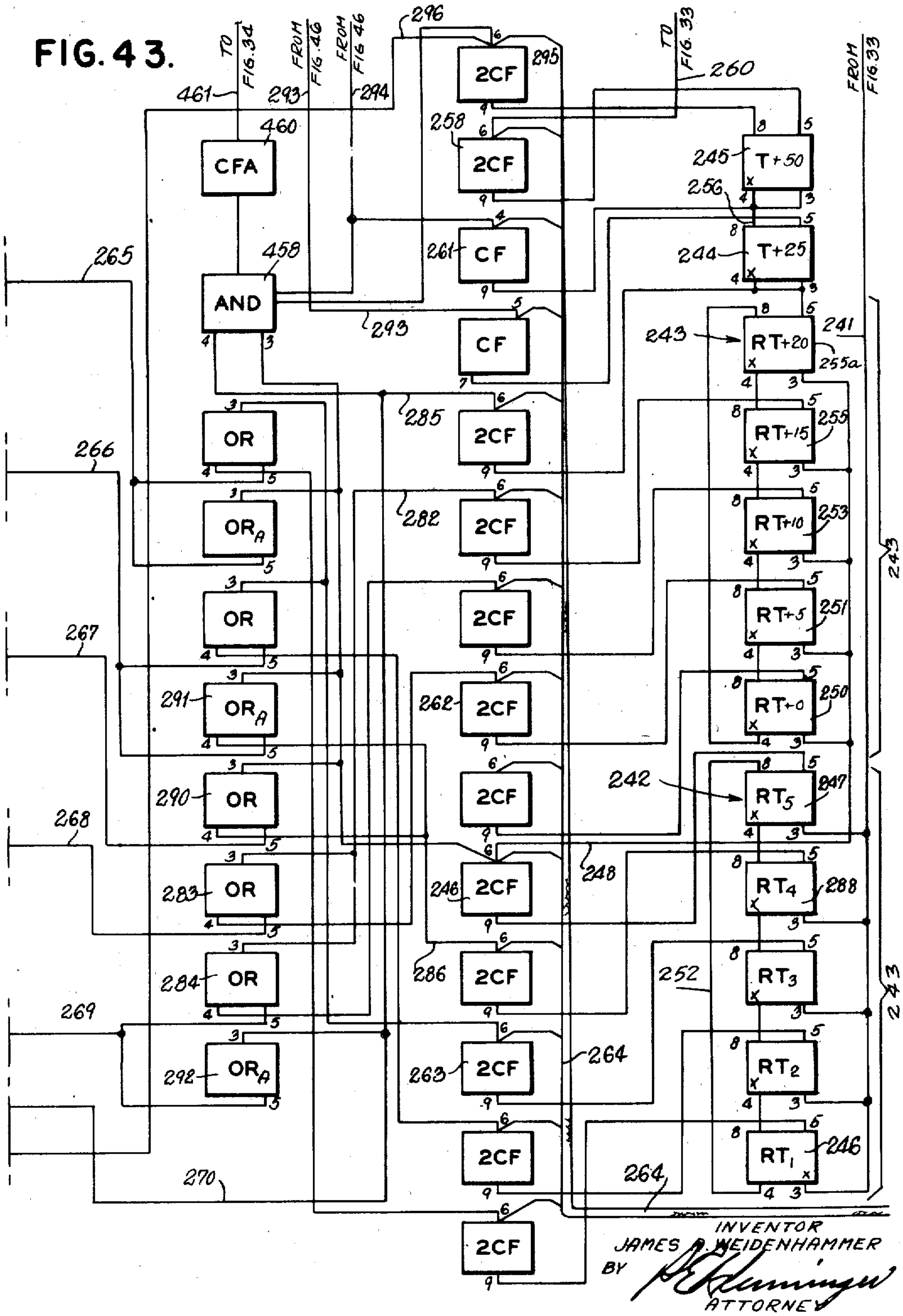

The positive Thirteen Carry Signal on the conductor 192 was also delivered by way of a capacitor 237 (Fig. 33) and a cathode follower 238 to an OR circuit 239 which pulses an inverter 240 into full conduction so that a negative pulse is delivered by way of a conductor 241 to the input of the Ring of One Hundred (Fig. 43). The negative pulse on the line 241 causes the Ring of One Hundred (Fig. 43) to advance one position so that the horizontal deflection circuits move the beams of the cathode ray tubes to the next column.

The complete action herein above described can be summarized as follows: The first bit of information received from the tape starts a delay of 50–60 microseconds necessary to insure the receipt of all information from the tape as to the single word thereon, the bits of which may arrive somewhat serially due to skew as explained above. At the end of the 50–60 microsecond delay period, theh Ring of Thirteen advances thirteen steps to interrogate the conversion matrices and store the information on the cathode ray tube as the beam advances down the first column. At the end of the first column, a Thirteen Carry Signal is emitted the Ring of Thirteen which stops the advance of the ring and causes the Ring of One Hundred to advance one position, thereby moving the cathode ray beam to the next column. The system is now ready to receive the first bit of information in the next word to be read from tape.

*The Ring of One Hundred.*—The Ring of One Hundred is provided to generate timing pulses for the horizontal deflection circuits and for the firing of a series of thyratrons which are adapted to energize the punch magnets.

The Ring of One Hundred must operate at different rates depending upon whether the system is reading into or out of the cathode ray tubes. When reading information into the cathode ray tubes, the cathode ray beam is moved to the next column upon completion of a previous column. Thus, in this case the advance of the Ring of One Hundred must be controlled by the cycling of the Ring of Thirteen; every time the Ring of Thirteen completes a cycle, the Ring of One Hundred is advancing one position.

Information is read out of the cathode ray tube in row by row order at the rate of 100 kc. Therefore, during the operation of reading out of cathode ray tubes, the Ring of One Hundred must be controlled by the 100 kc. multivibrator. As the beams of the cathode ray tubes are traversing a row, one input of an AND circuit, which is connected to the grid of a thyratron (corresponding to the columns) must be conditioned so that if a dash is found at a particular point of the tube raster, the thyratron corresponding thereto (and this one only) will be fired.

The Ring of One Hundred as illustrated in Figure 43 of the drawing. The input to the ring is applied on the conductor 241 from either the Thirteen Carry Pulse emitted by the Ring of Thirteen or from the 100 kc. multi-vibrator under control of the card punch.

It might be worthwhile at this point to digress from the discussion of the Ring of One Hundred and consider the input to this ring during the reading-in of information from the magnetic tape to the cathode ray tubes. In the section of this specification dealing with the character gate control, it was pointed out that as long as the Read-In Trigger 225 (Fig. 34) is "on," the 100 kc. clock pulses will be fed to the Ring of Thirteen by way of the input conductor 182. It was also noted that after the Ring of Thirteen completes a cycle and returns to its reset position, a Thirteen Carry Signal will be present on the conductor 192 (Fig. 33). This carry pulse is applied through the inverter 235 and by way of it to pin 3 of the Read-In Trigger 225, causing this trigger to be turned "off." Consequently, the source of clock pulses is disconnected from the Ring of Thirteen. The Ring of Thirteen has completed a cycle thereby completing the storage of information in one column on the face of a cathode ray tube. Now it is necessary to cause the beam of the cathode ray tube to be moved to the second column so that the storage of more information can take place. Since the Ring of One Hundred controls the horizontal position of the cathode ray beams, this ring must be advanced every time the Ring of Thirteen completes a cycle and emits a Thirteen Carry Signal. The Thirteen Carry Signal arrives on conductor 192 and is fed by way of the cathode follower 238 and the OR circuit 239 to the inverter 240. The negative direction output signal of the inverter 240 is fed by way of the conductor 241 to the Ring of One Hundred of Figure 43, causing this latter ring to advance one position.

The input to the Ring of One Hundred during the operation of reading information out of the cathode ray tubes to the card punch magnets will be more fully considered during a discussion of the Punch Ring operation. It is sufficient to state at this time that the input to the ring during read-out will be from the 100 kc. multi-vibrator under control of the Punching Ring which will be discussed later.

In Figure 43 the Ring of One Hundred is reset so that the side of each trigger marked *x* in that figure indicates the conducting side of the several triggers comprising this ring. The numeric subscript following that respective trigger identifying characters in the respective trigger blocks indicates the count value represented by the respective triggers. The first portion of the Ring of One Hundred consists of a closed Overbeck ring of five triggers. These are bracketed in Figure 43 and identified by the reference numeral 242. This ring of five triggers drives a second closed Overbeck ring of five triggers bracketed in Figure 43 and identified by the reference numeral 243. The output of the ring 243 drives two additional trigger pairs 244 and 245. This ring is reset to one rather than to 0, i. e. the first ring 246 is reset to an "on" condition. After the first ring 242 counts to five, the sixth negative pulse emitted by way of a cathode follower 246 from the last stage 247 of the ring 242 is, by way of a connector 248, transmitted to the second ring 243 where this pulse turns "off" the zero trigger 250 and turns "on" a plus five trigger 251.

The negative output of the trigger 247, by way of a conductor 252, turns the first trigger 246 back "on" again. The first ring of five triggers 242 again counts to five whereupon a negative pulse on the conductor 248 turns the plus five trigger 251 "off" and the plus ten trigger 253 "on." Another count of five by the first ring 242 will cause the plus ten trigger 253 of the second ring to be turned "off" and the plus fifteen trigger 255 of the second ring to be turned "on." This process continues until the twenty-fifth pulse turns the plus twenty trigger 255*a* "off" and the plus twenty-five trigger 244 "on."

The two Overbeck rings 242 and 243 will now continue until the fiftieth pulse turns the plus twenty-five trigger "off," thereby producing a negative pulse on the conductor 256 and this negative pulse turns "on" the plus fifty trigger 245. Counting again continues until the one hundredth pulse turns the plus fifty trigger 245 "off," thus delivering a positive pulse to a cathode follower 258. Consequently, a positive pulse appears on the cathode follower output 260 indicating that the Ring of One Hundred has completed its cycle. The function of the One Hundred Carry Signal will be described in due course.

Connected to the outputs of each of the trigger pairs in the Ring of One Hundred are associated cathode followers which feed the various circuits controlled by the Ring of One Hundred. The outputs of the cathode followers will be either +10 volts or −30 volts depending upon the input voltage applied. The number standing in the ring then is determined by the sum of the numbers represented by the cathode followers having a +10 voltage output. If the Ring of One Hundred has received thirty-two pulses, cathode followers 261, 262, and 263 will have an output of +10 volts. The thirty-two pulses will place the ring at thirty-three so that the beams of the cathode ray tubes will be located in the thirty-third column.

Figure 42:
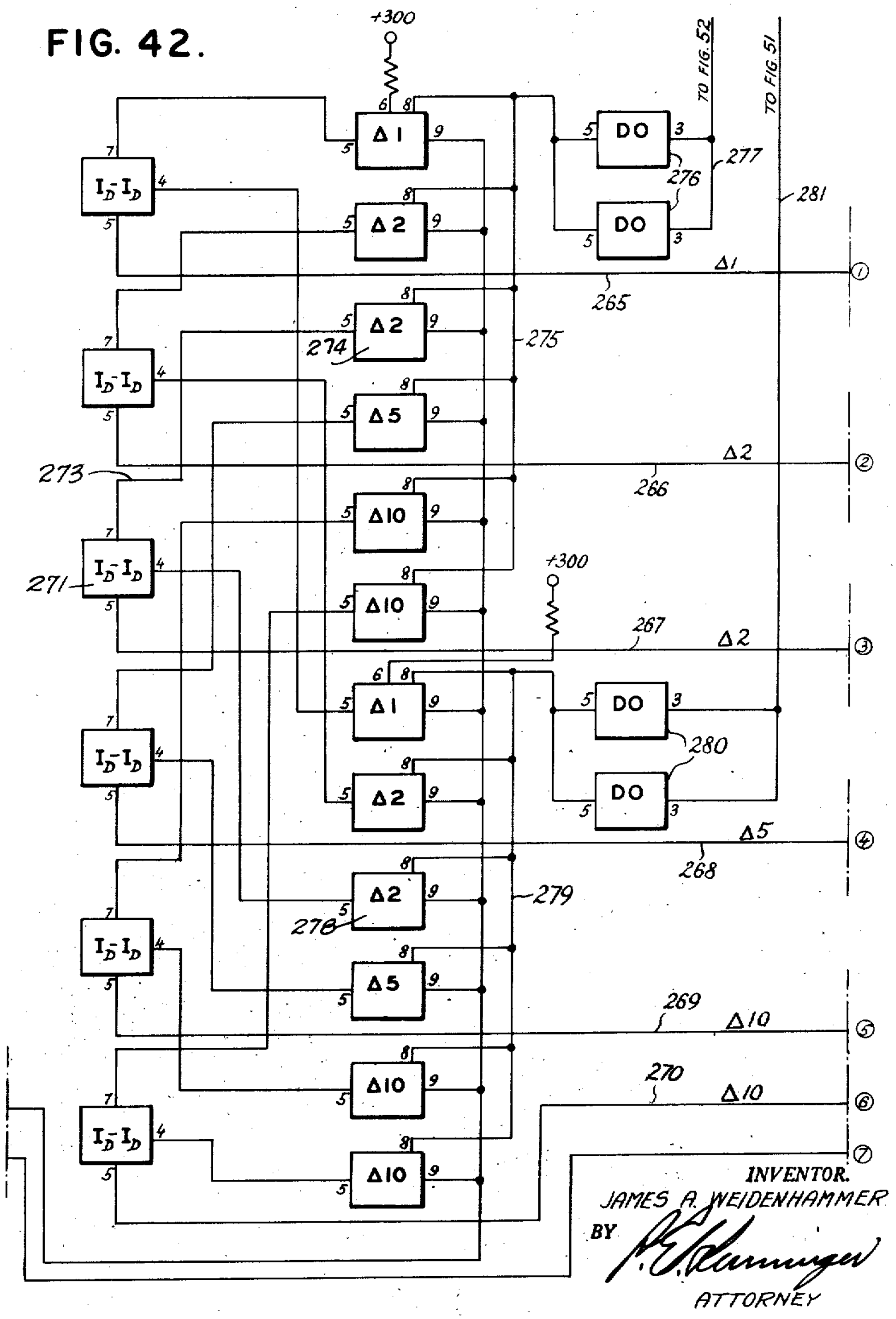
Figure 44:
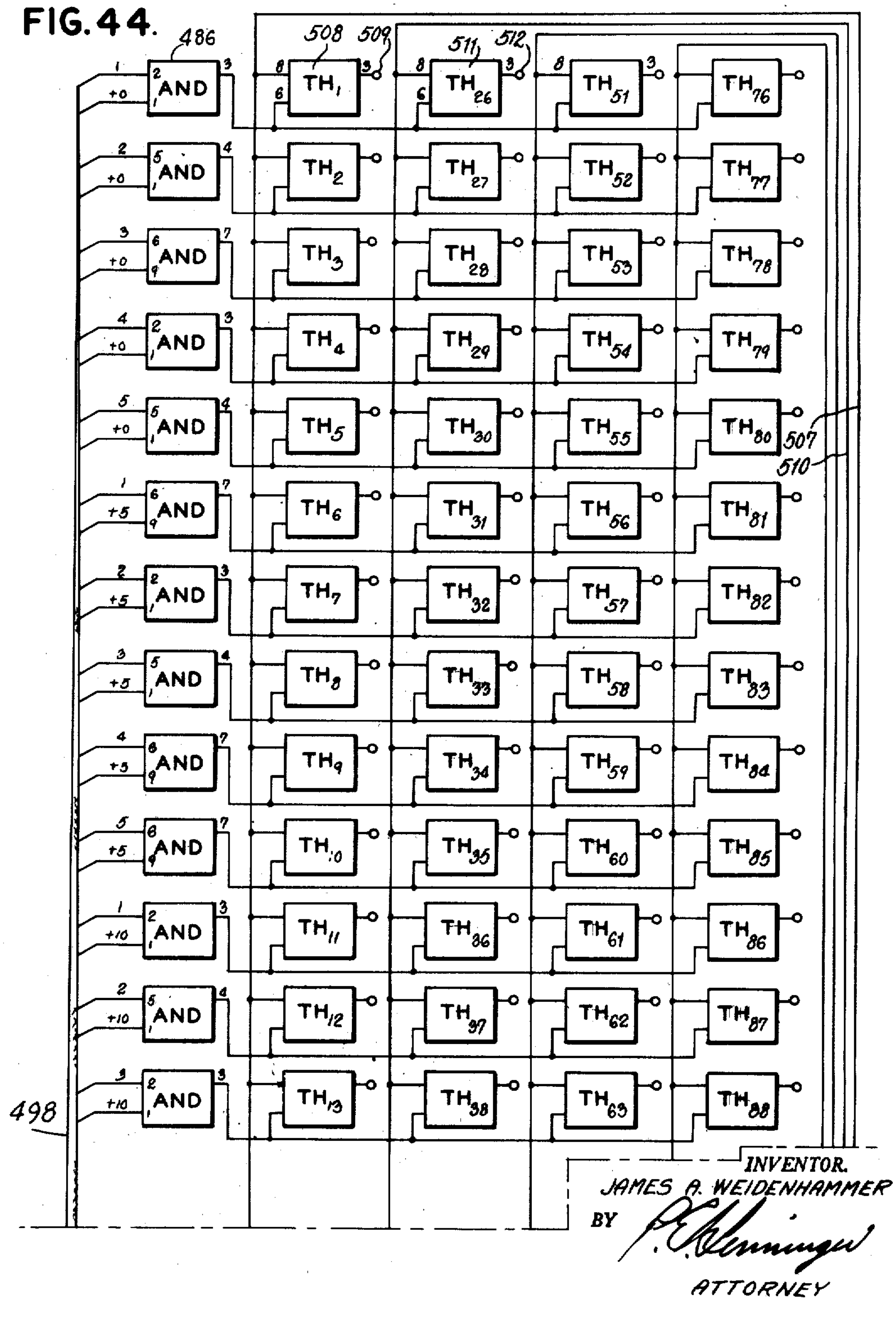
Figure 45:
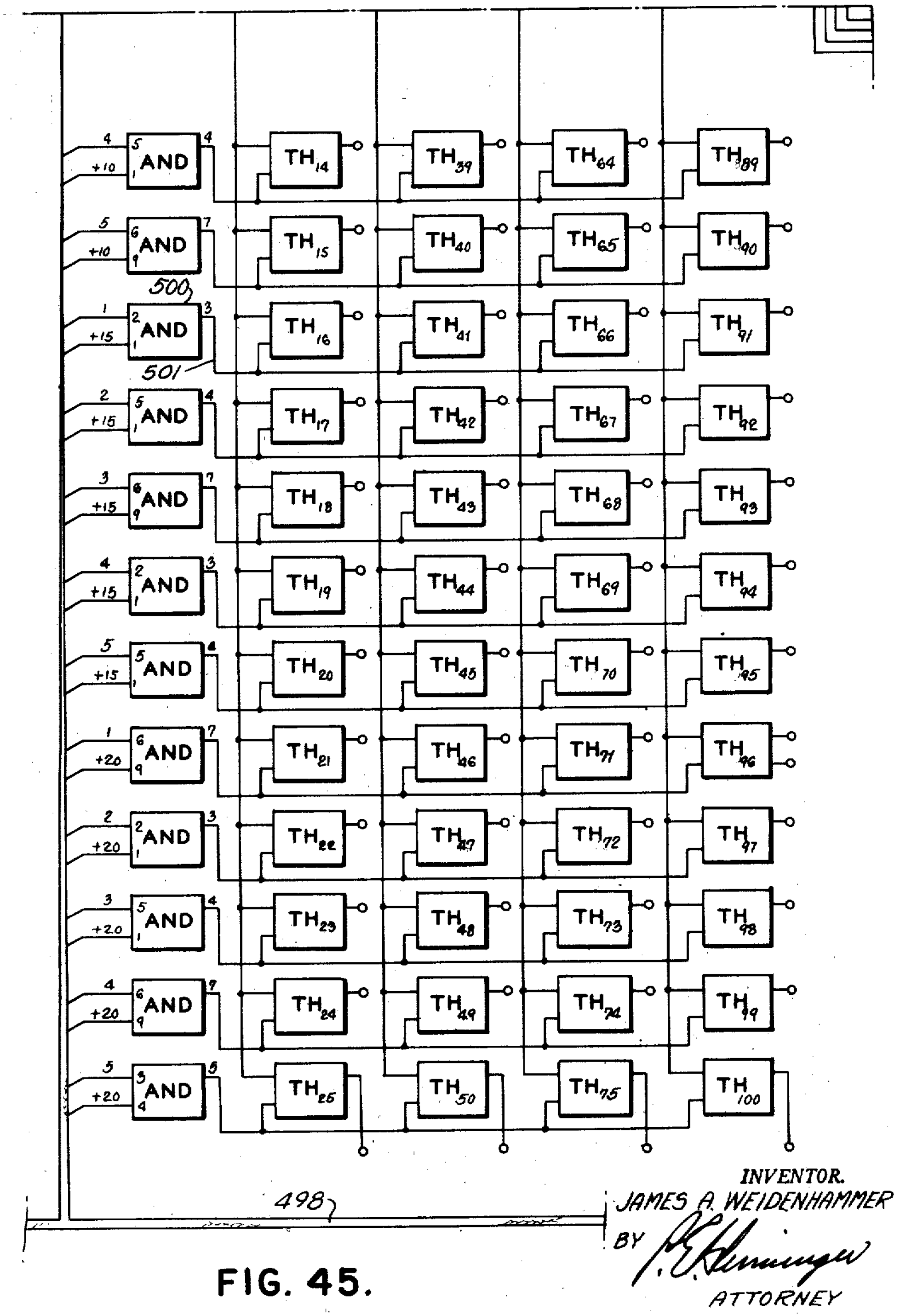
Figure 46:
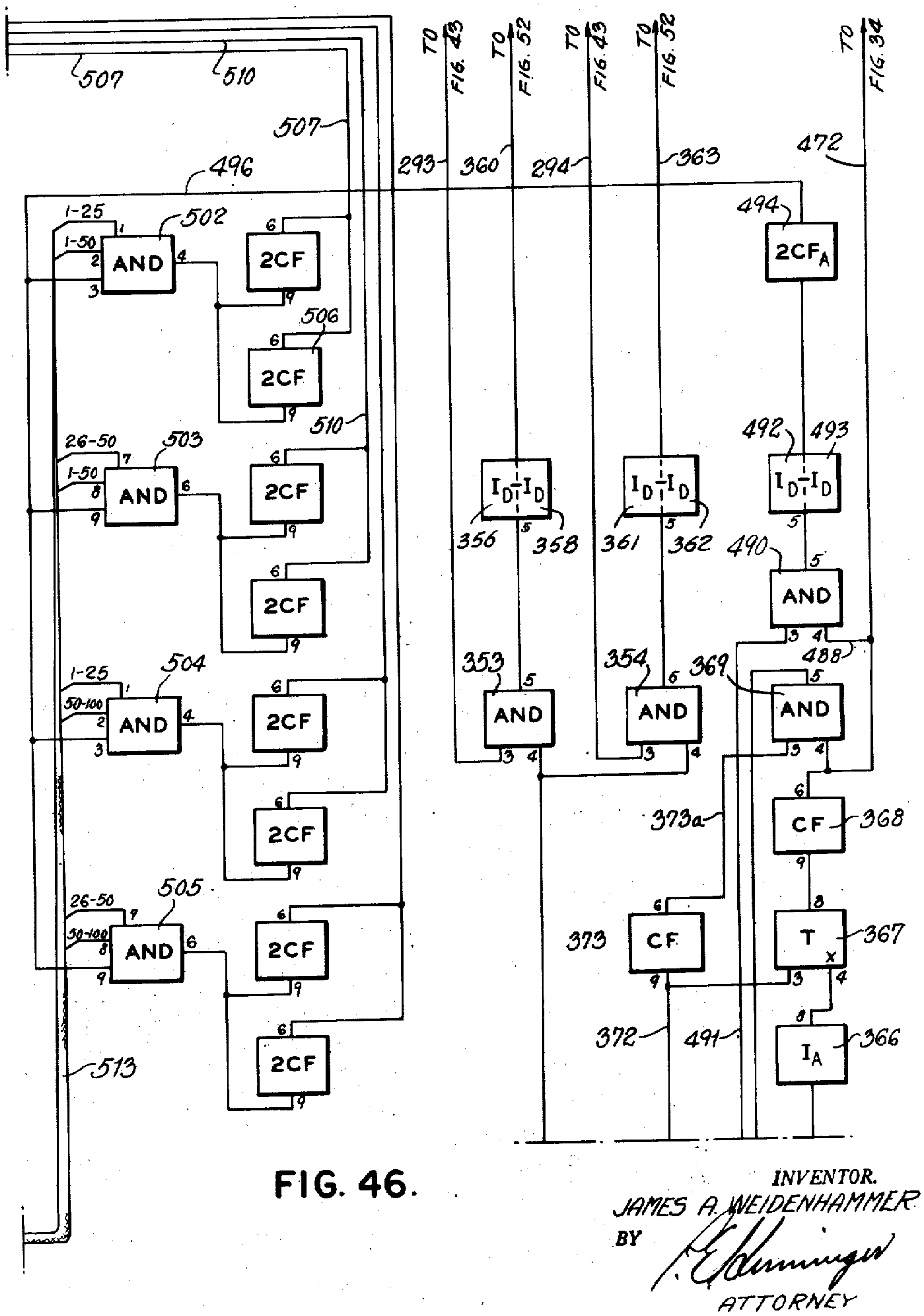

The output of the Ring of One Hundred is fed through a cable 264 to the horizontal deflection circuits, and to the thyratrons of Figures 44 and 45 by way of the AND circuits (Fig. 46). The horizontal deflection circuits which also received the output of the Ring of One Hundred are illustrated in Figure 42.

*Horizontal deflection circuits.*—The horizontal deflection circuits are the means which control the horizontal position of the electron beams of the cathode ray storage tube, whereby the mean potential of the deflection plates is that of the last electrode in the electron gun so that astigmatism will be at a minimum.

It will be remembered that the two cathode ray storage tubes are connected in parallel in every respect except for the control grids. By referring to Figure 2 it may be explained that during read-in time, the beams progress scanning column by column with one beam covering columns 1 through 25 and the other beam covering columns 26 through 50. As the beams travel from left to right in the tubes the first time, the left tube 22 is unblanked covering columns 1 through 25. The beams then traverse the same path with the right tube 24 unblanked covering columns 26 through 50. The beams are then dropped down to the equivalent row of the lower rasters where the same process is repeated for columns 51 through 100. The result is that all 100 columns have been scanned.

Therefore, the horizontal deflection circuits must be capable of providing twenty-five steps in sequence. Also, the Ring of One Hundred which is controlling the horizontal deflection circuits must sequentially cover twenty-five steps, after which an indication that the twenty-five steps have been completed. The ring must then recount twenty-five steps indicating that the twenty-five steps have been completed for the second time. This latter indication is used to control the vertical deflection circuits so that the beams are positioned in the lower raster in Figure 2. The horizontal deflection circuit is composed of two groups of paired tubes in which each pair of tubes represents a particular increment of deflection when operated. Thus if the pair of tubes representing Δ5 are operated, the beam will be moved five increments or columns to the right of its home position. If the Δ10, Δ5, Δ2 and Δ2 circuits are operated, the beams will be moved nineteen columns to the right of the home position, column 1, column 2, and so on.

There are two groups of these tubes so that push-pull deflection can be employed. A brief description necessary to the understanding of this operation will be given here in reference to Figure 50. Assume that the inverters A and H of Figure 50 are cut "off," i. e. non-conducting. Thus, the input to the inverter B will be +10 volts and the output of this inverter will be +50 volts which is applied to the grid of the triode C. Since the triode C is cut "off" it will not contribute to the voltage drop across the common cathode resistor of triodes C and D. Thus triode D will conduct its maximum amount of current through the plate load resistor E. It is evident that the triode L would be conducting current through the resistor cathode in a manner similar to triode D. Likewise, any other pairs of tubes similar to triodes C and D would have one tube (such as D) conducting plate current through the common plate load resistor E, providing the triode such as C were non-conducting. Consequently, the combined current through the common plate load resistor E will cause a large voltage drop across this resistor such that the conductor F will be at some low potential voltage (see the voltage diagram at the upper left in Figure 50).

In a similar manner, the fact that all of the left side triodes such as M are cut off will cause conductor G to be raised to the B+ potential of 300 volts. (See voltage diagram in lower right of Figure 50.)

If the beam of the cathode ray tube (CRT, Fig. 50) is to be located in the first column, the input to the inverter A must be positive. Thus inverter B will cause the grid of the tube C to be raised to +100 volts, causing the tube to conduct more current. The additional current will cause the cathode bias of the tube D to be increased. Since the grid of tube D is being held at +87 volts, the additional cathode bias causes less current to flow such that the voltage drop across the plate load resistor E will be less, thus, the potential of the conductor F will be raised to $V_2$. By a similar process, the positive input to the inverter A causes the conductor G to be lowered in potential to $V'_2$. Since the grids of all of the left hand tubes are being held at +87 volts, the amount of current a particular tube can conduct is dependent upon the size of its cathode resistor.

The cathode resistor of the tube D will be of such value that if this unit is cut "off" a change in potential of conductor F will occur so that the beam of the cathode ray tube will be deflected one unit. The triode M working in conjunction with the triode D constitutes a push-pull deflection system. A different pair of tubes will be used (with a cathode resistor of a different value) to produce a deflection of two units, for example.

It can now be seen that if the input of the inverter H is positive and that of inverter A is not, the potential of the conductor F will be raised further and that of conductor G will be lowered further so that the beam of the cathode ray tube will be positioned in the second column. If the inputs to both inverters A and H were positive, the beam would be located in the third column. There are other pairs of tubes that provide other increments of deflection shown in Figure 42. It can be seen from the voltage diagrams constituting part of Figure 50 that the mean potential between the deflection plates is always the same, but that the voltage difference between the plates increases as the Δ's are increased. This is necessary in order to reduce possible astigmatism.

The amount of deflection produced by a pair of tubes is dependent upon the size of the cathode resistor. The larger the resistor, the smaller will be the increment of deflection; the smaller the resistor, the larger the increment will be. The value of the resistors can be noted by an examination of Figures 10 through 18 in which figures it will be seen that the deflection tube circuits vary from each other by the value of their cathode resistors.

Figure 9:
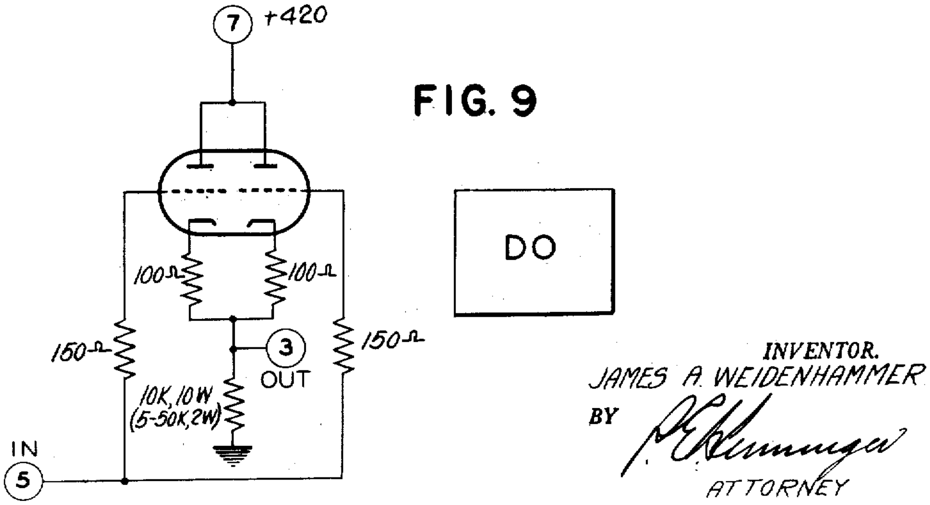
Fig. 9 illustrates both the block symbol and the detailed wiring diagram of a deflection output circuit which is in effect a variation af conventional cathode follower.

Figure 42 which illustrates the horizontal deflection circuit includes input lines 265, 266, 267, 268, 269, and 270 which constitute the input lines to the inverters through which the deflection circuits are fed. When a +10 potential is placed on these input lines the increment deflection produced will be as follows: Conductor 265 will produce one unit of deflection, conductor 266 will produce two units of deflection, conductor 267 two units, conductor 268 five units, conductor 269 ten units, and conductor 270 ten units. As previously stated, a combination of several inputs will produce a deflection equal to the sum of the units. If the conductor 267, for example, is at +10 volts, an inverter 271 will be driven into conduction. This inverter will drive out of conduction an inverter 272 thereby raising the potential of an output line 273. Therefore, a pair of tubes 274 will operate so as to raise the potential of the output line 275 to a value of Δ2, or two increments. The raising of the potential of conductor 275 will cause a cathode follower 276 to conduct more heavily so that the output voltage thereof on a line 277 will be raised. The cathode followers 276 are the special cathode followers illustrated in Figure 9. These cathode followers are used as an impedance matching device to provide the necessary power for driving the long cathode ray tube deflection lines without loading the sensitive deflection circuits. It may be noted that the cathode followers DO differ from the standard cathode followers used in the system in that the cathode resistor is returned to ground rather than to −100 volts because it operates at a large positive voltage.

The output of the inverter 271 is also fed to a pair of deflection tubes 278, causing an output line 279 connected thereto to be lowered in potential, thus causing the cathode followers 280 to lower the potential of their output conductor 281. The result of the voltage changes on conductors 277 and 281 will cause the beams of the tubes to be moved to the second column. If a beam is placed in the twenty-fifth column, conductors 268, 269 and 270 must be at +10 volts. It will be apparent from the foregoing that the various combination outputs available from the horizontal deflection circuits will provide each increment necessary for stepping the deflection beam from one column to the next.

*The horizontal deflection control circuits:* It has now been seen that the control circuits are necessary in order to operate the input conductors 265 through 270 to the horizontal deflection circuits. The horizontal deflection circuits are essentially controlled by the Ring of One Hundred (Fig. 43). However, so far as the horizontal deflection circuits are concerned, the ring counts from one to twenty-five and starts over, counting from one to twenty-five again until the process is repeated four times and the entire complement of one hundred columns has been scanned.

Several examples may be given to show the connections between the Ring of One Hundred and the deflection circuit. As the Ring of One Hundred has counted fifteen, for example, a conductor (Fig. 43) which receives the output of the trigger 255 will be at +10 volts. This voltage is provided as an input to a pair of OR circuits 283 and 284. Thus conductors 268 and 269 will be at +10 volts so that a total increment of deflection of fifteen units is indicated. This positions the beams of cathode ray tubes in the fifteenth column. If the Ring of One Hundred were at twenty-four, for example, conductors 285 and 286 would be impressed with the +10 voltage output of the plus twenty trigger **255*a* and the plus four trigger 288 by way of their connected cathode followers. These voltages in turn are fed to OR circuits 290, 291 and 292, thus impressing this potential on the OR circuit output line 266, 267 and 269 and 270**. This would cause a deflection of the beams to the twenty-fourth column.

In relation to the scanning of the cathode ray tubes, it is evident that the Ring of One Hundred must indicate by virtue of its output conductor 293 being positive that the left hand tube must be unblanked when scanning coluns 1–25, and that its output conductor 294 must be positive when scanning columns 26–50 so that the right hand tube will be unblanked. When scanning columns 51 through 100 a cathode follower 295 (Fig. 43) will maintain an output conductor 296 at +10 volts which indicates that the beams should be displaced to the lower rasters.

*The vertical deflection circuits.*—The purpose of the vertical deflection circuits is to provide a means for controlling the vertical position of the electron beams of the cathode ray tubes, whereby astigmatism will be at a minimum by making the mean potential of the deflection plates the same as that of the last electrode in the electron gun.

Circuits to control the vertical deflection of the beams must be provided to cause the electron beam to scan a column, advancing rapidly row by row during the read-in process, and to temporarily position the beam at a level corresponding to a given row during the read-out process.

A circuit must be provided which will cause the electron beam to be deflected 15 units or rows below the first row of the upper raster in the 1 to 50 positions (see Figure 2). This is necessary in order that the beams may scan the 51 through 100 columns after the 1 through 50 columns have been scanned. In other words there are twelve rows in the first raster and two rows between rasters so that the first row in the lower raster is in effect the fifteenth row to which the beam must be deflected to initiate the scanning of the lower raster. The signal pulse which causes the beams to be displaced to the lower raster is supplied by the Ring of One Hundred and is operative in the vertical deflection circuits of Figure 41.

Figure 40:
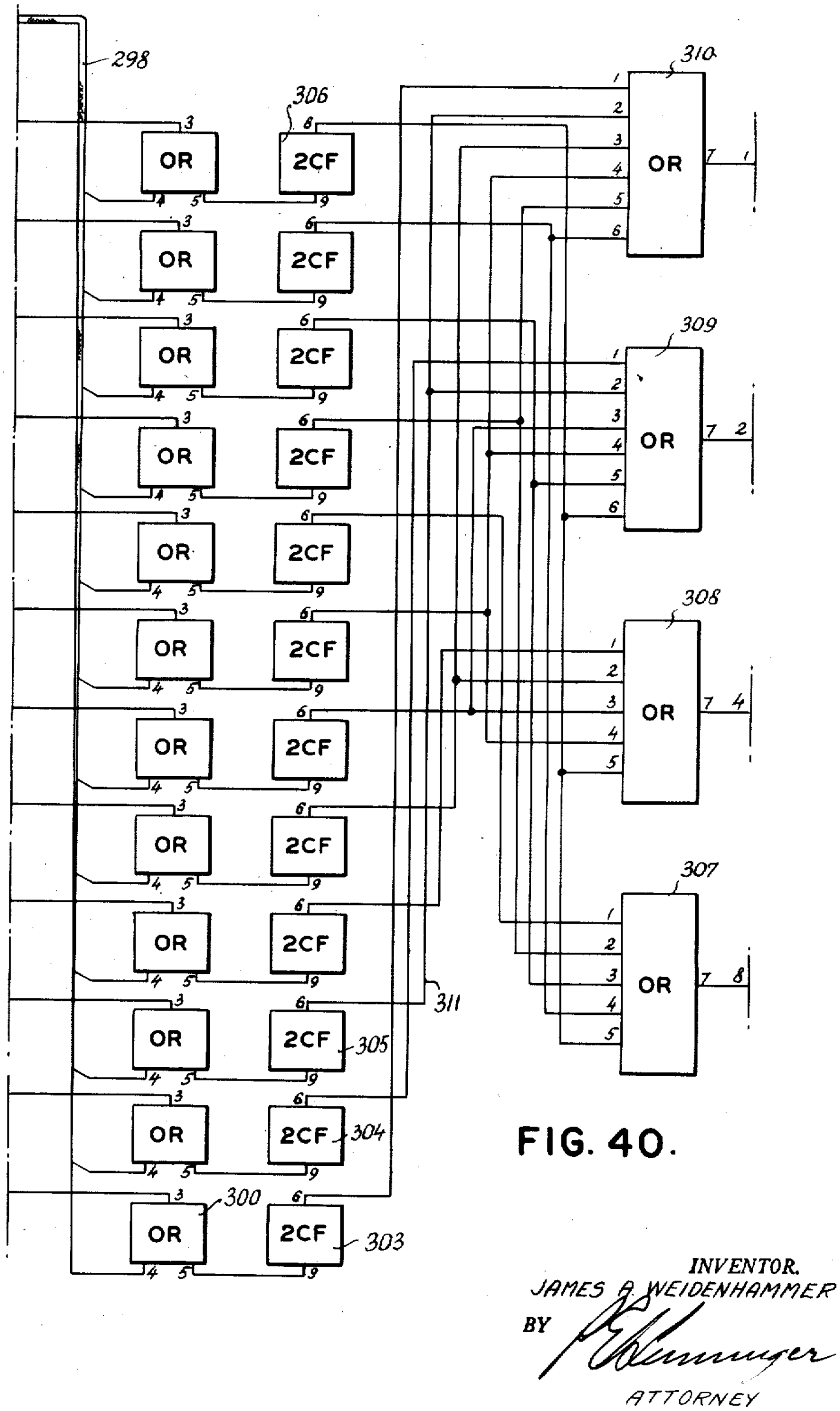

During the storage of information on the cathode ray tubes, the vertical deflection circuit is under the control of the Ring of Thirteen and the beam is successively moved from column to column in serial order. The timing pulses from the Ring of Thirteen are fed through a cable 298 (Fig. 38) to a group of twelve OR circuits, 300 for example (Fig. 40). The OR circuits of Figure 40, in effect, represent the index point positions in a column of a record card.

Figure 39:
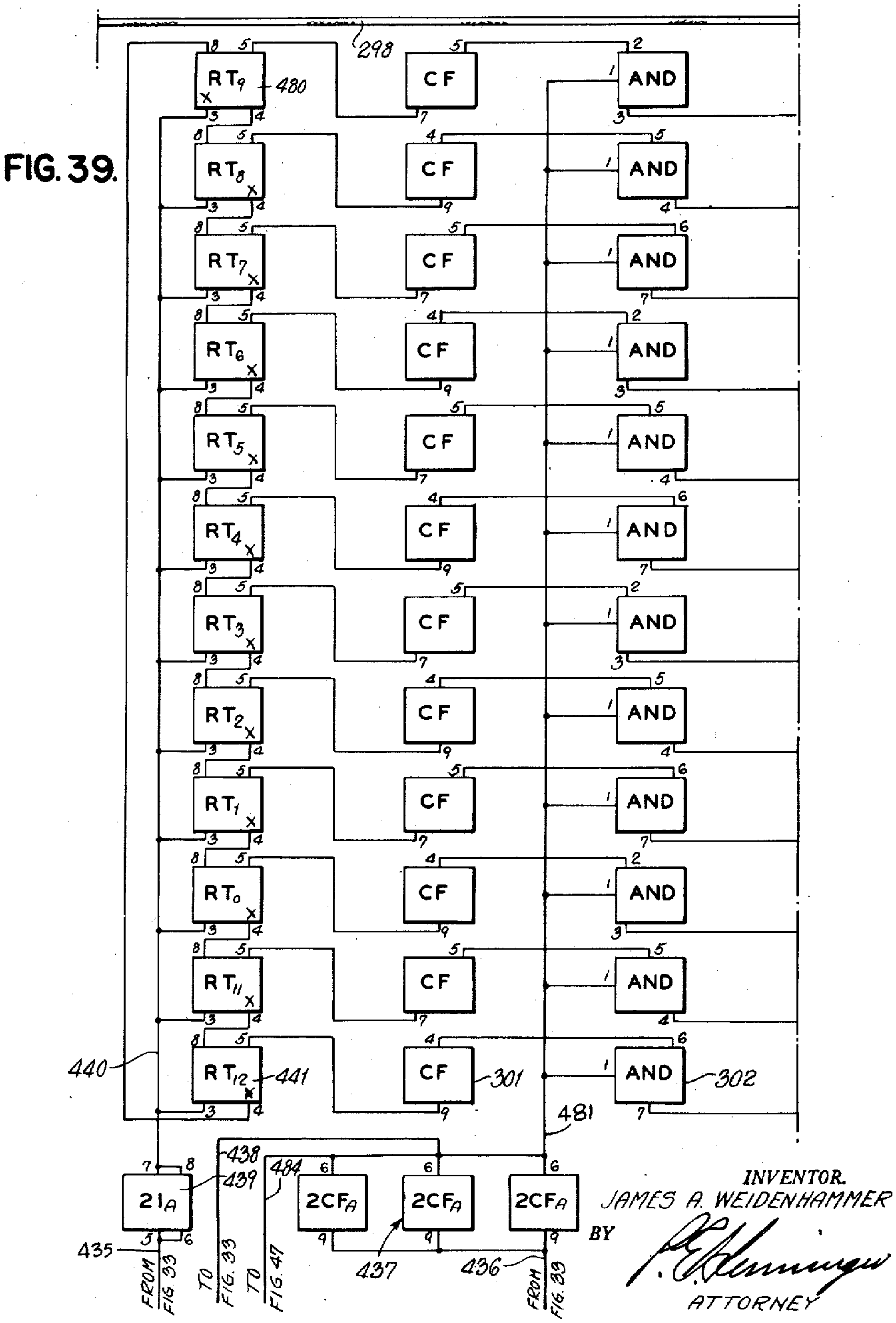

During the read-out of information from the cathode ray tubes to the thyratrons (and thus to the punch magnets for example) the vertical deflection circuits are controlled by the so called Punching Ring 36 (Fig. 1) and the beam scans each row before being advanced by this ring to the next row. The timing pulses from the Punching Ring reach the twelve OR circuits of Figure 40 through cathode followers, such as the cathode follower 301 in Figure 39, and by way of twelve associated AND circuits such as the AND circuit 302 (Fig. 39). The OR circuits of Figure 40 are connected to associated cathode followers, 303 for example. In Figure 40 (starting from the bottom of the column of cathode followers) the cathode follower 303 represents the 12 hole in the Hollerith Code, the cathode follower 304 represents the 11 hole, the cathode follower 305 represents the 0 hole and so on throughout the entire order until the cathode follower 306 represents the 9 hole. Only one of these cathode followers will present an output of +10 volts at any given time.

The cathode followers of Figure 40 are connected to four six-way OR circuits, 307, 308, 309, and 310, in such manner that the twelve possible positions of the beam in a column (represented by the cathode followers) are converted to a 1-2-4-8 code. Thus, the zero hole in the Hollerith Code, represented by +10 volts output from the cathode follower 305 is actually the third position from the top in a column on the cathode ray tube, and will be represented by the outputs of the six-day OR circuits as 2-1. The 0 (zero) hole would be represented by +10 volts on the cathode follower 305 output line 311 which passes its pulse through the OR circuit 309 and the OR circuit 310. In a similar manner the 9 hole would be represented by an 8-4, i. e. outputs from the OR circuit 307 and 308. The outputs from the four OR circuits 307 through 310 of Figure 40 are connected to inverters 312, 313, 314, and 315 respectively in Figure 41.

The vertical deflection circuit operates in the manner described in connection with the description of the horizontal deflection circuits. This description in essence stated that the inputs on one or more of conductors 316, 317, 318 and 319 will cause the inverters 312, 313, 314, and 315 respectively to operate the pairs of tubes producing the incremental deflection. As the beam is deflected down the column, the two pairs of tubes such as 320 and 321 (Fig. 41) or combinations of others, cause conductor 322 to be raised in potential if the conductor 323 is lowered in potential. The use of two pairs of tubes constitutes a push-pull deflection system as previously explained. The voltage on the conductor 322 (Fig. 41) operates a pair of cathode followers 324, while the voltage on the conductor 323 operates a pair of cathode followers 326. The output of the cathode followers 324 is fed to the deflection plates of the cathode ray tubes by way of a conductor 328, while the output of the cathode followers 326 is fed to the cathode ray tubes by way of a conductor 330.

During either rear-in or read-out of the cathode ray tubes, the beam must be dropped to the lower raster (Fig. 2) when columns 51 through 100 are to be scanned. The representation of information on the faces of the cathode ray tubes has been set up so that the 12 row of columns 51 through 100 will be 15 increments below the position of the 12 row of columns 1 through 50. Therefore, the addition to the pairs of tubes producing vertical of Δ1, Δ2, Δ4, and Δ8, the vertical deflection circuit includes pairs of tubes 331 and 332 which when operated will produce an incremental deflection of 15, or 15 units. These pairs of tubes are operated by inverter 333.

Figure 41:
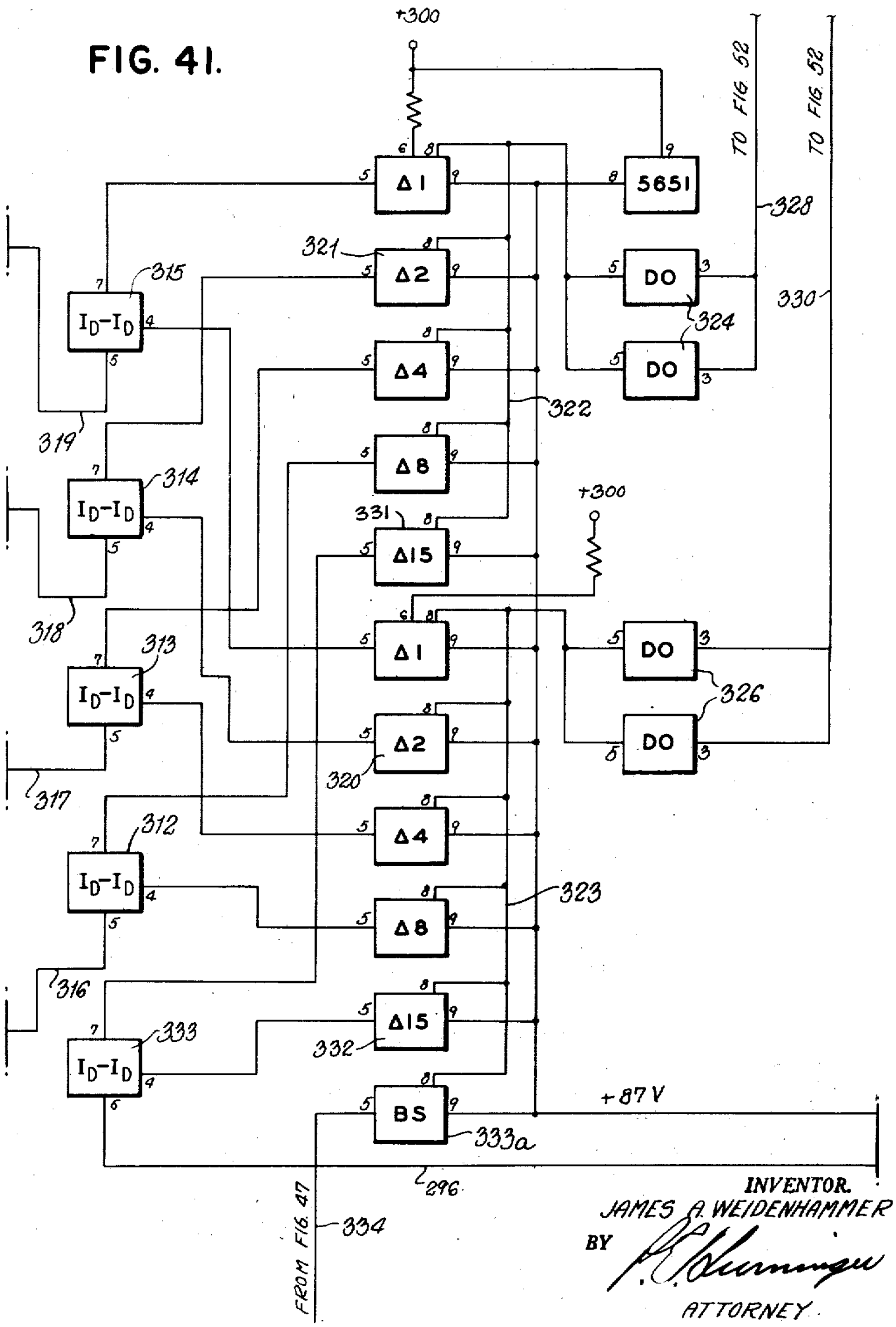

Since the Ring of One Hundred controlling the horizontal deflection circuit indicates the columns in which the beams stand at any one instant, the same ring can be used to determine when the beam is to be dropped to cover columns 51 through 100. The description of the Ring of One Hundred indicated that the trigger 245 (Fig. 43) will be turned "on" when columns 51 through 100 are to be scanned. Thus the cathode follower 295 will produce an output of +10 volts on the conductor 296 which is connected to the inverter 333 (Fig. 41). The +10 volt input to the inverter 333 will cause the Δ15 deflection necessary for the beams to cover columns 51 through 100.

Figure 10:
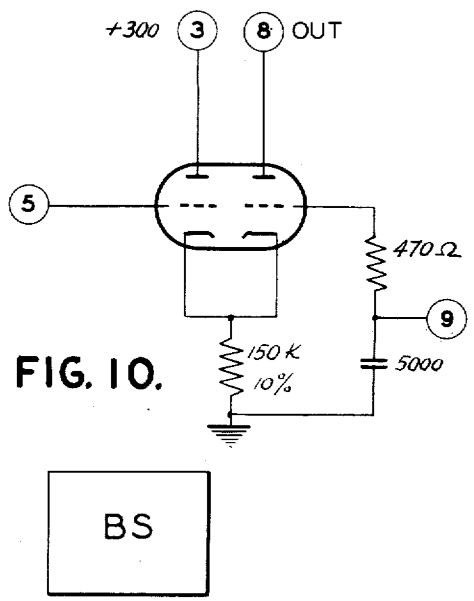
Figs. 10 through 18 illustrate both the block symbols and the detailed wiring diagrams of deflection increment circuits which are similar to each other except in the value of the increment resistor which determines the current drawn by each unit.
Figure 11:
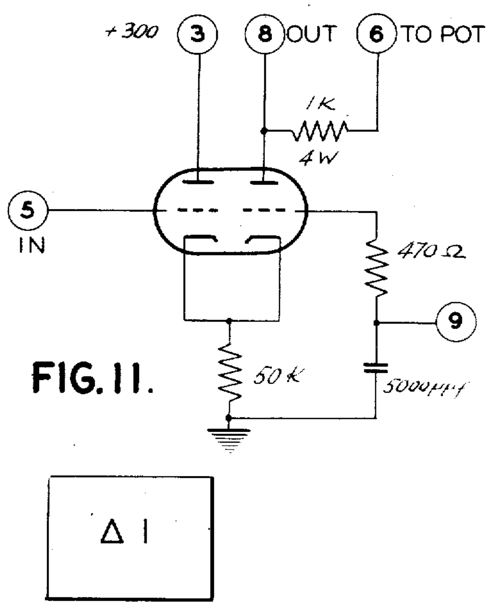
Figure 12:
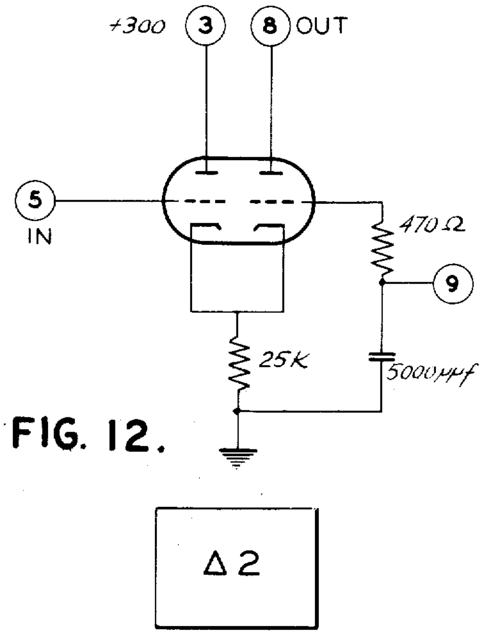

*Representation of significant data on tube raster.*—If a hole is to be punched in a card, the dot on the cathode ray tube representing the location of the hole will be elongated into a vertical dash. This is accomplished during both the initial read-in and during the regeneration periods. The beam is first positioned in a given location by the deflection circuits. A vertical deflection bit sweep circuit 333*a* (Fig. 41) which is the same as that shown in Fig. 10 is operated to cause the cathode ray beam to move slightly in an upward direction. If a dash is to be written, the proper cathode ray tube is unblanked for the period of this bit sweep. However the bit sweep circuits 333*a* are always operative and the fact that a dash is or is not written is dependent upon whether or not a cathode ray tube is unblanked. The input pulse to the bit sweep circuit 333*a* is on a conductor 334 (Fig. 41) and originates in a bit sweep trigger 335 in Figure 47. The operation of the bit sweep control circuit will be described when the dot-dash control circuits are fully described in the following:

*Dot-dash control circuits.*—Heretofore there has been described the manner in which a character is read from the magnetic tape, converted to the Hollerith Code and delivered as a series of pulses in timed sequence from the output of the decoding matrix. The manner in which the beams of the cathode ray storage tubes scan their respective rasters in step with the interrogation of the conversion matrix during read-in has also been described. It is now necessary to explain the manner in which a pulse appearing number on the conductor 336 (Fig. 37) causes a dash to be written on the face of the cathode ray tubes. It may be noted that if a dash is not to be written on the face of a cathode ray tube, a dot will be written instead.

Assume that information has been read from the tape, passed through the decoding matrix (Figs. 36 and 37) and is now ready to be stored on the face of a cathode ray tube. In Figure 37 the positive pulses from the conversion matrix representing information are applied to the output conductor 336 which terminates in the OR circuit 364 in Figure 47. The 100 kc. pulses from the multi-vibrator 175 (Fig. 34) are present on the conductor 230 in Figure 47. The conductor 230 has a continuation 338. The conductor 193 in Figure 47 is connected in Figure 38 to the conductor 191 and will be at —30 volts once the Ring of Thirteen starts operating. These few conditions will be sufficient to explain the operation of the circuits which control the storing of a dot or a dash on the cathode ray tubes.

By reason of the fact that an inverter 340 (Fig. 47) is cut "off," its cathode follower 341 will be conducting heavily to drive an OR circuit 342, causing it to deliver a positive voltage to an AND circuit 344. Since the positive voltage applied to the AND circuit 344 by the OR circuit 342 will be present, while an entire column of the cathode ray tube is being read into, the AND circuit 344 is under control of one of a pair of cathode followers 345 or 346.

A single shot multi-vibrator 348 is continuously driven by the clock pulses on its input line 350. The leading edge of a positive clock pulse will cause the single shot multi-vibrator 348 to operate and to deliver a positive 4 microsecond pulse which is inverted by an inverter 351. If no information is received from the conversion matrix during this timed pulse, a dot will be written on the cathode ray tube. In this case, the trailing edge of the negative 4 microsecond pulse from the inverter 351 will operate a single shot multi-vibrator 352. The operation of the single shot multi-vibrator 352 will cause a positive pulse of 0.7 microsecond duration to be delivered to the cathode follower 345. This 0.7 microsecond pulse will drive the cathode follower 345 into conduction so that a positive pulse (0.7 microsecond) will appear on pin 4 of the AND circuit 344. Due to the fact that a positive pulse is present at pin 5 of the AND circuit 344, this circuit will emit a positive pulse and cause a connected cathode follower 352 to conduct. The plus 10 voltage output of the cathode follower 352 is applied to pin 4 of a pair of AND circuits 353 and 354 (Fig. 46).

It will be remembered that if the Ring of One Hundred is counting between 1 and 25 or between 51 and 75, the conductor 293 (Fig. 43) which feeds into the AND circuit 353 (Fig. 46) will be at +10 volts. However, if the ring is counting between 26 and 50 or between 76 and 100, the conductor 294 (Fig. 43) which feeds into the AND circuit 354 (Fig. 46) will be at +10 volts.

In view of the preceding, the positive 0.7 microsecond pulse at the output of the cathode follower 352 (Fig. 47) will operate either the AND circuit 353 or the AND circuit 354 (both in Figure 46). If the AND circuit 353 is operated, for example, the positive pulse from that circuit will drive an inverter 356 and cause it to conduct thus cutting "off" a connected inverter 358. This causes a positive pulse to appear on the output connector 360. The connector 360 is connected to the control grid of the left cathode ray tube. This tube is therefore unblanked for 0.7 microsecond in order to write a dot. Had the AND circuit 354 been operated, its connected inverters 361 and 362 would have been influenced to impress positive pulse on the output line 363. The line 363 is connected to the grid of the right cathode ray tube which tube consequently would be unblanked, for 0.7 microsecond.

Figure 51 is a timing chart which shows, among other conditions, the function of the pulses on the cathode tube grid control lines. If a dash is to be written on the cathode ray tube, a positive pulse will be registered in conductor 336 (Fig. 37) and will enter an OR circuit 364 in Figure 47 to cause an inverter 366 (Fig. 46) to be driven into conduction. The negative output of the inverter 366 will cause a trigger 367 to transfer such that the left side thereof is conducting. (The trigger 367 had previously been reset with the right side thereof conducting.) Thus, with the left side of trigger 367 conducting, the output pin 8 thereof will be at a high positive potential which causes the cathode follower 368 to be rendered fully conductive. The positive output of the cathode follower 368 results in a positive input to the pin 4 of an AND circuit 369. It should be borne in mind that this positive input will continue only so long as the trigger 367 is conducting on its left side. The voltage pattern on pin 8 of the trigger 367 is shown on the timing chart, Figure 51.

The single shot multi-vibrator 352 (Fig. 47) which when it fires produces a positive 0.7 microsecond pulse at its output pin 8, drives an inverter 370 to conduct so that a negative 0.7 microsecond pulse is applied to a single shot multi-vibrator 371. The trailing edge of this pulse causes the single shot multi-vibrator 371 to emit a positive pulse on its output conductor 372 for a duration of 3.5 microseconds. The trailing edge of the 3.5 microsecond pulses causes the trigger 367 (Fig. 46) to transfer so that it conducts on its right side. However, this 3.5 microsecond pulse will drive a cathode follower 373 to conduct. The output of the cathode follower 373 constitutes the second input to the AND circuit 369.

Thus, it is seen that the input to the AND circuit 369 from the cathode follower 373 is controlled by the output of the single shot multi-vibrator 371 (Fig. 47); the other input to the AND circuit 369 by way of the cathode follower 368 is controlled by the output of the trigger 367. The coincidence of these two inputs results in the wave form of Figure 51 labelled 369 output.

Figure 13:
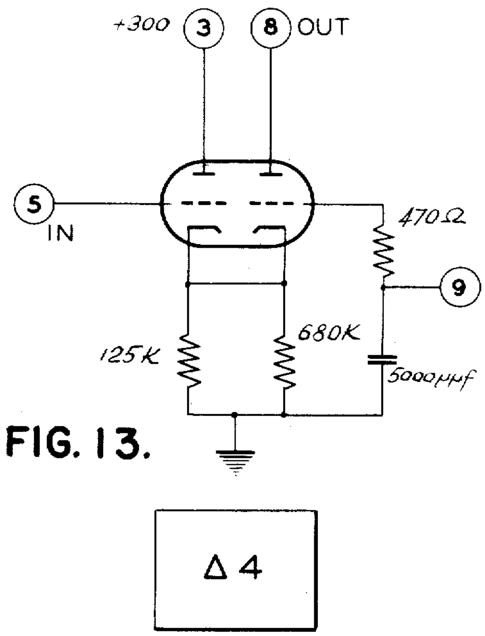
Figure 14:
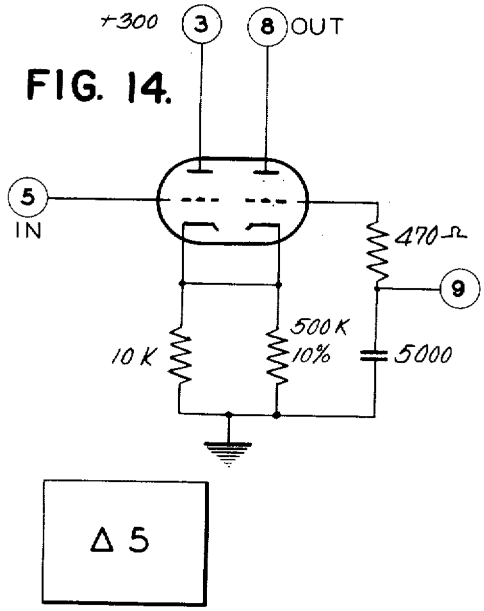
Figure 15:
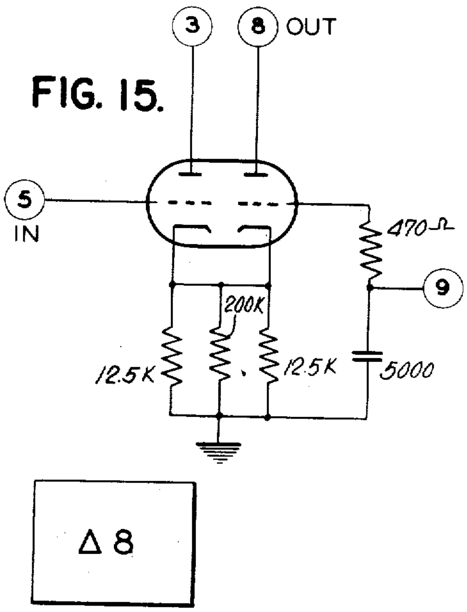
Figure 16:
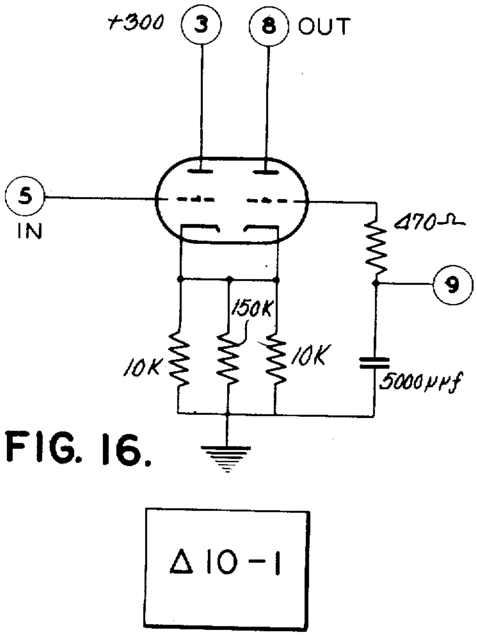
Figure 17:
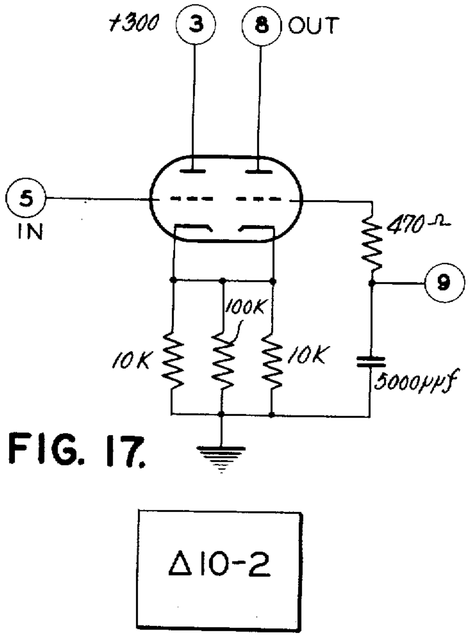

The output of the AND circuit 369 is applied to the cathode follower 346 (Fig. 13). Since the output of the cathode followers 345 and 346 are connected as an input to the AND circuit 344, an input to the cathode follower 346 will have the same influence on the AND circuit 344 as the output from the cathode follower 345, as described above.

Thus, if a dash is to be written on the cathode ray tubes as a result of a signal from the decoding matrix, the voltage pattern applied to the control grid will be that shown in Figure 51 as "Grid of CRT for Dash." This wave form causes the cathode ray form tube to be unblanked for its duration.

*Bit-sweep control.*—When the cathode ray tube is being scanned during any operation, the electron beam is advanced from position to position, as stated. Once the beam is advanced to a position, the cathode follower 345 (Fig. 47) is operated for approximately 0.7 microsecond such that a dot is written. The beam is then moved vertically upward by the bit sweep circuits 333*a* (Fig. 41). The vertical bit sweep occurs whether or not a dash is to be written on the tube. However, if a dash is to be written, the cathode follower 346 (Fig. 47) is operated such that the tube is unblanked while the vertical bit sweep occurs.

In Figure 47 the conductor 338 is connected to the conductor 230 which is being supplied with the 100 kc. clock pulses. These positive pulses drive an inverter 374 (Fig. 47) such that the negative pulses thereof are applied to the bit sweep trigger 335. The leading edge of a negative pulse from the inverter 374 causes the trigger 335 to transfer so that its left side is conducting. Approximately 4 microseconds later, the trailing edge of the pulse of the inverter 351 will cause a single shot multi-vibrator 375 to operate, thereby applying a positive 1 microsecond pulse to the bit sweep trigger 335. The trailing edge of this 1 microsecond pulse will cause the bit sweep trigger 335 to transfer so that it will conduct on its right side. The resulting positive output of the trigger 335 is applied by way of its output line 334 to the bit sweep circuits (Fig. 41). This causes the vertical bit sweep that is necessary for making a dash. The bit sweep trigger 335

(Fig. 47) will be reset by the next clock pulse on its input lead 230.

*Tape drive control circuit*

There is provided herein a tape drive control circuit which is adapted to cause the tape driving unit of the aforesaid Weidenhammer et al. application to be operated at the proper time in the cycle of the card punch so that the tape drive mechanism will be fully up to speed by the time the circuits herein are ready to accept the first character of the unit record to be read.

As previously stated, the regeneration of the patterns on the face of the cathode ray tubes is in progress whenever the mechanism hereof is not actually using information in the process of reading data into the cathode ray tubes or reading data out of the tubes. Consequently the regeneration circuits for the cathode ray tubes will be in operation just previous to the time a read-in operation is started. A cam operated circuit breaker P24 (Fig. 53) will close at 13.6 time of the card cycle. The closing of the circuit breaker P24 will apply plus 40 volts to a conductor 376. The conductor 376 is connected to the left grid of the key Read Trigger 377 (Fig. 33). The +40 volts on conductor 376 will cause the key trigger 377 to be pulled over so that it will be conducting on its left side. A cathode follower 378 will be driven into full conduction so that +10 volts are applied to an inverter 379. The +10 volts applied to the inverter 379 will cause a negative pulse to be fed to the right side of a Tape Run Trigger 380 causing it to transfer so as to conduct on its left side. Transfer of the trigger 380 will place a positive potential on its output lead 381 so that a connected cathode follower 382 will be rendered fully conducting. Whenever the cathode follower 382 is fully conducting its output line 383 will be raised to +10 volts. This voltage is fed to the control circuits of the tape drive unit.

When the tape drive unit receives the +10 volts on line 383 it will be energized to drive the tape in the forward direction. The mechanism by which the tape is driven either in a forward direction, in a reverse direction, or is stopped forms no part of this invention but is the subject matter of the aforesaid Weidenhammer et al. application and need not be described specifically herein.

Throughout the period of time when a unit is read from the tape, the control lead 383 will remain at +10 volts. In order to stop the feed of tape through the tape read/write heads of the tape drive mechanism, the +10 volts must be removed from the lead 383. There are two occasions when the tape drive unit must be stopped. In the first place it must be stopped when a one hundred character unit record has been fed so that this record which has been stored on the cathode ray tubes may be read out to the punch mechanism. This operation is necessary before the machine will be ready to receive a new record. In the second place the tape drive mechanism must be stopped whenever it reaches the end of the tape. The end of the tape is signified by a character herein called a Tape Mark.

Hereinbefore during the discussion of the decoding matrix, it was indicated that the receipt of a Record Mark from the tape will cause the conversion matrix to drive the cathode follower **100*b* into full conduction so that its connected conductor 172 will have impressed thereon +10 volts. The conductor 172 is connected to a conductor 385 (Fig. 33) which in turn is connected to an OR circuit 386. The fact that the conductor 385 has thereon +10 volts upon the receipt of a Record Mark will cause the OR circuit 386 (Fig. 33) to be operated so that an inverter 387 connected thereto will deliver a negative pulse to a single shot multi-vibrator 388. The single shot multi-vibrator 388 will emit a positive 16 millisecond pulse. The trailing edge of this pulse applied to the trigger 388 will cause the trigger to transfer from its right side to its left side. The result of this transfer is that the output lead 381 thereof will assume a low positive potential, so that the cathode follower 382 will be cut "off." By reason of the fact that the cathode follower 382 does no longer conduct, its output lead 383 will assume a potential of −30 volts. As pointed out above, the fact that the lead 383 is no longer at +10 volts will cause the control circuits of the tape drive mechanism of the aforesaid Weidenhammer et al. application to stop feeding the magnetic tape. The 16 millisecond delay generated in the single shot multi-vibrator 388** is necessary to properly position the tape when it comes to a stop.

Whenever a reel of tape reaches one of its extremities it should contain a Tape Mark which will be interpreted by the conversion matrix of Figure 36 causing the output conductor 174 to be raised to +10 volts. The conductor 174 is an input to the OR circuit 386 (Fig. 33). It was pointed out in respect to the function of a Record Mark that whenever the OR circuit 386 transmits a pulse the Tape Run Trigger 380 will transfer so that the tape drive mechanism is caused to stop feeding tape.

Figure 54:
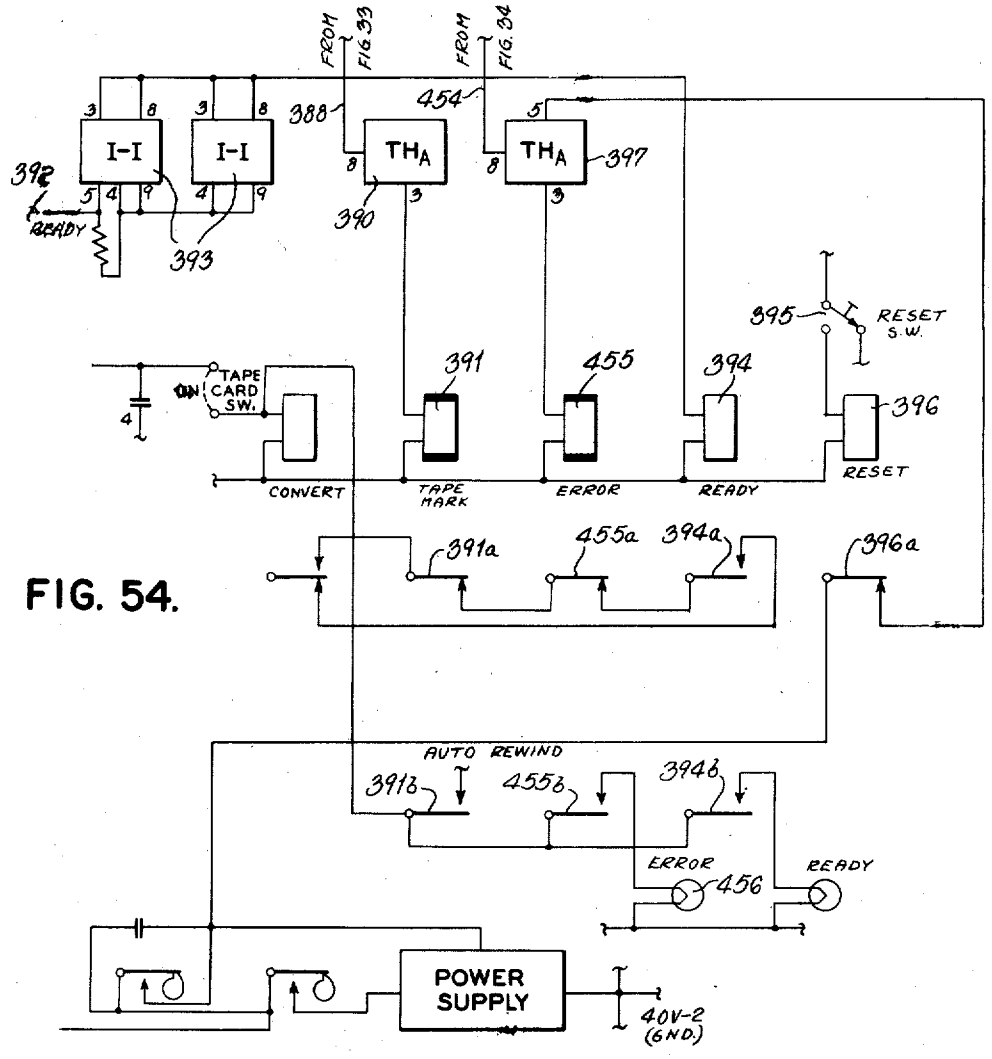

The Tape Mark signal appearing on conductor 174 is applied to a conductor 388 (Figs. 34 and 54). The +10 volts applied to the conductor 388 indicates the presence of a Tape Mark and causes a thyratron 390 (Fig. 55) to fire so that a tape mark relay 391 is energized. The fact that the tape mark relay 391 is energized causes a set of its contacts **391*a* to be opened so that the punch mechanism is disabled. The punch is disabled due to the fact that the contact 391*a* is in series with the punch start relay of the punch mechanism, the punch start relay being in control of the punch clutch. The particular punch mechanism and its control is not a part of this invention and its nature and operation which may be seen in the aforesaid patent granted to C. D. Lake**.

*Tape drive ready circuit.*—There has been provided herein a Ready Circuit for the tape drive unit to insure that the card punch will not operate if the tape drive unit for any reason is not ready to feed the magnetic tape. The Ready Circuit in the tape drive mechanism consists of a series of interlocked switches which are operated by such functions as the closing of the tape drive covers, the presence of tape on the tape reels, the fact that the tape is unbroken, and numerous other conditions which need not be discussed here. It is sufficient to say that if the tape drive mechanism is ready to feed tape, a conductor 392 (Fig. 54) will be at +10 volts. As a result of the volts impressed on the conductor 392, an inverter network 393 will conduct so that a ready relay 394 will be energized. Energization of the ready relay 394 will close those points **394*a*** so that the start relay of the tape punch will be energized and consequently the tape clutch will be conditioned for energization at the appropriate time.

*Automatic re-wind.*—Whenever the tape drive mechanism receives a Tape Mark from the tape, it is necessary to cause the tape drive mechanism to rewind the tape on its reels. It was pointed out in respect to the operation of a Tape Mark that it will cause the Thyratron 390 (Fig. 54) to be fired so that the relay 391 will be energized. The fact that the tape mark relay 391 is energized causes its contacts **391*b*** to be closed so that the +40 volts are applied to an automatic re-wind line. The automatic re-wind line is connected to the control mechanism of the tape drive unit in such manner that whenever this line is at +40 volts the machine will cause the tape re-wind mechanism to be operated and the tape to be re-wound. Here again the specific nature and function of the tape re-wind system is not part of this invention and no further inquiry into its nature need be made at this point.

*Error reset circuit.*—Whenever an error is made by the mechanism herein, the machine will be stopped so that the source of the error can be determined. In order to condition the circuits so that the operations can proceed in normal fashion, the triggers and error checking circuits must be reset. This is accomplished by momentarily closing a reset button 395 (Fig. 54). Closing of the reset button 395 causes a reset relay 396 to be energized so that its contact 396a will be opened. Opening of the contacts 396a will quench a thyratron 397. The thyratron 397 is caused to fire whenever the error checking circuits which are to be described hereinafter have determined the existence of an error and have transmitted a pulse to the thyratron 397. Consequently the thyratron 397, when fired, indicates the existence of an error and must be quenched before the control circuits can proceed with their normal functions.

*Regeneration of the cathode ray tube patterns*

The patterns of information stored on the face of the cathode ray tubes are regenerated by the process of reading out the information so stored and causing this same information to be re-entered at the same location on the tubes. Consequently the regeneration process involves the operation of two different circuits. The first of these circuits causes a dot or dash to be written on the cathode ray tubes depending on whether a dot or a dash was originally stored. The circuit is a part of the Dot-Dash Control Circuit of Figures 46 and 47 which has been described heretofore in reference to the Dot-Dash Control Circuits. The second circuit involved in the process of regeneration is composed of certain controls which govern the operation of the deflection circuits, the cycling of the timing ring, and control the starting and stopping of the regeneration process. The regeneration control circuits cause regeneration to take place at all times except when information is actually being stored or on being read from the cathode ray tubes. Thus, regeneration will take place between the reading out to the punch in the interval between read-out of any two rows of information from the cathode ray tubes. The Dot-Dash Control Circuits used during regeneration will be considered first since much of this circuit has already been described and is consequently familiar to the reader.

Figure 52:
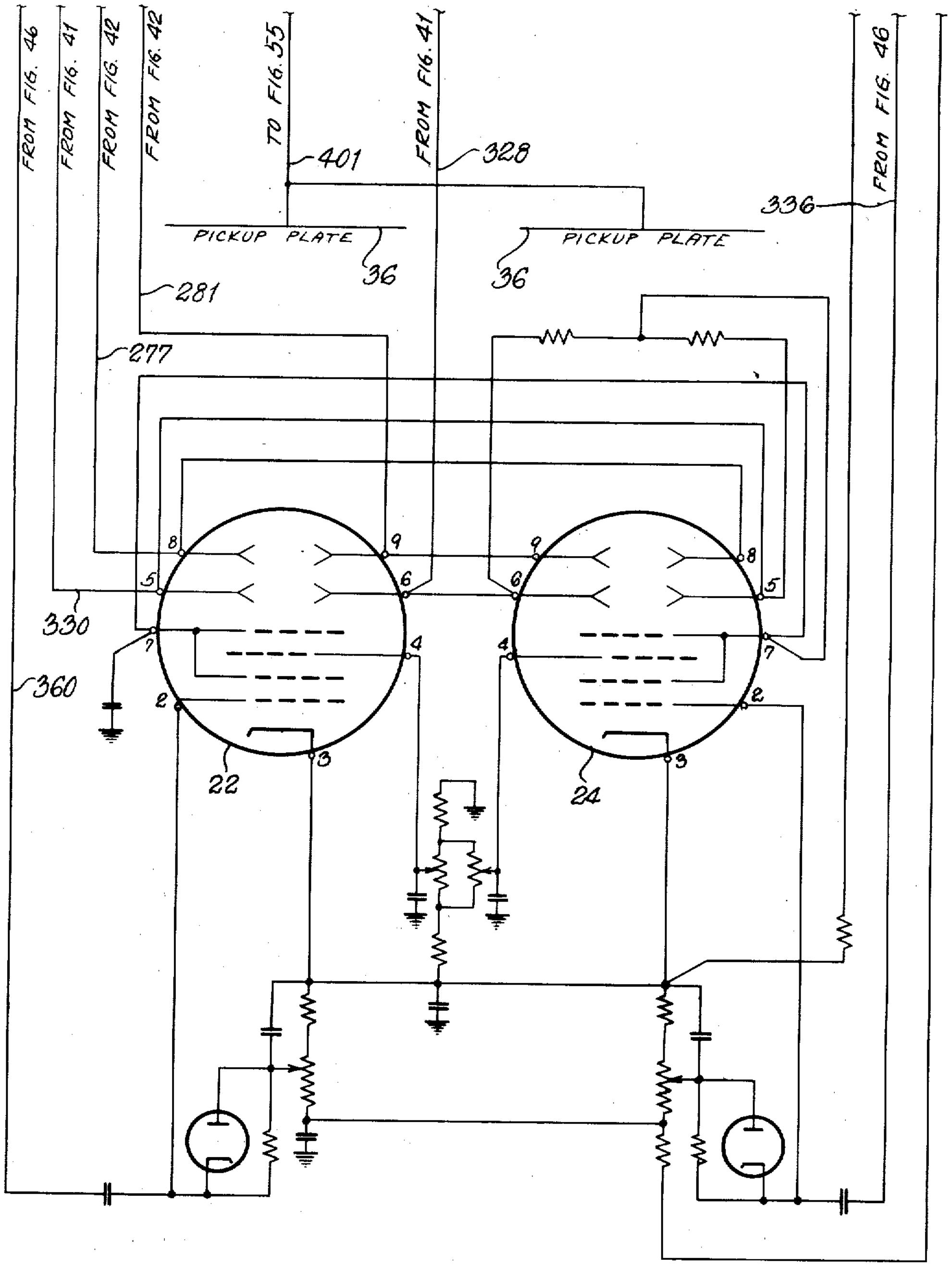

*Dot-Dash Circuits for regeneration.*—Consider for the moment that the regeneration control circuits are in operation and are causing the beams of the cathode ray storage tubes of Figure 52 to scan their respective tube faces. If a beam encounters a dash during the scan of a particular column, a video signal will be produced and will be present on one of the pick-up plates 36 (Figs. 1 and 52).

Figure 55:
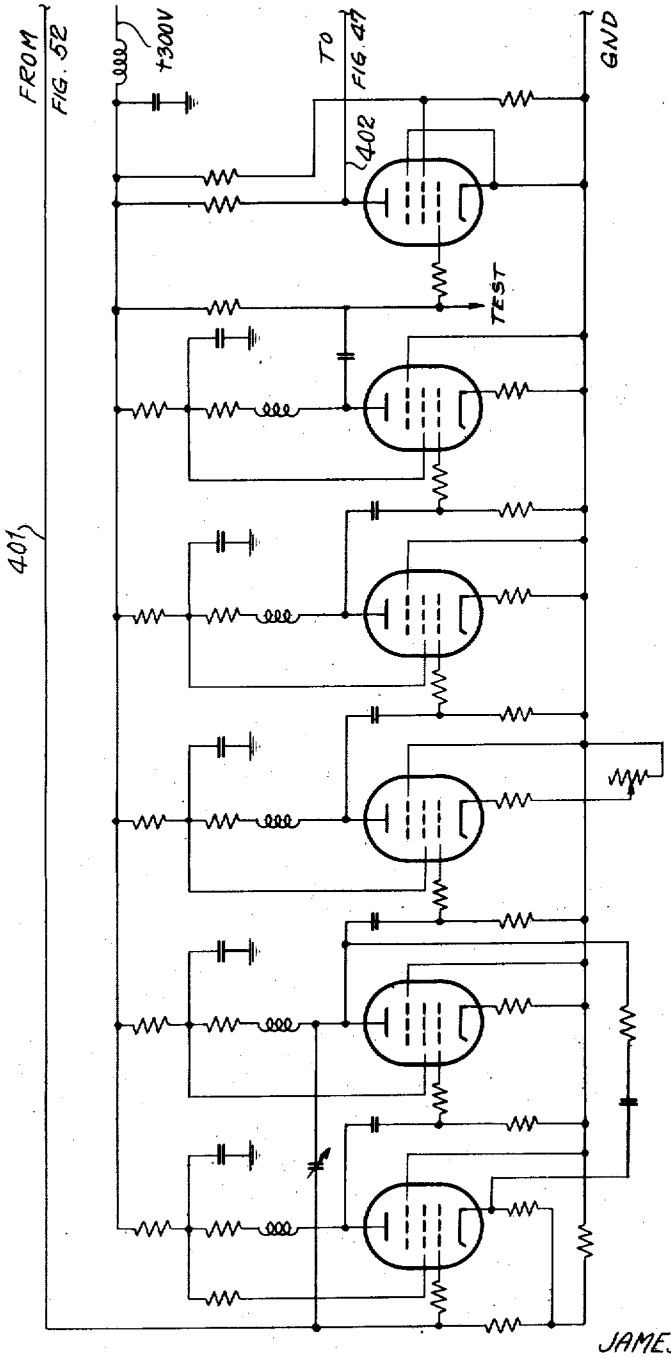

The pick-up plates 36 are connected by way of a common conductor 401 to the input of the video amplifier illustrated in Figure 55. Since the video amplifier is of conventional construction and operation, it need not be described in detail other than to say that a video signal representing a dash on its input line 401 will cause a positive pulse to appear on its output line 402.

It was indicated in connection with the discussion of the Character Gate Control Circuits and again in connection with the description of the Dot-Dash Control Circuits that the conductor 235 (Fig. 47) will be at −30 volts during the read-in operation. Since this condition (i. e. the minus potential), renders inoperative an AND circuit 403, any signal arriving from the video amplifier on line 402 is prevented from effecting the operation of the Dot-Dash Control Circuits during the reading in of information to the cathode ray tubes.

However during times when the regeneration of the stored data on the face of the tubes is effective, the conductor 235 will be positive. During regeneration periods the beams will sweep the cathode ray tubes so that video pulses will be received by the pick-up plates 36 (Fig. 52). These pulses will be amplified by the video amplifier and will be present on the conductor 402 (Figs. 56 and 47) as positive pulses.

It was explained in connection with the Dot-Dash Control Circuits that the conductor 193 (Fig. 47) will be at −30 volts during the time that the Ring of Thirteen is in operation. The Ring of Thirteen controls the vertical deflection system during regeneration in precisely the same manner as during the read-in operation. (Regeneration takes place by scanning column by column.) The fact that the conductor 193 (Fig. 47) is at −30 volts will cause the pin 3 of the AND circuit 344 to be at +10 volts, since the inverter 340 impresses a positive pulse upon the AND circuit 344 by way of the cathode follower 341 and the OR circuit 342.

At the same time the leading edge of a clock pulse on the conductor 350 (by way of conductor 230) will cause the single shot multi-vibrator 348 to emit a positive pulse of 4 microseconds in length. The trailing edge of the single shot multivibrator pulse will, by way of the inverter 351, cause a single shot multi-vibrator 404 to deliver a positive 0.6 microsecond pulse to a cathode follower 405. The +10 volts output from the cathode follower 405 is applied to an AND circuit 406.

A video pulse (representing a dash) arriving on the conductor 402 is capacity coupled to amplifying and shaping stages 407 and 408 which are like the circuits shown in Figure 26. The positive pulse from the inverter 408 is applied to a cathode follower 410 so that a positive pulse is directed to the second input of the AND circuit 406.

The coincidence of +10 volts inputs on the AND circuit 406 will cause a pulse of +10 volts to be applied as one input to the AND circuit 403. The other input of the AND circuit 403 is at +10 volts during regeneration as explained above. The output of the AND circuit 403 is fed by way of the OR circuit 364 and the inverter 366 (Fig. 46) to the trigger 367, causing this trigger to transfer its conducting state.

As explained in connection with the description of the Dot-Dash Control Circuits, the transfer of the conducting state of the trigger 367 causes a signal to be fed by way of the cathode follower 368, the AND circuit 369 and the cathode follower 346 (Fig. 47) to the AND circuit 344. Since both inputs to the AND circuit 344 are positive, an output signal will result which will drive a cathode follower 352. Since the output of the single shot multi-vibrator 371 caused AND circuit 369 (Fig. 46) to be operated for 3.5 microseconds, the signal at the output of the cathode follower 352 (Fig. 37) will cause the appropriate cathode ray tube to be unblanked so that a dash is written. The timing chart (Fig. 51) may be consulted in relation to the Dot-Dash Control Circuits of Figures 46 and 47.

*Regeneration control circuits.*—The regeneration control circuits allow the patterns on the cathode ray storage tubes to be regenerated at all times except during the actual reading in of a column or the reading out of a row from the cathode ray tubes. The control circuits must also provide for the return of the scanning beams to the starting point of the rasters on the cathode ray tubes when regeneration is interrupted in the middle of a pattern. During the regeneration process the beams of the cathode ray tubes scan column by column as during the read-in operation. The Ring of Thirteen advances the beam down the column at the 100 kc. rate. The "Thirteen Carry Signal" produced as the Ring of Thirteen reaches the bottom of the column, causes the Ring of One Hundred to advance one position and move the beam to the next column. It has been previously stated that the 100 kc. clock pulses are fed to the Ring of Thirteen from the AND circuit 228 (Fig. 34) and the inverter 232 by way of the conductor 182. It may now be shown how the regeneration control circuits operate the AND 228 circuit so that the clock pulses can reach the Ring of Thirteen. Basically the regeneration control circuits are such that in order for the regeneration process to proceed, a regeneration stop trigger 411 (Fig. 33) must have its right side conducting. If this is the case, the output from the trigger 411 will be at a high positive voltage which drives a cathode follower 412 into its conducting state whereupon a positive pulse will be delivered to the OR circuit 227 (Fig. 34). Consequently the AND circuit 228 which is fed by the OR circuit 227 will be operated by the 100 kc. clock pulses arriving on conductor 229 as the second input to the AND circuit 228. This causes a negative clock pulse to be delivered by way of the inverter 232 to the Ring of Thirteen by way of the conductor 182. Under the conditions stated above, regeneration of the pattern will continue over and over again until the regeneration stop trigger 411 is reset to conduct on its left side. The regeneration control circuits may now be considered in relation to the reading in and the reading out operations.

Figure 53:
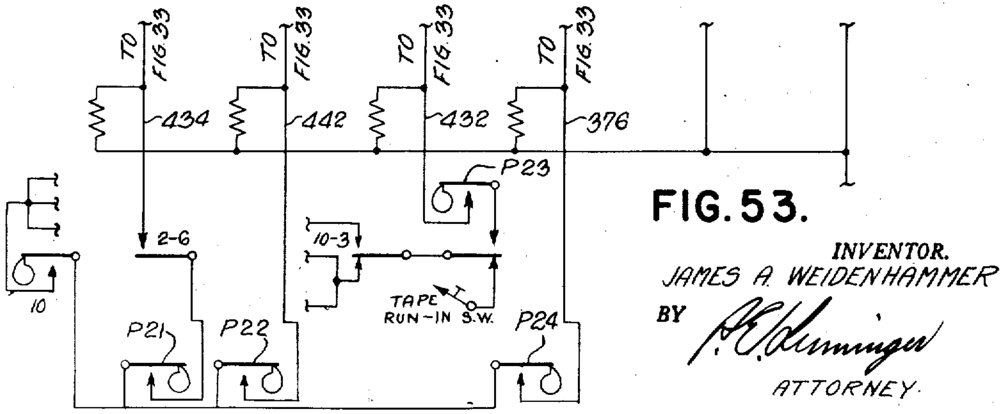

*Read-in about to commence.*—Let it be assumed that the regeneration of the patterns on the cathode ray tubes is in progress. The row of the last card has been punched at 9 time in the card cycle. Regeneration was started and will continue until approximately 13.6 time in the card cycle. In Figure 53 the circuit breaker P24 will close its contact at 13.6 time in the card cycle and thereby place +40 volts on the conductor 376. The conductor 376 is connected to the left grid of the Read Trigger 377 (Fig. 33).

Reference to Figure 21 will show that this key trigger is designed for operation from a +40 volts circuit breaker pulse. The component has been so designed that the undesirable effects of "bounce" associated with a cam operated circuit breaker are eliminated. The key trigger is designed so that a +40 volts signal on a particular grid will cause the trigger to pull over so that the side to which the signal was applied will start conducting.

The +40 volts applied by the circuit breaker P24 (Fig. 53) by way of the conductor 376 to the Read Trigger 377 will cause the Read Trigger to transfer conduction to its left side. This results in a positive signal from its output pin which will drive the cathode follower 378 into conduction thereby applying +10 volts to OR circuit 414. The output of the cathode follower 378 is also applied to the inverter 379 which is a part of the circuit controlling the tape handling unit to cause it to operate and feed a length of tape containing a unit record. This circuit was described under the heading of Tape Drive Control Circuit.

The +10 volts applied to the OR circuit 414 causes it to transmit a pulse to drive inverter 415 into conduction. The negative output of the inverter 415 is applied to the left grid of a trigger 416 causing this trigger to conduct on its right side. The trigger 416 is considered reset when its left side is conducting. The transfer of conduction in the trigger 416 causes +10 volts to be applied to a cathode follower 417. The +10 volts output of the cathode follower 417 is applied as one input to an AND circuit 418.

Since regeneration has been progressing during this time the Ring of Thirteen continues to advance the beams of the cathode ray tubes to the bottom of the column presently being scanned. When the Ring of Thirteen reaches the end of its count, the Thirteen Carry Signal is delivered by way of the conductor 192 to the AND circuit 418 where it constitutes the second input. The Thirteen Carry Signal on line 192 is also delivered by way of the cathode follower 238 to the OR circuit 239 to cause the Ring of One Hundred to advance one position. The beams of the cathode ray tubes are now instantaneously located at the top of the next column.

The coincidence of positive input signals in the AND circuit 418 causes an output which will drive an inverter 420 to conduct, thereby producing a negative output signal which is fed to the trigger 416 causing this trigger to transfer and conduct on its left side. This action causes the trigger 416 to emit a negative going signal on its pin 8 which is applied to and causes the Regeneration Stop Trigger 411 to transfer and conduct on its left side. As explained previously whenever the left side of the Regeneration Stop Trigger 411 is conducting, the clock pulses are isolated from the Ring of Thirteen so that regeneration of the stored image on the cathode ray tubes is effectively stopped.

Even though regeneration has been stopped, the beams must be returned to the beginning of the rasters in order that they may be ready to start a new operation as may be dictated. The operation described above returns the beam to the top of the particular column in which it was scanning. However, the beam might conceivably be in any one of the one hundred columns and must, therefore, be returned to the top of the first column.

The negative signal which is the output on pin 8 of the trigger 416 (Fig. 33) and which was effective to turn on the trigger 411 is also applied as an input to a so-called Fast Run Out Trigger 421 and causes this trigger to conduct on its left side. As a result, a positive signal is applied to a cathode follower 422 which applies its positive output of 10 volts to an OR circuit 423 and a cathode follower 424. By operating the OR circuit 423 a cathode follower 425 is driven into conduction to supply +10 volts to an AND circuit 426. Thus the 100 kc. clock pulses on conductor 229, constituting the second input to the AND circuit 426, are gated through this latter circuit and through the OR circuit 239 and the inverter 240 which places negative clock pulses on the output conductor 241. This feeds the clock pulses to the Ring of One Hundred and causes it to run out rapidly to complete its count to one hundred whereupon the One Hundred Carry Signal (indicating that the Ring of One Hundred has reached the one hundredth position), will arrive on a conductor 269. The positive One Hundred Carry Signal on conductor 426 (Fig. 33) is applied to an inverter 427 which applies this signal to a Two-Read Out Trigger 428. This signal requires that the trigger 428 be reset with its right side conducting.

The One Hundred Carry Signal is also fed to an AND circuit 429 (Fig. 33) and since its second input is positive it conducts and delivers a pulse to an inverter 430 so that a negative output signal is delivered from the inverter 430 to the trigger 421 causing the trigger 421 to transfer and conduct on its right side. Since the trigger 421 now no longer drives the cathode follower 422, the OR circuit 423 will not be operated and thus the positive signal is removed from the AND circuit 426. Consequently the 100 kc. clock pulses are removed from the Ring of One Hundred. The beams of the cathode ray tubes are now located at the beginning of their rasters.

The negative signal from the cathode follower 422 is also fed to and causes the Two-Read Out Trigger 428 to transfer to the left side. As a result, the positive output of the trigger 428 drives a cathode follower 430 so that the +10 volts are applied to the AND circuit 431. However, the second input to the AND circuit 431 at this time is at −30 volts since a cathode follower 432 is not conducting. The cathode follower 432 cannot conduct since it receives no pulses from a key trigger 433 which at this time is conducting on its right side. The operation of the Regeneration Control Circuits under control of the key trigger 433 will be discussed below under the heading Read-Out About to Commence.

The discussion above traced the steps necessary to stop the regeneration of the patterns on the cathode ray tubes at the time that the system is ready to start the read in operation. The +10 volts emitted from the cathode follower 378 caused regeneration to be stopped, caused the beams of the cathode ray tubes to be returned to the beginning of the rasters, and finally caused the tape drive mechanism to start the feeding of a new unit record. The tape drive mechanism requires approximately 10 milliseconds to come up to speed before the new unit record arrives under the read/write head. Reading of a new record from the tape will now take place with the Ring of Thirteen and the Ring of One Hundred in operation as previously described.

At approximately 14.8 time in the card cycle, a cam operated circuit breaker P23 (Fig. 53) which is located in the punching mechanism, will close and apply +40 volts to a conductor 432 which is connected to the Read Trigger 377 (Fig. 33). This action causes the Read Trigger 377 to be reset with its right side conducting, because by this time (14.8 time in the card cycle) the trigger 377 has served its purpose.

While the read-in operation continues, the regeneration circuits are inoperative so that a complete unit record is read into the cathode ray tube storage before regeneration can start again. When the read-in operation is complete and the beam has scanned the one hundredth column of storage in the cathode ray tube, the Ring of Thirteen will again emit a Thirteen Carry Signal on conductor 192 (Fig. 33). The pulse is fed to the OR circuit 239 by way of the cathode follower 238, causing the inverter 240 to conduct. The negative output signal from the inverter 240 is fed to the Ring of One Hundred by way of the conductor 241. The negative signal on the conductor 241 causes the Ring of One Hundred to advance from position 100 to position 1 whereupon a One Hundred Carry Signal is emitted by the ring on conductor 260 (Fig. 33).

The positive One Hundred Carry Signal on conductor 260 is applied to the inverter 427 thus causing this unit to conduct. The negative output signal of the inverter 427 is applied to the Two-Read-Out Trigger 428 thereby causing conduction to be transferred to its right side. As a result of the transfer of conduction of the trigger 428, a negative signal is passed through the cathode follower 430 to the Regeneration Stop Trigger 411, causing the trigger 411 to transfer and conduct on its right side. It has previously been shown that whenever the Regeneration Stop Trigger 411 is conducting on its right side, the patterns on the cathode ray tubes will be regenerated. Regeneration is now in progress, with the conditions as described above, and will continue until approximately 12 time in the card cycle when the punch is ready to cause read-out and punching of the 12 row of holes of the next following card.

*Read-out about to commence.*—Assume that the read-in operation has been completed and regeneration is in progress. From Figure 53 it may be seen that at 12 time of the card cycle, a cam operated circuit breaker P21 (Fig. 53) will apply +40 volts to a conductor 434. By reference to Figure 33 it will be seen that a pulse on the conductor 434 is an input to the punch key trigger 433. The +40 volts on the conductor 434 will cause the key trigger 433 to transfer, i. e. to pull over to the left side thereof. The transfer of conduction in the trigger 433 will cause the cathode follower 432 to conduct and apply +10 volts to the OR circuit, and also by way of the AND circuit 431, to a conductor 435.

The +10 volts on the conductor 435 will cause the Punch Ring to be advanced. The Punch Key Trigger 433 is energized for each digit of the record. Consequently, every time the key trigger 433 is energized, the Punch Ring is advanced. Between the read-out of the rows to the punch, the regeneration circuits are operated and regeneration takes place as described above. The operation of the Punch Ring will be discussed under the title Punch Ring Operation hereinafter. The +10 volts applied to the AND circuit 431 cannot cause this circuit to be operated since its other input at the moment is at −30 volts.

The +10 volts applied to the OR circuit 414 will be fed to the inverter 415 causing a negative direction signal to be fed to the trigger 416. The negative signal from the inverter 413 causes the trigger 416 to transfer so that it will conduct on its left side, thus causing a positive output signal which drives the cathode follower 417. The +10 volts output from the cathode follower 417 conditions one input of the circuit 418.

The Ring of Thirteen continues its present cycle, causing the beams of the cathode ray tubes to finish scanning and regenerating the present column at which time, the Ring of Thirteen emits a Thirteen Carry Signal on conductor 192. The +10 volts Thirteen Carry Signal on conductor 192 is fed to the OR circuit 239 (Fig. 33) by way of the cathode follower 238, causing a negative pulse, by way of the conductor 241, to advance the Ring of One Hundred one position. The beams of the cathode ray tubes are now instantaneously located at the top of the next storage column.

The Thirteen Carry Signal on the line 192 is also applied to the AND circuit 418. Since the other input to the AND circuit 418 is also at +10 volts, the AND circuit will provide a +10 volt output, causing the inverter 420 to become fully conducting which in turn delivers a negative signal to the trigger 416. The negative signal applied to the trigger 416 causes this trigger to transfer conduction to the left side which results in a negative direction output signal being delivered to the Regeneration Stop Trigger 411 and also to the Fast-Run-Out Trigger 421. The negative signal applied to the triggers 411 and 421 will cause these triggers to transfer conduction to their respective left sides. It has previously been shown that whenever the Regeneration Stop Trigger 411 is conducting on its left side, the 100 kc. clock pulses will be isolated from the Ring of Thirteen.

The fact that the Fast-Run-Out Trigger 421 (Fig. 33) transfered causes +10 volts to be applied to the cathode followers 422 and 424 and consequently to the AND circuit 429, and directly to the OR circuit 423. The other input to the AND circuit 429 is at this moment at −30 volts. The +10 volts input to the OR circuit 423 is fed through this OR circuit, through the cathode follower 425, and to the AND circuit 426. Consequently, the clock pulses arrive on the line 229 which is the other input to the AND circuit 426 will be fed through the AND circuit and will pass through the OR circuit 239 and the inverter 240 thereby arriving on the output lead 241 as negative clock pulses. The negative clock pulses on the line 241 are applied to the Ring of One Hundred, causing this ring to complete its cycle by counting to 100 and causing the beams of the cathode ray tubes to be returned to the beginning of the rasters.

When the Ring of One Hundred completes its cycle, it will emit a +10 volts One Hundred Carry Signal on conductor 260 (Fig. 43). This carry signal is applied to the inverter 427 (Fig. 33) which effectively requires that the Two-Read-Out Trigger 428 is reset with its right side conducting. The One Hundred Carry Signal is also applied to the AND circuit 429 (Fig. 33) causing the inverter 430 to conduct. (The second input to the AND circuit 429 is at +10 volts since the trigger 421 is conducting on its left side.) The negative output signal of the inverter 430 causes the Fast-Run-Out Trigger 421 to transfer so that it conducts on its right side.

The fact that the Fast-Run-Out Trigger 421 is now conducting on its right side causes a lower positive potential to be applied to the cathode follower 422 which results in −30 volts being applied to the Two-Read-Out Trigger 428 and also to the OR circuit 423. The fact that the OR circuit 423 is no longer operating the cathode follower 425 results in the isolation of the clock pulses on the line 229 so that the Ring of One Hundred is no longer fed by way of the output 421.

The negative directional signal from the cathode follower 422 causes the Two-Read-Out Trigger 428 to transfer so that it now conducts on its left side so that the cathode follower 430 is driven into conduction. The output of the cathode follower 430 is at +10 volts, and AND circuit 431 will emit a pulse and raise its output conductor 436 to this potential. The conductor 436 is connected to the grids of three paralleled cathode followers 437 (Fig. 39). The +10 volts on the line 436 will cause the cathode followers 437 to become operative and thereby raise the potential on the conductor 438 to +10 volts. The +10 volts on conductor 438 are transmitted to the OR circuit 423 (Fig. 33) causing this circuit to transmit the pulse. One of the inputs to the AND circuit 431 (Fig. 33) is at +10 volts since the Punch Key Trigger 433 is conducting on its left side.

At the time that the Punch Key Trigger 433 transfers conduction to the left side, a positive direction signal is emitted by way of the cathode follower 432 to the output conductor 435. This signal is transmitted to an inverter 439 (Fig. 39) and delivered by way of a conductor 440 to the Punch Ring. Briefly, the presence of this negative pulse on the conductor 440 causes the Punch Ring to advance so that the Ring Trigger 441 is turned "on." Thus the cathode follower 301 will be operated and +10 volts will be applied to the AND circuit 302. It was stated above that since the Two-Read-Out Trigger 428 (Fig. 33) is "on," the conductor 436 will be at +10 volts. This potential on conductor 436 causes the cathode followers 437 (Fig. 39) to be operated so that the second input to the AND circuit 302 will be at +10 volts. The coincidence of inputs on the AND circuit 302 will cause the OR circuit 300 (Fig. 40) to be operated. In that section of the specification dealing with the vertical deflection circuits, it was explained that a +10 volts potential output from the OR circuit 300 will cause the beams of the cathode ray tubes to be positioned in the 12th column.

The +10 volts applied to the OR circuit 423 (Fig. 33) causes this component to drive the cathode follower 425 with the result that one input to the AND circuit 426 is raised to +10 volts. Consequently the 100 kc. clock pulses on the line 229 which is the second input to the AND circuit 426 are fed to the Ring of One Hundred by way of the output conductor 241. This action causes read-out from the cathode ray tubes to the punch to begin, with the beams scanning the 12 row rasters. Thus, regeneration has been stopped and the read-out operation has started.

The Ring of One Hundred causes the beams to read-out all of the 100 columns of the 12 row on the cathode ray tubes whereupon +10 volts representing the One Hundred Carry Signal is applied to the conductor 260 (Fig. 43). This positive direction signal drives inverter 427 (Fig. 33) into conduction so that a negative output signal is applied to the Two-Read-Out Trigger, causing this component to transfer so that it conducts on its right side. As a result, a negative pulse from the Two-Read-Out Trigger 428 will cut off the cathode follower 430 so that a negative direction signal is applied to the Regeneration Stop Trigger 411. The negative signal on the Regeneration Stop Trigger 411 causes this component to transfer so that it conducts on its right side. It has previously been shown that whenever the Regeneration Stop Trigger 411 is conducting on its right side, regeneration of the pattern of the cathode ray tubes will take place, thus, read-out of the 12 row has taken place and regeneration of the pattern has started once again. At approximately 12.5 time in the card cycle, the cam operated circuit breaker P22 (Fig. 53) applies +40 volts to a conductor 442, which is connected to the right grid of the Punch Key Trigger 433 (Fig. 33). The +40 volts on conductor 442 causes the trigger 433 to be pulled over, i. e. transferred so that it will conduct on its right side. This action resets the Punch Key Trigger 433 so that it is ready to be operated at 11 time in the card cycle.

At 11 time in the card cycle, the cam operated circuit breaker P21 (Fig. 53) again applies +40 volts to conductor 434, causing the Punch Key Trigger 433 (Fig. 33) to transfer conduction to its left side. This action initiates the operation described above whereby regeneration will be stopped and the 11 row will be read-out and punched into the card.

The operations described continue over and over until all of the rows have been read-out and punched onto the card whereupon the machine is ready to stop regeneration and start reading information to the tubes from the magnetic tape. The latter operation has been described hereinabove under that portion of the specification entitled Read-In About To Commence. It is important to note that regeneration occurs between the read-out of the rows.

*Error checking circuits*

There are three error checking circuits in the system such that the operation of any one of these circuits will cause the punch and the tape drive to stop feeding cards and tape respectively. The checking circuits are, respectively, the redundancy bit check, the record length check, and the dash count check.

The redundancy bit check circuit checks to ascertain that the bits received from the seven tracks of the tape are odd in number. Thus, it is possible for two or any even number of errors to occur, thereby causing a compensating effect. An example is the complete loss of two bits of information from the tape so that the actual number of bits received is still an odd number. In this case, an error might occur which could not be indicated by the redundancy bit checking circuits.

The record length checking circuit checks to determine that the 100th character which is received from the tape is a Record Mark. This circuit causes the system to stop if the tape driving unit had, for example, started reading a unit record at a point in the middle of the record.

The dash count checking circuit causes all of the dashes (representing holes to be punched) of a unit record to be fed to a binary trigger during the read-in operation. During the read-out operation, the dashes are again fed to this binary trigger. If the same number of dashes are fed to the binary trigger both during the read-in operation and during the read-out operation, the trigger will be returned to its original status. If the trigger is not in its original status at the conclusion of the read-out operation, an error indication will be generated and the mechanisms will be stopped. Here again, it is possible for compensating errors to occur. It is possible for a dash to be missed both during read-in and read-out under which circumstances the checking circuits will not indicate the presence of an error.

*Redundancy bit check circuits.*—It was pointed out hereinabove in connection with the description relating to input from tape reading that the bits of information of the seven bit code arrive on the input conductors 48 through 60 (Fig. 35). The bits of information are temporarily stored in the trigger register comprising the triggers 64, 50*a*, 52*a*, 54*a*, 56*a*, 58*a* and 66*a* (Fig. 35).

Connected to the outputs of these triggers is a group of cathode followers whose output potentials reflect the status of their respective triggers. Conductors 194, 196, 197, 198, 199, 200 and 201 are connected to the outputs of these cathode followers which will be at +10 volts when the respective triggers are storing bits of information.

It should be stated that the tape record is so disposed on the tape that a bit is recorded or not recorded in the 7th (redundancy) track of the tape so that the total number of bits comprising a single word will be an odd number.

The fact that the several bits of information are stored in the register triggers will cause various combinations of the conductors 194 through 201 (Fig. 35) to be at +10 volts simultaneously. The conductors 194 through 201 are each connected to the input of a group of AND circuits 202 through 208 (Fig. 35). The outputs of these AND circuits are connected through cathode followers 202*a*, 203*a*, 204*a*, 205*a*, 206*a*, 207*a* and 208*a* to an output conductor 444. The other input to the AND circuits 202 through 208 are respectively connected to the 12, 11, 0, 1, 2, 3, and 4 outputs of the Ring of Thirteen (Fig. 38). Consequently the information arriving on conductors 194 through 201 simultaneously (in parallel form) arrives on the output conductor 444 (Fig. 35) in serial form, since the AND circuits 202*a* through 208*a* are pulsed in serial order. Thus, if five bits of information were present in the seven tracks of the tape, five separate pulses will appear on the output conductor 444 as the Ring of Thirteen makes its cycle during the read-in operation.

At 5 time (the pulse representing 5 in the Hollerith Code) the +10 volt pulse is applied to an AND circuit 445 (Fig. 35) by the Ring of Thirteen. The second input to the AND circuit 455 is at +10 volts during the entire read-in operation since this input is the output of the cathode follower 226 (Fig. 34) by way of a connection 446. Consequently, at 5 time of the Ring of Thirteen, a pulse will be emitted through the AND circuit 445 (Fig. 35) and its connected cathode follower 446 to the conductor 444. The purpose of this last pulse at 5 time is to bring the total number of pulses arriving on the conductor 444 to an even number.

The coincidence of each pulse on the conductor 444 and a clock pulse applied as the second input to an AND circuit 447 (Fig. 34) causes an inverter 448 to be driven into full conduction such that a negative pulse is applied to a trigger 449 causing the trigger to transfer. Since the trigger 449 is connected as a binary trigger, it will transfer conduction once for each pulse received thereby. Consequently as an even number of pulses influences the trigger 449, it will be returned to its original status, i. e. that status in which it is conducting on its right side. In this case the input to a cathode follower 450 will be at −30 volts so that a connected AND circuit 451 cannot conduct.

However, in order to impart a full understanding of the operation of the redundancy check circuits, let it be assumed that an error has occurred so that at the end of the 5 time of the Ring of Thirteen the binary trigger 449 is conducting on its left side. Due to the fact that the output of the binary trigger 449 is at a high positive potential, the cathode follower 450 will be driven into conduction causing an output pulse which is one input to the AND circuit 451. At 6 time of the Ring of Thirteen the other input to the AND circuit 451 will also be positive. As a result of the coincidence of these two pulses and the AND circuit 451, a pulse will be transmitted through the AND circuit, to an OR circuit 452, through said circuit and through an OR circuit 453, thus placing +10 volts on the conductor 454. The fact that the conductor 454 is plus is an indication that an error has been detected.

The OR circuit 453 (Fig. 34) is connected by way of the conductor 454 to the thyratron 397 (Fig. 54). The +10 volts on the conductor 454 will raise the screen grid of the thyratron 397 to a point where this component will fire, causing an error relay 455 (Fig. 54) to be energized. A set of contacts **455*a* are operated by the error relay 455 causing an error light 456** to be illuminated, and also causing the punch motor circuit (not shown) to be broken.

*Record length checking circuits.*—The record length checking circuits, as noted before, will cause the error relay 455 (Fig. 54) to be energized if the 100th character received from the tape is not a Record Mark. This circuit then must make use of the 100th position of the Ring of One Hundred and the output signal from the decoding matrix which represents a Record Mark. There will be a coincidence of inputs to a four-way AND circuit 458 (Fig. 43) during the 100th count of the Ring of One Hundred. At this time the beams of the cathode ray tubes will be in the 100th column. One input to the AND circuit 458 will be at +10 volts when the trigger 245 is conducting on its right side. This occurs when the ring is located between 51 and 100. A second input to the AND circuit 458 will be at +10 volts when the trigger 244 is conducting on its right side. Trigger 244 is conducting on its right side when the ring is located between 26 and 50 or between 76 and 100. Since it is necessary to obtain an indication when the ring is located in its 100th position, interest is centered in its 67 to 100 locations. The AND circuit 458 will have two inputs energized when the Ring of One Hundred is located between 76 and 100. The third input to the AND circuit 458 will be at +10 volts when the trigger 255 is conducting on its right side. This occurs when the ring is located between 20 and 25, 45 and 50, 70 and 75 and between 95 and 100. Thus interest is centered in the positions 95 to 100. The fourth input to the AND circuit 458 will be at +10 volts whenever the fifth trigger of the group 242, i. e. trigger 247 is conducting on its right side. Since this occurs every fifth pulse, it will occur when the Ring of One Hundred is located at 100. Thus it is evident that a coincidence of the four inputs to the AND circuit 458 will occur when the ring enters its 100th position.

The coincidence of the four inputs to the AND circuit 458 will cause its cathode follower 460 to be driven into full conduction whereupon an output pulse appears on conductor 461. This output pulse which is +10 volts is fed to an AND circuit 462 (Fig. 34) and also to an OR circuit 463 (Fig. 34).

At that part of the specification relating to the trigger storage register it was pointed out that the arrival of a Record Mark (indicated that the end of a 100 work unit record has been received from the tape) will cause the cathode follower **100*b* (Fig. 36) to conduct so that a positive pulse will appear on conductor 172. Conductor 172 is connected as the second input to the AND circuit 462 and also as an input to the OR circuit 463** (Fig. 34).

When a plus voltage is present on both conductor 172 and 461 in Figure 34, the AND circuit 462 will transmit a pulse to drive the inverter 464 so that the connected cathode follower 465 will transmit −30 volts to an AND circuit 466. Since the output of the cathode follower 465 is at −30 volts, no pulse is transmitted through the AND circuit 466. Thus, it is seen that if both conductors 172 and 461 are at +10 volts, the AND circuit 466 will not conduct. At the same time the +10 volts on the conductor 461 or 172 will cause the OR circuit 463 to render plus one input to an AND circuit 467. At 7 time of the Ring of Thirteen, the second input to the AND circuit 467 will be raised to +10 volts so that the connected cathode follower 468 will conduct, whereupon the second input to the AND circuit 466 will be raised to +10 volts. However the AND circuit 466 cannot transmit a pulse since its other input, by way of the cathode follower 465 is at −30 volts as pointed out in the preceding paragraph.

Consider for a moment the case where only one of the conductors 172 or 461 is at +10 volts. As explained above, if either of these conductors is at +10 volts, pin 3 of the AND circuit 466 will be at + 10 volts during 7 time of the Ring of Thirteen.

Since the AND circuit 462 receives only one input it will not operate and the inverter 464 will remain cut off. The fact that the inverter 464 is cut off will cause the cathode follower 465 to be fully conducting so that the output from the cathode follower 465 will impose +10 volts on the AND circuit 466. Consequently at 7 time of the Ring of Thirteen both inputs to the AND circuit 466 will be at +10 volts so that a pulse is transmitted to the OR circuit 452. The output of the OR circuit 452 will be transmitted through the OR circuit 453 with the result that the output lead 454 will be raised to +10 volts thus indicating that an error has occurred. The +10 volts on the lead 454 will cause the thyratron 397 (Fig. 54) to fire so that the error relay 455 will be energized, causing the machine to be stopped as explained herein above.

The record length checking circuit of Figure 34 actually constitutes an exclusive OR circuit in that either input conductors 172 or 461 by itself will cause an output to occur, but neither input nor both inputs present will render the circuit non-operative. The 7 pulse from the Ring of Thirteen merely provides a particular time when the system is to be interrogated for the presence of an error.

*Dash count check circuit.*—As previously stated, the dash count check circuit comprises a binary trigger into which all the dashes (representative of holes to be punched into the card) are entered during read-in to the cathode ray tubes and again during read-out to the punch. If at the end of a read-out operation the binary trigger has been returned to its initial state, it can be assumed that the same number of dashes has read out of the cathode ray tubes as that which was read in. However, this circuit is subject to compensating errors as noted above.

It was pointed out in connection with the description of the character gate control circuits that during the read-in operation the Read-In Trigger 225 (Fig. 34) will be conducting on its left side. This fact will cause the cathode follower 226 to be fully conducting so that pin 4 of an OR circuit 470 will be at +10 volts. This in turn transmits a positive pulse as one input to an AND circuit 471.

As stated in connection with the part of the specification dealing with regeneration of the cathode ray tube patterns, trigger 367 (Fig. 46) will conduct on its left side whenever a dash is to be written on or whenever a dash is to be read from the cathode ray tubes. Whenever the trigger 367 is conducting on its left side the cathode follower 368 will be fully conducting so that the output line 472 will have thereon +10 volts. The +10 volts on line 472 (whenever a dash occurs) provides the second input to the AND circuit 471 (Fig. 34).

The coincidence of positive inputs to the AND circuit 471 causes this circuit to transmit a pulse which causes an inverter 474 to conduct. The negative direction signal from the inverter 474 causes a binary trigger 475 to transfer to its opposite state. The binary trigger 475 will transfer its state of conduction upon the receipt of each dash pulse. Thus each dash occuring during the read-in operation will be fed to the binary trigger 475.

The description of the regeneration circuits pointed up the fact that during the reading out operation both inputs to the AND circuit 431 (Fig. 33) will be at +10 volts so that the output conductor 436 and consequently the conductor 438 by way of the cathode follower group 437 (Fig. 39) will be positive. The conductor 438 is an input to the OR circuit 470 (Fig. 34) so that this unit will also be operated during the read-out operation. Thus it is evident that the dashes occurring during read-out will also be fed to the binary trigger 475.

If the binary trigger 475 is returned to its original condition with the right side conducting, a connected cathode follower 477 will transmit a negative pulse to an AND circuit 478. However, had an error been detected, the binary trigger 475 would be conducting on the left side which would cause the cathode follower 477 to impose +10 volts on the input of the AND circuit 476.

After the reading out operation has occurred and at the time that the tape is started again, the Tape Run Trigger 380 (Fig. 33) will transfer its status whereupon the cathode follower 382 will operate so that +10 volts is applied to an output 479. This positive direction pulse is capacity coupled to a cathode follower 464 (Fig. 34) thereby rendering the cathode follower 464 fully conducting. Since the output of the cathode follower 464 is at +10 volts, the second input to the AND circuit 478 is positive. If an error had occurred, pin 4 of the AND circuit 478 would be at +10 volts. In this event, the AND circuit 478 would transmit a pulse through the OR circuit 453 so that the output conductor 454 would have thereon a positive pulse indicative of the occurrence of an error. The conductor 454 (Fig. 34) is connected to the control grid of the thyratron 397 (Fig. 54) so that the thyratron is caused to fire and thereby energize the error relay 455. Energization of the error relay 455 will cause the machine to stop as noted above.

*Summary of read-in operation*

A brief summary of the operations involved during reading information from the magnetic tape and storing it on the face of the cathode ray tubes may serve to correlate the functions on a time basis.

It should be remembered that the operation of the converting system herein consists of stopping the regeneration operation, starting the tape drive unit, reading a unit record and storing this unit record on the cathode ray tubes, stopping the tape drive mechanism, and finally reading out the information stored on the cathode ray tubes to the card punch where the information is punched into record cards in the Hollerith Code.

At approximately 13.6 time in the card cycle, the cam operated circuit breaker P24 (Fig. 53) will apply +40 volts to the conductor 376 so that the Read Trigger 377 (Fig. 33) will transfer and conduct on its left side. The fact that the Read Trigger 377 is conducting on its left side will cause the Tape Run Trigger 380 to be turned "on" so that the tape drive unit will start feeding the record tape through the read/write heads. At the same time the trigger 416 (Fig. 33) will be turned "on" so that the arrival of the Thirteen Carry Signal from the Ring of Thirteen will cause the Regeneration Stop Trigger 411 to transfer conduction to the left side. This action disconnects the clock pulses from the Ring of Thirteen and at the same time causes the Fast Run-Out Trigger 421 (Fig. 33) to be turned "on" so that the clock pulses are fed to the Ring of One Hundred, causing this unit to complete its count to one hundred, whereupon the beams of the cathode ray tubes will be returned to the beginning of their rasters.

The One Hundred Carry Signal received from the Ring of One Hundred at the time the count is completed, will cause the Fast Run-Out Trigger 421 to disconnect the clock pulses from the Ring of One Hundred. Approximately 10 milliseconds after the tape drive unit has started to feed the tape, it will be up to speed and the first word from the unit record will arrive at the 48, 50, 52, 54, 56, 58 and 60 inputs (Fig. 35). The word received on these inputs will be stored in the Register Triggers 64, etc. The status of these Register Triggers will be interpreted by a set of cathode followers connected thereto. The cathode followers will provide signals to the decoding matrix (Figs. 36 and 37) so that this matrix can convert the word, received in the Excess Three Code, to the Hollerith Code. The voltages, representing the words which are fed to the decoding matrix are also fed to a set of cathode followers 209 through 215 (Fig. 35). The fact that any one of the 7 bits of the word has been received will cause one of the cathode followers 209 through 215 to be rendered fully conducting so that the common output lead 216 is raised to +10 volts. The positive direction signal on the output lead 216 is delayed 50 to 60 microseconds before it is applied to the trigger 218 (Fig. 34). The application of this signal to the trigger 218 will cause the second following clock pulse on the input conductor 222 to turn "on" the Read-In Trigger 225. The fact that the Read-In Trigger 225 is "on" will cause the AND circuit 228 (Fig. 34) to conduct so that the clock pulses can be fed to the Ring of Thirteen by way of the output conductor 182. The Ring of Thirteen is now ready to make one complete cycle during which it will advance the beams of the cathode ray tubes down the first column and at the same time interrogate the conversion matrix so that the word delivered to the conversion matrix will appear as a series of time spaced pulses on conductor 336 (Fig. 37). If a pulse appears on conductor 336, it is desired to store this pulse as a dash on the cathode ray tubes so that at a later time this dash can be used to control the punching of a hole in a record card.

A pulse on the conductor 336 will be fed to the OR circuit 364 (Fig. 47). The fact that the Ring of Thirteen is in operation will allow conductor 193 (Fig. 47) to be at −30 volts so that the AND circuit 344 can be operated. The single shot multi-vibrator 348 will be operated by the clock pulses on the input conductor 350. The operation of the single shot multi-vibrator 348 will cause a pulse to be fed to the AND circuit 369 (Fig. 46) by way of the inverter 351, the single shot multi-vibrator 352, the inverter 370, the single shot multi-vibrator 371 (all in Figure 47) and the cathode follower 373 (Fig. 46). The pulse on the line 336 (Fig. 47) will cause the OR circuit 364 and the inverter 366 (Fig. 46) to be operated such that the trigger 367 will transfer. The transfer of the trigger 367 places +10 volts as one input to the AND circuit 369 so that the output of this AND circuit, the other input also being plus, will cause the cathode follower 346 (Fig. 47) to drive the AND circuits 353 (Fig. 47) and 354. Depending on whether information is to be stored on the first or on the second cathode ray tube, the conductors 360 or 363 (Fig. 36) will be raised to a high positive potential. The fact that either of the conductors 360 or 363 is at a high positive potential will cause the control grid of either the left or the right cathode ray tube to be unblanked. The appropriate cathode ray tube is unblanked for the duration of the vertical bit sweep.

The beams of the cathode ray tubes write a dot at each point representative of an index point of a record card as they sweep the respective columns. Every time the beam is located in a particular position of the raster, a small vertical sweep voltage is applied to the vertical deflection plates so that as the tube is unblanked, a dash will be written. Consequently whenever it is desired to write a dash, the appropriate cathode ray tube must be unblanked.

In Figure 47 operation of the single shot multi-vibrator 348 causes a signal to be fed to the trigger 335 which in turn places a high positive potential on its output conductor 334. The potential on the conductor 334 will cause the bit sweep deflection circuit 333 (Fig. 41) to be operated. The circuit 333*a* provides one small deflection voltage necessary for the writing of a dash.

It should be remembered that the Ring of Thirteen is responsible for the operation of the vertical deflection circuits. The Ring of One Hundred is responsible for the operation of the horizontal deflection circuits.

The Ring of Thirteen is also used to cause the error detecting circuits to be operated at the appropriate time. At 6 time of the Ring of Thirteen the redundancy checking circuit is interrogated to see if the number of bits which represent the character received is odd or even. If the number of bits received is even, the binary trigger 475 (Fig. 34) will not be returned to its initial state so that the error relay 455 (Fig. 54) will be energized.

Since the bits representing the word arrive in parallel order, it is of little consequence as to when the Ring of Thirteen causes the redundancy check to be made. The Ring of Thirteen will, upon completion of its cycle, cause the conductor 191 (Fig. 38) to be raised to +10 volts. This voltage representing the Thirteen Carry Signal causes the inverter 82 (Fig. 35) to reset the Register Triggers so that the next character can be received. The Thirteen Carry Signal on the conductor 191 is also fed to the conductor 192 (Fig. 33). The Thirteen Carry Signal on conductor 192 causes the OR circuit 239 to be operated so that a single pulse is fed to the Ring of One Hundred causing the ring to be advanced one position so that the beams of the cathode ray tubes are moved to the next column. The Thirteen Carry Signal on the conductor 192 is applied to the Read-In Trigger 225 (Fig. 34) by way of the inverter 235 (Fig. 33) causing the trigger 225 to be turned "off." It will be remembered that since the Read-In Trigger 225 is conducting on the right side, it will cause the clock pulses on the line 229 to be isolated from the Ring of Thirteen.

The Thirteen Carry Signal is also applied to the conductor 193 (Fig. 47) to deliver −30 volts to the cathode follower 341 so that the OR circuit 342 is no longer operative. This in effect makes it impossible for the dot-dash control circuits to cause a dash to be written on the cathode ray tubes when the Ring of Thirteen is not in operation.

Up to this point the regeneration has been stopped, the tape drive has been started, and the first word of a 100 word unit record has been read and stored on the cathode ray tubes of the conversion system.

The second word will now be received on the inputs 48, etc., (Fig. 35). This word will be stored in the Register Triggers and voltages representing the word are delivered to the cathode followers 209 through 215 (Fig. 35) as before. The output of these cathode followers will cause the character gate circuits to provide a 50 to 60 microsecond delay, whereupon the Read Trigger 225 (Fig. 34) will be turned "on." Consequently, the clock pulses on the conductor 229 will be fed by way of the AND circuit 228 (Fig. 34) and the inverter 232 to the advance line conductor 182 of the Ring of Thirteen. The reading in and the storage process for the second character is now repeated as described above. The read-in process will be repeated as described above. The read-in process will be repeated for each word until all of the 100 words written in the unit record of the tape have been stored on the cathode ray tubes. When the 100th word is read from the tape it must be checked to ascertain that this character is a Record Mark. The receipt of a Record Mark by the diode decoding matrix will cause the cathode follower 100*b* (Fig. 36) to conduct so that the Record Mark conductor 172 will be raised to +10 volts. The fact that the conductor 172 is at +10 volts will cause the record length checking circuit to be operated when the Ring of One Hundred reaches its 100th position, if an error has been detected. It was previously shown that the line 461 (Fig. 34) will be at +10 volts when the Ring of One Hundred enters its 100th position. The record length checking circuit is essentially an exclusive OR circuit. If either the input on the line 172 representing one Record Mark or the input on the line 461 representing the 100th column is present by itself, the record length checking circuit (Fig. 34) will deliver an output potential. However, if both inputs are present or if both inputs are absent, the record length checking circuit will produce no output.

Assuming that the Record Mark character has not occurred in the 100th column, the AND circuit 466 (Fig. 34) will, under such conditions, be operated so that the OR circuits 452 and 453 will conduct a pulse on the output line 454 so that the thyratron 397 will energize the error relay 455. As pointed out previously, whenever the error relay 455 is energized, the control clutch of the card punching mechanism will be de-energized.

When the Ring of One Hundred has completed its count, a One Hundred Carry Signal will be received on the line 260 (Fig. 33); this signal will drive the inverter 427 into full conduction so that a negative direction signal will be applied to the Two-Read-Out Trigger 428 causing this trigger to conduct on its right side. As a result of the transfer of the trigger 428, a negative direction signal will be delivered to the Regeneration Stop Trigger 411 by way of the cathode follower 430. A signal impressed on the Regeneration Stop Trigger 411 causes it to change its status so that it will conduct on its right side. As previously stated, whenever the Regeneration Stop Trigger 411 is conducting on its right side, regeneration of the patterns on the face of the cathode ray tubes will take place.

A complete 100 word record has now been read from the magnetic tape and stored on the cathode ray tubes. Upon the completion of reading the 100 word record, the regeneration process was once again started. Regeneration will continue until the time in the card cycle when the card punch is ready to start punching the 12 row of holes in a card.

*Punch Ring operation*

The Punch Ring provides a stepping control for the vertical deflection circuits of the cathode ray storage tubes during the time that the word stored on the tubes is being read out to the punch. Since the card is punched in row by row order, the reading out from the cathode ray tubes must be accomplished in the same order. The beams of the tubes must be held in a particular row until a control signal is given to cause an advance to the next row. The Punching Ring is controlled by the punch and is operative only during the punching portion of the machine cycle.

A pulse from the punch causes regeneration of the patterns of the cathode ray tubes to be stopped and the beams returned to the beginning of the rasters. The Punch Ring is then advanced to the 12 position (corresponding to the 12 hole in a card) and the 100 kc. clock pulses are fed to the Ring of One Hundred which causes the 12 row to be read out of the cathode ray tubes and punched into the card. The One Hundred Carry Signal occurring at the completion of the 100 columns of the 12 row will cause regeneration of the data stored on the cathode ray tubes to be started again. At the same time the Punch Ring is disconnected from the vertical deflection circuits. Regeneration will now continue until the punch has arrived at 11 time of the card cycle whereupon regeneration will be stopped and the 11th row will be read out.

Let it be assumed that the patterns on the face of the cathode ray tubes are being regenerated, and regeneration of the stored data is about to be halted.

At approximately 12 time in the card cycle the cam operated circuit breaker P21 (Fig. 53) will apply +40 volts to the conductor 434 which causes the Punch Key Trigger 433 (Fig. 33) to be pulled over so that it will conduct on its left side. Consequently the cathode follower 432 will be driven into full conduction so that a pulse is applied to the OR circuit 414, and also to the AND circuit 431.

The +10 volts supplied to the OR circuit 414 causes the inverter 415 to deliver a negative direction signal to the trigger 416, thereby causing the trigger to conduct on its right side. Thus, the cathode follower 417 will become fully conducting so that the output thereof, in coincidence with the next Thirteen Carry Signal, will cause the AND circuit 418 to conduct and drive the inverter 420 which in turn causes the trigger 416 to transfer conduction back to its left side. The action of the trigger 416 causes the Regeneration Stop Trigger 411 and the Fast Run-Out Trigger 421 to transfer conduction to their left sides. As stated hereintofore, when the Regeneration Stop Trigger 411 conducts on its left side, the clock pulses will be isolated from the Ring of Thirteen. Since the Fast Run-Out Trigger 421 has changed its status, the cathode follower 422 will transmit a +10 volt pulse by way of the OR circuit 423 and the cathode follower 425 to the AND circuit 426. As a result the clock pulses on the line 229, which is the second input to the AND circuit 260, are applied by way of the AND circuit 426, the OR circuit 239, the inverter 240, and output line 241 to the Ring of One Hundred.

The Ring of One Hundred will complete its count to 100 (returning the beams of the cathode ray tubes to the beginning of their respective rasters) whereupon a One Hundred Carry Signal will be emitted on conductor 426 (Fig. 33). The One Hundred Carry Signal will cause the AND circuit 429 to drive the inverter 430 so that the Fast Run-Out Trigger 421 transfers conduction back to its right side. The change in status of the Fast Run-Out Trigger 421 causes the cathode follower 422 to deliver a negative direction signal to the Two-Read-Out Trigger 428, causing this component to change its status and conduct on its left side. Since the cathode follower 422 is no longer conducting, the clock pulses are removed from the Ring of One Hundred.

Due to the fact that the Two-Read-Out Trigger 428 is conducting on its left side, the cathode follower 430 will raise one input to the AND circuit 431 to +10 volts. It will be recalled that the Punch Key Trigger 433 is conducting on the left side so that the cathode follower 432 is fully conducting causing an output on line 435 which is the second input of the AND circuit 431. Thus the AND circuit 431 will be operated. It will conduct a pulse so that its output conductor 436 (by way of the cathode follower group 437) will provide a positive input to the OR circuit 423 (Fig. 33). The +10 volts applied to the OR circuit 423 will condition the AND circuit 426 to permit the clock pulses on the conductor 229 to be fed to the Ring of One Hundred. The clock pulses will cause the beams of the cathode ray tubes to scan the 12th row and thereby read out the information stored in that row.

The +10 volts on the conductor 435 (the output of cathode follower 432, Fig. 33) is applied to the inverter 439 (Fig. 39), causing a negative direction signal to be applied to the Punch Ring by way of the conductor 440. Each negative direction pulse received on the conductor 440 will cause the ring to be advanced one position. The first pulse received will cause the 9 position trigger 480 to be turned "off" and the 12 position trigger 441 to be turned "on." The Punch Ring is a closed twelve position ring according to the Oberbeck patent hereinabove referred to. The ring is arranged to represent the twelve rows of holes in a record card. The outputs of the several triggers are connected to cathode followers, such as 301, which are connected to AND circuits such as 302.

One input to each of the AND circuits, such as 302, is from the cathode followers 301, for example, while the other input of all of the AND circuits is a common input feed from conductor 481. The pulses on the conductor 481 are supplied by the cathode follower 437. The inputs of the cathode followers of this group are from the line 436 which is at +10 volts due to the fact that the AND circuit 431 (Fig. 33) was caused to conduct as described above.

The AND circuits such as 301 (Fig. 39) require that the card punch be in a punching operation in order for the voltage from the Punch Ring to be passed on to the vertical deflection circuits. It may be well to point out that the OR circuits such as 300 (Fig. 40), for example, permit the vertical deflection circuits to be driven by either the Punch Ring or the Ring of Thirteen. Operation of these rings will never coincide at any point in the operating cycle.

The vertical deflection circuits will now be controlled by the Punch Ring in the same manner in which they were controlled by the Ring of Thirteen as described in that portion of the specification relating specifically to the vertical deflection circuits.

At the completion of the reading out of all one hundred columns of the 12th row, the Ring of One Hundred will emit a One Hundred Carry Signal on line 260 (Fig. 33) which is inverted by the inverter 427 and causes the Two-Read-Out Trigger 428 to transfer so that it conducts on its right side. Consequently, one output of the cathode follower 430 will be at −30 volts which, by way of the AND circuit 431, removes the +10 volts from the conductor 436 and also delivers a negative direction pulse to the Regeneration Stop Trigger 411. Hence, the conductor 436 is now at −30 volts and the Punch Ring (Fig. 39) is disconnected from the vertical deflection circuits due to the fact that the AND circuits, such as 302 for example (Fig. 39), are now unable to conduct. The negative direction signal delivered to the Regeneration Stop Trigger 411 (Fig. 33), by the cathode-follower 430, causes the trigger to transfer conduction to its right side, whereupon regeneration of the cathode ray tube patterns is started once again.

At approximately 12.5 time of the card cycle the cam operated circuit breaker P22 (Fig. 53) applies +40 volts to the conductor 442 which causes the Punch Key Trigger 433 (Fig. 33) to be reset with its right side conducting.

At 11 time in the card cycle the cam operated circuit breaker P21 (Fig. 53) will again apply +40 volts to the conductor 434 whereupon the Punch Key Trigger 433 (Fig. 33) will again transfer its status and the entire operation described will be repeated.

*Punch magnet thyratron control circuit*

The system contains 100 thyratrons (Figures 44 and 45) which may be connected to the punch magnets through control panel wiring in known fashion. If a particular thyratron is caused to fire, the punch magnet to which it is connected will be energized. The punch magnet thyratron control circuits are provided to condition the thyratrons sequentially and cause them to be fired according to the presence or absence of data supplied thereto.

It has been previously noted that the read-out of information stored on the cathode ray tubes takes place in row by row order due to the fact that the cards must be punched in this order in the punching mechanism.

During the reading out process the conductor 484 (Fig. 47) is at +10 volts which causes the OR circuit 342 to transmit a pulse. A potential on the conductor 484 allows the Dot-Dash Control Circuit to be operated during read-out whereas the potential on conductor 193 (Fig. 47) allows this circuit to be operated during regeneration periods. The operation of the Dot-Dash Control Circuit during read-in, is similar at its operation during regeneration with the exceptions noted above.

*Read-out to thyratrons.*—Figures 44 and 45 are composed largely of one hundred thyratrons whose outputs can be connected through control panel wiring to the punch magnets located at the punch mechanism, as stated above. The thyratrons are controlled from the output of a plurality of AND circuits whose dual input comprises the output of the Ring of One Hundred and the output of the Dot-Dash Control Circuits. The inputs of each of the AND circuits such as 486 (Fig. 44), for example, are connected to the Ring of One Hundred in such manner that these inputs are energized in sequence corresponding to the sequential position of the beams of the cathode ray tubes. The other inputs of the thyratron circuits are connected through another set of AND circuits to the Dot-Dash Control circuitry so that if a dash is encountered during read-out, a particular thyratron will be energized, causing a hole to be punched into the card.

During read-out, a positive pulse will appear on the line 488 (Fig. 46) as a result of the video signal on the line 402 (Fig. 47) which represents a dash. The pulse on the conductor 488 is one input of an AND circuit 490. The other input of the AND circuit 490 is connected by way of a conductor 491 to the conductor 484 (Fig. 47) which is at +10 volts during readout, as explained above. As a result of these two positive pulses on the AND circuit 490, the shaping circuits 492 and 493 are energized so that a cathode follower 494 is caused to conduct and thus produce an output of +10 volts on its output conductor 496. The presence of a +10 potential on the conductor 496 is indicative of the fact that a dash was present in the location of the cathode ray tube being read-out. This pulse will be used to fire the thyratron corresponding to the position from which the dash was read.

During read-out time, the beams of the cathode ray tubes scan on 100 columns of a given row before proceeding to the next row. It is necessary then that the thyratrons which operate the punch magnets be energized in the same sequence in which scanning occurs. Consequently the Ring of One Hundred which controls the horizontal deflection circuits of the cathode ray tubes must also control one input of each thyratron AND circuit. As the beams of the cathode ray tubes cover columns 1 to 100 sequentially, the inputs of the thyratron AND circuits must be conditioned at the same time and in the same order. Thus, if the beam of the cathode ray tube momentarily stands in the 30th column, one input of the 30th thyratron circuit is energized by the Ring of One Hundred and the other input will be energized by the Dot-Dash Control Circuits in the event that a dash is present in the spot being scnaned on the face of the cathode ray tubes.

Cable 498 (Figs. 44 and 45) connects the Ring of One Hundred to the group of AND circuits 486 for example (Fig. 44) which are in turn connected as one input of a group of thyratron AND circuits. For example the AND circuit 486 (Fig. 44) will be operated if the Ring of One Hundred stands at one and if the Ring Trigger 250 (Fig. 43) has not been operated. It must be remembered that the Ring of One Hundred counts from 1 to 25 and then starts counting again. Auxiliary indications are given as to the position of the ring such as the fact that it is below 5, below 10, below 15, below 20, or below 25, and that it is in the range 1 through 25, in the range 1 through 50, in the range 26 through 50, in the range 51 through 75, or in the range 76 through 100. Thus, if the ring stands at 16, AND circuit 500 (Fig. 45) will be operated to indicate the 16, the 41, the 66 or the 91st position. As a result the output conductor 501 will be at +10 volts, energizing one input of the four thyratrons connected to the conductor 501. The other input of one of the four thyratrons will be conditioned depending upon which one of the AND circuits 502, 503, 504 or 505 (Fig. 46) is operated. If the ring stands at 1, the 1 through 25 and the 1 through 50 inputs to the AND circuit 502 will be at +10 volts; however if a dash occurs the conductor 496 will be at +10 volts so that the AND circuit 502 will conduct and cause the cathode followers 506 to conduct. A potential of +10 volts is thereby impressed on the conductor 507, which by reference to Figure 44, will cause the thyratron 508 to fire since both of its inputs are at +10 volts. This gives rise to the pulse which will energize the punch magnet connected to this particular thyratron by means of plug wiring into hub 509, for example. Likewise, a coincidence of the input pulses to the AND circuits 503 (Fig. 46) will cause the conductor 510 to be at +10 volts which will result in the firing of the thyratron 511 (Fig. 44) and punch a hole in the 26th column in the card by means of wiring at plug hub 512.

Essentially the inputs of one cable 513 (Fig. 46) indicate in which raster the active beam of the cathode ray tube is located. The inputs on cable 498 indicate in which column of the 25 columns of a particular raster the active beam is located.

Thus, it is evident that the location of the Ring of One Hundred (and hence the beam of the cathode ray tubes) is indicated by the voltages on cables 498 and 513 while the fact that a dot or a dash is present is indicated by the voltage on the line 496. By utilizing this information, the thyratron control circuits of Figures 44 and 45 will select and fire the proper thyratron and consequently cause the punching of a hole in the desired index point position of a record card.

The invention herein has been described in connection with a record card punching device. The important consideration, however, is the fact that the reproducer control magnets are impulsed as the end function of the system. These magnets are substantially the same whether they are in control of a reproducing punch, as specifically described herein, or whether they are the control instruments of a printing tabulator or a typewriter. Therefore, the magnets may be referred to as "reproducer control magnets" in the sense that they may control the reproduction of the processed data by means of punching or by printing. Each one of the reproducers mentioned herein is power driven, as known to the art, and consequently contain power driven shafts adapted to drive the necessary contact operating cams for timing the system.

I claim:

1. In a data processing machine, means for reading a record, electrostatic storage means for data read by said reading means, an electron beam generator in said storage means adapted for both horizontal and vertical scanning movement thereof, separate means for deflecting an electron beam from said generator in a horizontal and in a vertical direction, means for selecting one of said deflecting means for entering data into said electrostatic storage, a data reproducer responsive to data stored in said storage means, and means under control of said data reproducer for selecting the other of said deflecting means for reading data out of said electrostatic storage means to said data reproducer.

2. In a data processing machine, means for reading a record, electrostatic storage means for data read by said reading means, an electron beam generator in said storage means adapted for both horizontal and vertical scanning movement thereof, separate means for deflecting an electron beam from said generator in a horizontal and in a vertical direction, means responsive to said reading means for selecting one of said deflecting means for entering data into said electrostatic storage, a data reproducer responsive to data stored in said storage means, and means under control of said data reproducer for selecting the other of said deflecting means for reading data out of said electrostatic storage means to said data reproducer.

3. In a data processing machine, means for reading a record, electrostatic storage means for data read by said reading means, an electron beam generator in said storage means adapted for both horizontal and vertical scanning movement thereof, separate means for deflecting an electron beam from said generator in a horizontal and in a vertical direction, means under control of said reading means for selecting the vertical deflecting means for entering data into said electrostatic storage, a data reproducer responsive to data stored in said storage means, and means under control of said data reproducer for selecting the horizontal deflecting means for reading data out of said electrostatic storage means to said data reproducer.

4. In a data processing machine, means for reading a record, electrostatic storage means for data read by said reading means, an electron beam generator in said storage means adapted for both horizontal and vertical scanning movement thereof for recording and reading-out of storage a transitory data pattern, separate means for deflecting an electron beam from said generator in a horizontal and in a vertical direction, means for selecting one of said deflecting means for entering data into said electrostatic storage, means for regenerating a data pattern stored in said electrostatic storage means, a data reproducer responsive to data stored in said storage means, means under control of said reproducer for regenerating said stored data pattern, and means also under control of said data reproducer for selecting the other of said deflecting means for reading data out of said electrostatic storage means to said data reproducer.

5. In a data processing machine, means for reading a record, electrostatic storage means for data read by said reading means, an electron beam generator in said storage means adapted for both horizontal and vertical scanning movement thereof for recording and reading out of storage a transitory data pattern, separate means for deflecting an electron beam from said generator in a horizontal and in a vertical direction, means responsive to said reading means for selecting the vertical deflecting means for entering data into said electrostatic storage, means for regenerating a data pattern stored in said electrostatic storage means, a data reproducer responsive to data stored in said storage means, means under control of said reproducer for regenerating said stored data pattern, and means under control of said data reproducer for selecting the horizontal deflecting means for reading data out of said electrostatic storage means to said data reproducer.

6. In a data processing machine, means for reading a code inscribed record each word of which is composed of a pluralty of bits, a plurality of register orders corresponding in number to the number of bits in the code utilized adapted to receive and hold bits transmitted thereto, means for transmitting the bits sensed by said reading means to said register orders, a data processing system including a data interpreting network and storage means for interpreted data, and means for simultaneously transmitting bits representative of a word from said register orders to said data processing system.

7. In a data processing machine, means for reading a code inscribed magnetic tape record each word of which is composed of a plurality of bits, a plurality of register orders corresponding in number to the number of bits in the code utilized adapted to receive and hold code bit pulses read somewhat serially from tape, means for transmitting the bits sensed by said reading means to said register orders, a data processing system including a data interpreting network and storage means for interpreted data, and means for simultaneously transmitting bit pulses representative of a word from said register orders to said data processing system.

8. In a data processing machine, means for reading a code inscribed record each word of which is composed of a plurality of bits, a plurality of register orders corresponding in number to the number of bits in the code utilized adapted to receive and hold bits transmitted thereto, means for transmitting the bits sensed by said reading means to said register orders, a data processing system including a data interpreting network and storage means for interpreted data, and means for simultaneously transmitting bit pulses representative of a word from said register orders to the data interpreting network of said data processing system.

9. In a data processing machine, means for reading a code inscribed magnetic tape record each word of which is composed of a plurality of bits, a plurality of register orders corresponding in number to the number of bits in the code utilized adapted to receive and hold code bit pulses read somewhat serially from tape, means for transmitting the bits sensed by said reading means to said register orders, a data processing system including a data interpreting matrix and electrostatic storage means for interpreted data, means for simultaneously transmitting bit pulses representative of a word from said register orders to the data interpreting matrix and means for transmitting data representing pulses from said matrix to said electrostatic storage means in serial order.

10. In a data processing machine, means for reading a record inscribed in a given multi-bit code, a plurality of register orders corresponding in number to the bits in the code utilized adapted to receive in somewhat serial order and momentarily retain a plurality of code bits, a code translating network adapted to translate into a different code the data received in the given code, means for simultaneously transmitting the bits in said register order to said translating network, storage means for translated data, and means for transmitting translated data from said translating network to said storage means.

11. In a data processing machine, means for reading a record inscribed in a given multi-bit code, a plurality of register orders corresponding in number to the bits in the code utilized adapted to receive in somewhat serial order and momentarily retain a plurality of code bits, a code translating network adapted to translate into a different code the data received in the given code, means for simultaneously transmitting the bits in said register orders to said translating network, electrostatic storage means for translated data, and means for transmitting translated data from said transalting network to said electrostatic storage means in serial order.

12. In a data processing machine, means for reading a record inscribed in a given multi-bit code, a plurality of register orders corresponding in number to the bits in the code utilized adapted to receive in somewhat serial order and momentarily retain a plurality of code bits, a code translating network adapted to translate into a different code the data received in the given code, means for simultaneously transmitting the bits in said register orders to said translating network, electrostatic storage means for translated data adapted to hold data in column-by-column and row-by-row array, means for transmitting translated data from said translating network to said electrostatic storage means in serial order, means for entering data into said electrostatic storage means in column-by-column order, and means for reading stored data out of electrostatic storage in row-by-row order.

13. In a data processing machine, means for reading a record inscribed in a given multi-bit code, a plurality of register orders corresponding in number to the bits in the code utilized adapted to receive in somewhat serial order and momentarily retain a plurality of code bits, a code translating network adapted to translate into a different code the data received in the given code, means for simultaneously transmitting the bits in said register orders to said translating network, electrostatic storage means for translated data adapted to hold data in column-by-column and row-by-row array, means for transmitting translated data from said translating network to said electrostatic storage means in serial order, means for entering data into said electrostatic storage means in column-by-column order, means for reading stored data out of electrostatic storage in row-by-row order, a record reproducer, means under control of said record reading means for selecting said data entry means, and means under control of said reproducer for selecting said storage read-out means.

14. In a data processing machine, means for reading from a record medium data adapted for arrangement in a plurality of columns of which the parts comprise a plurality of rows, transistory electrostatic storage means for the data sensed by said reading means, means for transmitting data from said reading means to said electrostatic storage means for storage of such data therein in column-by-column order, means for regenerating the transitory storage pattern in said electrostatic storage means, a data reproducer, means under control of said reproducer for regenerating the transitory storage pattern in said electrostatic storage means, and means under control of said reproducer for halting regeneration and for reading from storage such data in row-by-row order.

15. In a data processing machine, means for reading a record inscribed in a given multi-bit code, a conversion matrix having an umber of conversion channels corresponding to the number of bits in the code read from the record medium for translating the code bits of the given code into a different code and manifesting such translation as electrical pulses on the respective matrix channels, means for simultaneously transmitting code bits read by said reading means to said conversion matrix, and means for sensing in serial order the respective matrix channels for pulses thereon.

16. In a data processing machine, means for reading a record inscribed in a given multi-bit code, a conversion matrix having a number of conversion channels corresponding to the number of bits in the code read from the record medium for translating the code bits of the given code into a different code and manifesting such translation as electrical pulses on the respective matrix channels, means for receiving and holding code bits read in said reading means, means for simultaneously transmitting code bits from said receiving and holding means to said conversion matrix, means for sensing in serial order the respective matrix channels for pulses thereon, and means for storing in row-by-row order the pulses sensed on said matrix channels.

17. In a data processing machine, means for reading a record inscribed in a given multi-bit code, a conversion matrix having a number of conversion channels corresponding to the number of bits in the code read from the record medium for translating the code bits of the given code into a different code and manifesting such translation as electrical pulses on the respective matrix channels, means for simultaneously transmitting code bits read by said reading means to said conversion matrix, means for sensing in serial order the respective matrix channels for pulses thereon, a storage device, means for storing in said storage device in row-by-row order the pulses sensed on said matrix channels, and means for reading from said storage device in column-by-column order.

18. In a data processing machine, means for reading a magnetically recorded tape record inscribed in a given multi-bit code, a conversion matrix having a number of conversion channels corresponding to the number of bits in the code read from the tape record for translating the code bits of the given code into a different code and manifesting such translation as electrical pulses on the respective matrix channels, means for receiving and holding code bits read in said reading means, means for simultaneously transmitting code bits from said receiving and holding means to said conversion matrix, means for sensing in serial order the respective matrix channels for pulses thereon, electrostatic storage means, means under control of said reading means for storing in said electrostatic storage means the pulses sensed on said matrix channels, a data reproducer, and means under control of said reproducer for reading data from said electrostatic storage means.

19. In a data processing machine, means for reading a record, storage means for data read by said reading means adapted to store data in horizontal rows and vertical columns, separate means for scanning data stored in said storage means in a horizontal and in a vertical direction, means under control of said record reading means for selecting one of said scanning means for entering data into said storage means, a data reproducer responsive to data stored in said storage means, and means under control of said data reproducer for selecting the other of said scanning means for reading data out of said storage means to said data reproducer.

20. In a data processing machine, means for reading a magnetic tape record, storage means for data read by said reading means adapted to store data in horizontal rows and vertical columns, separate means for scanning data stored in said storage means in a horizontal and in a vertical direction, means under control of said record reading means for selecting one of said scanning means for entering data into said storage means, a record card punch responsive to data stored in said storage means, and means under control of said punch for selecting the other of said scanning means for reading data out of said storage means to said punch.

21. In a data processing machine, means for reading a record having thereon data in column-by-column order, storage means for data read by said reading means adapted to store data in horizontal rows and vertical columns, separate means for scanning data stored in said storage means in a horizontal and in a vertical direction, means under control of said record reading means for selecting one of said scanning means for entering data into said storage means in column-by-column order, a data reproducer responsive to data stored in said storage means adapted to reproduce data in row-by-row order, and means under control of said data reproducer for selecting the other of said scanning means for reading data out of said storage means to said data reproducer in row-by-row order.

22. In a data processing machine, means for reading a magnetic tape record, storage means for data read by said reading means adapted to store data in horizontal rows and vertical columns, separate means for scanning said storage means in a horizontal and in a vertical direction for entry and read-out of data, means under control of said record reading means for selecting said vertical scanning means for entering data into said storage means, a record card punch responsive to data stored in said storage means, and means under control of said punch for selecting said horizontal scanning means for reading data out of said storage means to said punch.

References Cited in the file of this patent

UNITED STATES PATENTS

| | | |
|---|---|---|
| Re. 23,713 | Hunt | Sept. 22, 1953 |
| 2,006,582 | Callahan | July 2, 1935 |
| 2,554,835 | Mallina | May 29, 1951 |
| 2,609,050 | Roth | Sept. 2, 1952 |
| 2,686,225 | Baker | Aug. 10, 1954 |

UNITED STATES PATENT OFFICE

CERTIFICATE OF CORRECTION

Patent No. 2,807,005 September 17, 1957

James A. Weidenhammer

It is hereby certified that error appears in the printed specification of the above numbered patent requiring correction and that the said Letters Patent should read as corrected below.

Column 2, line 55, for "af" read -- of a --; column 4, line 40, for "wil" read -- will --; column 7, line 71, for "in" read -- an --; column 9, line 70, for "integration" read -- integrating --; column 16, line 6, after "matrix" insert -- which --; line 60, for "$\overline{50}$" read -- 50 --; column 17, line 52, for "$\overline{0-0-0-0}$", second occurrence, read -- $\overline{0-0-1-0}$ --; column 20, line 63, for the reference numeral "195" read -- 196 --; line 64, for "and" read -- an --; column 22, line 33, for "theh" read -- the --; line 37, after "emitted" insert -- from --; line 69, for "as" read -- is --; column 27, line 62, for "six-day" read -- six-way --; column 28, line 16, for "rear-in" read -- read-in --; column 36, line 31, for the reference numeral "426" read -- 260 --; column 39, line 34, after "row" insert -- of --; column 41, line 8, for the reference numeral "455" read -- 445 --; column 47, line 59, for the reference numeral "260" read -- 426 --; line 65, for the reference numeral "426" read -- 260 --; column 53, line 51, for "an umber" read -- a number --.

Signed and sealed this 15th day of April 1958.

(SEAL)

Attest:
KARL H. AXLINE
Attesting Officer

ROBERT C. WATSON
Commissioner of Patents